US012789426B2

(12) United States Patent
Lim et al.

(10) Patent No.: US 12,789,426 B2
(45) Date of Patent: Nov. 10, 2026

(54) APPARATUS AND METHOD FOR PHYSICAL FOAMING INJECTION

(71) Applicant: COMTECH CHEMICAL CO., LTD., Gimhae-si (KR)

(72) Inventors: Byoungmun Lim, Gimhae-si (KR); Daehwi Lim, Gimhae-si (KR); Min Ji Kwon, Gimhae-si (KR)

(73) Assignee: COMTECH CHEMICAL CO., LTD., Gimhae-si (KR)

( * ) Notice: Subject to any disclaimer, the term of this patent is extended or adjusted under 35 U.S.C. 154(b) by 0 days.

(21) Appl. No.: 18/567,088

(22) PCT Filed: Nov. 30, 2022

(86) PCT No.: PCT/KR2022/019282

§ 371 (c)(1),
(2) Date: Jul. 31, 2025

(87) PCT Pub. No.: WO2024/117310

PCT Pub. Date: Jun. 6, 2024

(65) Prior Publication Data

US 2025/0353224 A1 Nov. 20, 2025

(51) Int. Cl.
*B29C 44/42* (2006.01)
*B29C 44/02* (2006.01)
(Continued)

(52) U.S. Cl.
CPC ............ *B29C 44/422* (2013.01); *B29C 44/02* (2013.01); *B29C 44/10* (2013.01);
(Continued)

(58) Field of Classification Search
CPC .......................... B29C 44/3446; B29C 44/422
See application file for complete search history.

(56) References Cited

U.S. PATENT DOCUMENTS 5,098,267 A * 3/1992 Cheng ................. B29C 44/3449
366/76.9
6,451,230 B1 * 9/2002 Eckardt ................. B29C 44/422
264/DIG. 83
(Continued)

FOREIGN PATENT DOCUMENTS

CN 110978365 4/2020
CN 112959591 A * 6/2021 ........... B29C 44/422
(Continued)

OTHER PUBLICATIONS

EPO, Search Report of EP 22944028.4 dated Dec. 2, 2024, total p. 9.

*Primary Examiner* — Benjamin A Schiffman
(74) *Attorney, Agent, or Firm* — LEX IP MEISTER, PLLC

(57) ABSTRACT

System and method for physical foaming injection suitable for manufacturing low-density member are provided. The method for physical foaming injection includes i) heating an inside of a barrel that is elongated in one direction; ii) providing resin beads in the barrel; iii) manufacturing a melt by rotating and heating the resin beads with a first screw provided in the barrel; iv) directly providing a gas for physical foaming in the barrel along a transferring direction of the resin beads by spacing the resin beads; v) providing a gas for physical foaming in the barrel and forming a supercritical fluid by agitating a second screw placed in front of a first screw, the first screw to be spaced apart the second screw along a transferring direction; vi) providing a mixture in which the supercritical fluid is incorporated into the melt while the melt passes through the supercritical fluid; vii) pressurizing a cavity formed by the combination of a upper mold part and a lower mold part by injecting gas into the cavity; viii) foaming the mixture in the cavity while injecting the mixture into the cavity; ix) reducing pressure of the
(Continued)

cavity in multiple stages after the injection of the mixture, and x) separating the upper mold part and the lower mold part from each other to remove the foamed member with a low density of 0.1 g/cc to 0.5 g/cc.

34 Claims, 52 Drawing Sheets

(51) Int. Cl.

| | |
|---|---|
| ***B29C 44/10*** | (2006.01) |
| ***B29C 44/34*** | (2006.01) |
| ***B29C 44/44*** | (2006.01) |
| ***B29C 44/58*** | (2006.01) |
| ***B29C 44/60*** | (2006.01) |
| ***B29C 45/14*** | (2006.01) |
| ***B29C 45/17*** | (2006.01) |
| ***B29C 45/27*** | (2006.01) |
| ***B29C 45/47*** | (2006.01) |
| ***B29D 35/12*** | (2010.01) |
| ***B29L 31/50*** | (2006.01) |

(52) U.S. Cl.

CPC ...... *B29C 44/3415* (2013.01); *B29C 44/3446* (2013.01); *B29C 44/42* (2013.01); *B29C 44/445* (2013.01); *B29C 44/58* (2013.01); *B29C 44/588* (2013.01); *B29C 44/60* (2013.01); *B29C 45/14795* (2013.01); *B29C 45/1703* (2013.01); *B29C 45/2708* (2013.01); *B29C 45/47* (2013.01); *B29D 35/122* (2013.01); *B29D 35/124* (2013.01); *B29D 35/128* (2013.01); *B29L 2031/504* (2013.01)

(56) References Cited

U.S. PATENT DOCUMENTS

| | | | | |
|---|---|---|---|---|
| 8,810,495 | B2 * | 8/2014 | Teranishi | G09G 3/3659 345/96 |
| 9,884,439 | B2 * | 2/2018 | Yamamoto | B29C 45/63 |
| 10,632,663 | B2 * | 4/2020 | Yusa | B29B 7/429 |
| 11,207,809 | B2 * | 12/2021 | Yusa | B29C 44/3446 |
| 11,318,646 | B2 * | 5/2022 | Yusa | B29C 48/29 |
| 11,370,155 | B2 | 6/2022 | Baghdadi et al. | |
| 11,478,969 | B2 * | 10/2022 | Yusa | B29C 45/1701 |
| 11,673,358 | B2 * | 6/2023 | Hannemann | A43B 13/04 36/29 |
| 12,208,549 | B2 * | 1/2025 | Dix | B29C 44/02 |
| 12,576,566 | B2 * | 3/2026 | Asanuma | B29C 44/02 |
| 12,583,151 | B2 * | 3/2026 | Naito | B29C 33/20 |
| 2019/0091901 | A1 * | 3/2019 | Hsieh | B29C 45/46 |
| 2019/0118432 | A1 * | 4/2019 | Burnham | B29C 44/02 |
| 2019/0291314 | A1 * | 9/2019 | Dix | B29C 44/3449 |
| 2019/0338099 | A1 * | 11/2019 | Dix | B29C 48/0012 |
| 2020/0307042 | A1 * | 10/2020 | Chen | B29C 44/42 |
| 2024/0375328 | A1 * | 11/2024 | Yamaguchi | B29C 44/02 |

FOREIGN PATENT DOCUMENTS

| | | | | |
|---|---|---|---|---|
| DE | 102022114859 A1 * | 12/2022 | B29C 44/3446 |
| JP | 2001-277280 | 10/2001 | |
| JP | 2010-208338 | 9/2010 | |
| JP | 2016-128222 | 7/2016 | |
| JP | 2022-142524 | 9/2022 | |
| KR | 10-0752281 | 9/2007 | |
| KR | 10-2010-0035647 | 4/2010 | |
| KR | 10-2012-0111486 | 10/2012 | |
| KR | 10-2016-0086700 | 7/2016 | |
| KR | 10-2017-0038852 | 4/2017 | |
| TW | 1660834 | 6/2019 | |
| WO | WO-2022196281 A1 * | 9/2022 | B29C 44/42 |
| WO | WO-2023089940 A1 * | 5/2023 | B29C 45/18 |

* cited by examiner

100

APPARATUS AND METHOD FOR PHYSICAL FOAMING INJECTION

TECHNICAL FIELD

The present invention relates to an apparatus and method for physical foaming injection. More particularly, the present invention relates to an apparatus and method for physical foaming injection which are suitable for manufacturing low-density members.

BACKGROUND ART

A physical foaming injection process, which uses supercritical fluid to foam resin without using chemical cross-linking agents, is gaining popularity for manufacturing shoe soles. The physical foaming injection process can be useful for recycling even if defective products are produced, and it is also recognized as an eco-friendly technology because it is less likely to produce residual resin.

However, conventional foaming technologies aim for a weight reduction of 10-15%, making it difficult to manufacture high-foam products. In addition, a structure of the device for manufacturing and supplying supercritical fluid that acts as a foaming agent to meet the target foaming ratio is complex, making it difficult to secure the reproducibility required for mass production. To achieve high foamability, core-back technology, which mechanically increases the volume of the mold cavity, has been proposed, but it is limited to increase the thickness of the same shape, making it difficult to manufacture high-foam products with complex 3D shapes.

DETAILED DESCRIPTION OF THE INVENTION

Technical Problem

A method for physical foam injection which is suitable for manufacturing a low-density member is provided. Also, a system for physical foaming injection which is suitable for manufacturing a low-density member is provided.

Technical Solution

A method for physical foaming injection according to one embodiment of the present invention includes i) heating an inside of a barrel that is elongated in one direction; ii) providing resin beads in the barrel; iii) manufacturing a melt by rotating and heating the resin beads with a first screw provided in the barrel; iv) directly providing a gas for physical foaming in the barrel along a transferring direction of the resin beads by spacing the resin beads; v) providing a gas for physical foaming in the barrel and forming a supercritical fluid by agitating a second screw placed in front of a first screw, the first screw to be spaced apart the second screw along a transferring direction; vi) providing a mixture in which the supercritical fluid is incorporated into the melt while the melt passes through the supercritical fluid; vii) pressurizing a cavity formed by the combination of a upper mold part and a lower mold part by injecting gas into the cavity; viii) foaming the mixture in the cavity while injecting the mixture into the cavity; ix) reducing pressure of the cavity in multiple stages after the injection of the mixture, and x) separating the upper mold part and the lower mold part from each other to remove the foamed member with a low density of 0.1 g/cc to 0.5 g/cc.

The directly providing the gas for physical foaming may include i) opening a valve installed in a supply port of gas for physical foaming; ii) forming a filling space of gas for physical foaming in the barrel corresponding to the supply port; and iii) moving the second screw into the filling space along one direction. The pressure in the barrel may be from 30 bar to 300 bar in the directly providing the gas for physical foaming.

A method for physical foaming injection according to one embodiment of the present invention may further include providing a rotor in the barrel. In the forming a supercritical fluid, a first screw may be formed as a continuous helix on a surface of the rotor in the forming a supercritical fluid, and a second screw may include a plurality of blades spaced apart from each other on the surface of the rotor, the plurality of blades projecting in a direction intersecting with the one direction at a right angle, the second screw spaced apart from the first screw along the one direction. A height of the plurality of blades may be less than the height of the first screw.

An injection rate of the mixture in the foaming the mixture and a reducing rate of pressure of the cavity in multiple stages may be substantially equal to each other. The cavity may be pressurized to a range of 5 bar to 60 bar in the pressurizing the cavity. An intake and exhaust passage may be formed to enclose the cavity in the lower mold part in the foaming the mixture. A length of the cavity in a longitudinal direction may be greater than a length of the cavity in a transverse direction that intersects the longitudinal direction at a right angle. A plurality of intake and exhaust holes may be formed in an intake and exhaust passage located at both ends of the longitudinal direction. The plurality of intake and exhaust holes may be in communication with the cavity. A plurality of intake and exhaust holes may include i) a plurality of first intake and exhaust holes located at a first of the two ends and spaced apart from each other; and ii) a plurality of second intake and exhaust holes located at a second end opposing to the first end of both ends and spaced apart from each other. An average thickness of the low-density member formed in a portion of the cavity closer to the second end than to the first end may be greater than an average thickness of the low-density member formed in another portion of the cavity closer to the first end than to the second end. An exhaust pressure acting on the second intake and exhaust holes may be greater than an exhaust pressure acting on the first intake and exhaust holes.

A plurality of intake and exhaust holes may include i) a plurality of first intake pores located at a first of the two ends and spaced apart from each other; and ii) a plurality of second intake and exhaust holes located at a second end opposing to a first end of both ends and spaced apart from each other. An average thickness of the low-density member formed in a portion of the cavity closer to the second end than to the first end may be greater than an average thickness of the low-density member formed in another portion of the cavity closer to the first end than to the second end. An amount of gas exhausted through the second intake and exhaust holes may be greater than an amount of gas exhausted through the first intake and exhaust holes.

A gas may be exhausted through a first valve and a second valve connected to an intake and exhaust passage corresponding to a length of a longitudinal direction of the cavity and the second valve may be opened after the first valve is opened in the reducing pressure of the cavity. The second valve may be opened 0.5 second to 1 second after the opening of the first valve. The first valve may have an opening of not greater than an opening of the second valve, and the first valve may have an opening of a range from 20% to 40%. More preferably, the second valve may have an opening of a range from 30% to 40%.

The reducing pressure of the cavity in multiple stages may include i) delaying evacuation of the gas, and ii) evacuating the gas. A time for delaying evacuation of the gas may be less than a time for evacuating the gas. The delaying evacuation of the gas may be performed in a range from 0.05 to 2 second. More preferably, the delaying the evacuation of the gas may be performed in a range from 0.1 to 1 second.

The foaming the mixture may be that the second screw advances in multiple stages to inject the mixture, and an injecting distance of the second screw may decrease as the number of the stages increases. An injection rate may gradually increase or decrease as the number of the stages increases. An injection pressure may increase or remain the same as the number of the stages increases.

After the injecting the mixture, the first screw may retract along the one direction to repeat the manufacturing a melt. The directly providing the gas for physical foaming may be performed simultaneously with a start of retraction of the first screw. The providing the gas for physical foaming may be stopped simultaneously with completion of retraction of the first screw.

The method for physical foaming injection according to one embodiment of the present invention may further include i) recovering by-products obtained from the resin beads in at least one of step performed after the providing the resin beads; ii) shredding the by-products to provide shredded material, and iii) heat extruding the shredded material to provide a heel support for shoes. The foamed member with a low density may be the shoe sole in the removing the foamed member with a low density and the shoe heel support may be adapted to be provided over the shoe sole in the manufacturing of a shoe.

A physical foaming injection system according to an embodiment of the present invention includes i) a barrel that is extended in one direction and adapted to heat the inside thereof; ii) a raw material inlet that is connected to the barrel and provides resin beads into the barrel; iii) a supply port that is spaced apart from the raw material inlet and is connected to the barrel to directly provide gas for physical foaming into the barrel; iv) a rotating body that is installed in the barrel, is adapted to rotate the resin beads to transfer a mixture provided by mixing the resin beads with a gas for physical foaming and is reciprocated along the one direction; v) a mold that has at least one of cavity connected to the barrel and is adapted to allow the mixture to be injected and foamed in a vertical dropping direction; vi) a plurality of valves that is communicated with the cavity and is adapted to reduce pressure of the cavity in multiple stages; and vii) a low-density member with a range of 0.1 g/cc to 0.5 g/cc that is provided and removed from the mold by injection foaming. The rotating body includes i) a rotor; ii) a first screw formed as a continuous helix on a surface of the rotor; and iii) a second screw that comprises a plurality of blades spaced apart from each other on the surface of the rotor, the plurality of blades projecting in a direction intersecting with the one direction at a right angle, the second screw placed corresponding to the supply port and directly contacting with and rotating the gas for physical foaming and then converting the gas for physical foaming into a supercritical fluid.

The mold may include i) a lower mold part, and ii) an upper mold part that is adapted to be combined with the lower mold part to form a cavity. An intake and exhaust passage may be formed to surround the cavity in the lower mold part. A length of the cavity in a longitudinal direction may be greater than a length of the cavity in a transverse direction that intersects the longitudinal direction at a right angle. A plurality of intake and exhaust holes may be formed in an intake and exhaust passage located at both ends of the longitudinal direction. The plurality of intake and exhaust holes may be connected to the cavity. The plurality of intake and exhaust holes may include i) a plurality of first intake and exhaust holes located at a first of the two ends and spaced apart from each other; and ii) a plurality of second intake and exhaust holes located at a second end opposing to the first end of both ends and spaced apart from each other. An average thickness of the low-density member formed in a portion of the cavity closer to the second end than to the first end may be greater than an average thickness of the low-density member formed in another portion of the cavity closer to the first end than to the second end. The number of the plurality of first intake and exhaust holes may be less than the number of the plurality of second intake and exhaust holes.

The physical foaming injection system according to an embodiment of the present invention may further include a plurality of injection gates for injecting the mixture into the cavity, the plurality of injection gates being combined with the upper mold part and arranged side by side along a longitudinal direction. At least one of time zones exist in which injection of the mixture and delayed injection of the mixture may be differently performed by two or more injection gates among the plurality of injection gates.

A plurality of intake and exhaust holes may be formed on both sides of the longitudinal direction of the cavity, the plurality of intake and exhaust holes being in communication with intake and exhaust passage. A plurality of intake and exhaust holes may include i) a plurality of first intake and exhaust holes located at a first of the both sides and spaced apart from each other; and ii) a plurality of second intake and exhaust holes located at a second side opposing to the first side of both sides and spaced apart from each other. An average thickness of the low-density member formed in a portion of the cavity closer to the second side than to the first side may be greater than an average thickness of the low-density member formed in another portion of the cavity closer to the first side than to the second side. A diameter of at least one of a plurality of intake and exhaust holes may be greater than a diameter of at least one of a plurality of first intake and exhaust holes.

At least one cavity may include a pair of cavities which are mutually symmetrical to each other. An external outlet may be formed in the lower mold part, the external outlet connected with each of the intake and exhaust holes and a plurality of valves of the pair of cavities along a transverse direction outside of the pair of cavities. At least one low-density member may include a pair of low-density members which are mutually symmetrical to each other, the pair of low-density members being a shoe sole. A height of at least one of the plurality of blades may be less than a height of the first screw, the at least one of the plurality of blades having a rectangular shape.

Advantageous Effects

Low-density members can be manufactured in a low-cost and an eco-friend way. Automated processes can be used for mass-producing low-density members uniformly such as shoe soles at low processing costs. As a result, amount of by-products generated during the process can be minimized, and the by-products can be recycled.

DETAILED DESCRIPTION OF THE EMBODIMENTS

The technical terms used herein are intended to refer only to specific embodiments and are not intended to limit the invention. Singular forms used herein include plural forms unless the context clearly indicates the contrary. The meaning of "comprising" as used in the specification is to specify particular features, areas, elements, steps, operations, elements, and/or components and is not intended to exclude the existence or added value of other particular features, areas, elements, steps, operations, elements, components, and/or groups.

Unless otherwise defined, all terms used herein, including technical and scientific terms, shall have the meaning as generally understood by one of ordinary skill in the art to which this invention belongs. Terms defined in commonly used dictionaries are further interpreted to have a meaning consistent with the relevant technical literature and the present disclosure, and are not to be construed in an idealized or highly formal sense unless defined.

As used herein, the term of low-density member refers to a component having multiple cavities formed therein by a foaming process. The low density is a relative term and is not limited to a specific density.

Hereinafter, with reference to the accompanying drawings, embodiments of the present invention are described in detail so as to facilitate practice by one of ordinary skill in the art to which the present invention belongs. However, the invention may be implemented in many different forms and is not limited to the embodiments described herein.

Figure 1:
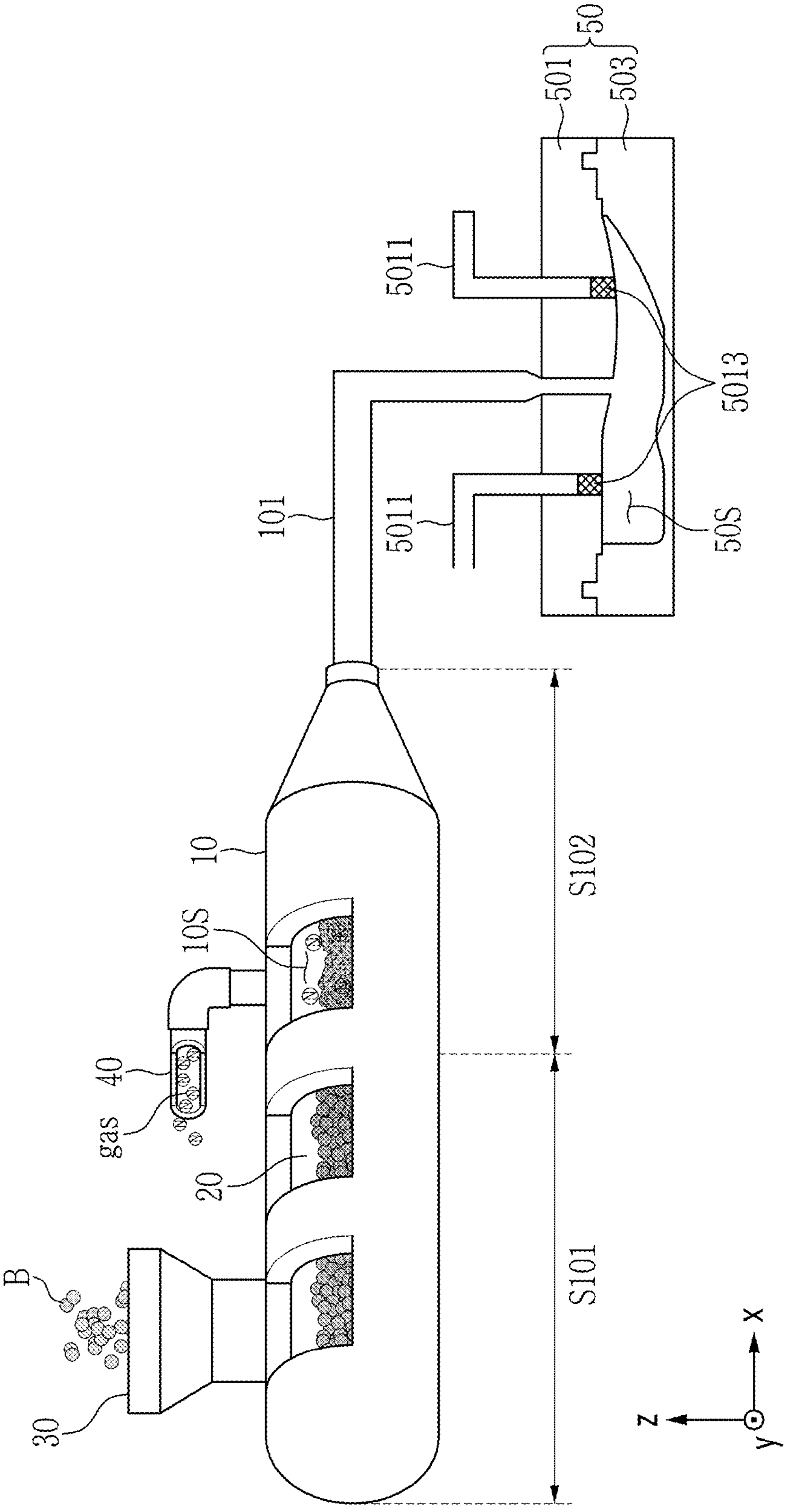
FIG. 1 schematically shows a physical foam injection device according to one embodiment of the present invention.

FIG. 1 schematically illustrates a physical foam injection device 100 according to one embodiment of the present invention. The physical foam injection device 100 of FIG. 1 is only for illustrating the present invention, and the present invention is not limited to it, and therefore the physical foam injection device 100 can be modified in other forms. Also, although not shown in FIG. 1, a control unit for controlling the physical foam injection device 100 is installed.

The physical foam injection device 100 includes a barrel 10, a rotating body 20, a raw material inlet 30, a fluid supply port 40, and a mold 50. In addition, the physical foam injection device 100 may further include other components.

The barrel 10 is extended along the x-axis direction. The inside S10 of the barrel 10 is heated by a heat source (not shown). Therefore, the resin beads B supplied through the raw material inlet 30 is heated as it moves in the x-axis direction by the rotating screw 10 and is manufactured into a melt.

The inside S10 of the barrel 10 includes a first space S101 and a second space S102. The first space S101 and the second space S102 are interconnected in turn along the transferring direction of the resin beads B. The resin beads B is heated in the first space S101 to be made into a melt.

The resin beads B can be a thermoplastic polyurethane copolymer (TPE), ethylene vinyl acetate (EVA), polycarbonate, or thermoplastic polyester elastomer (TPEE). In addition, other raw materials can be used.

The outlet 101 interconnects the barrel 10 and the mold 50. A mixture incorporated with supercritical fluid is supplied to the mold 50 through the outlet 101 to manufacture an injected material.

Figure 2:
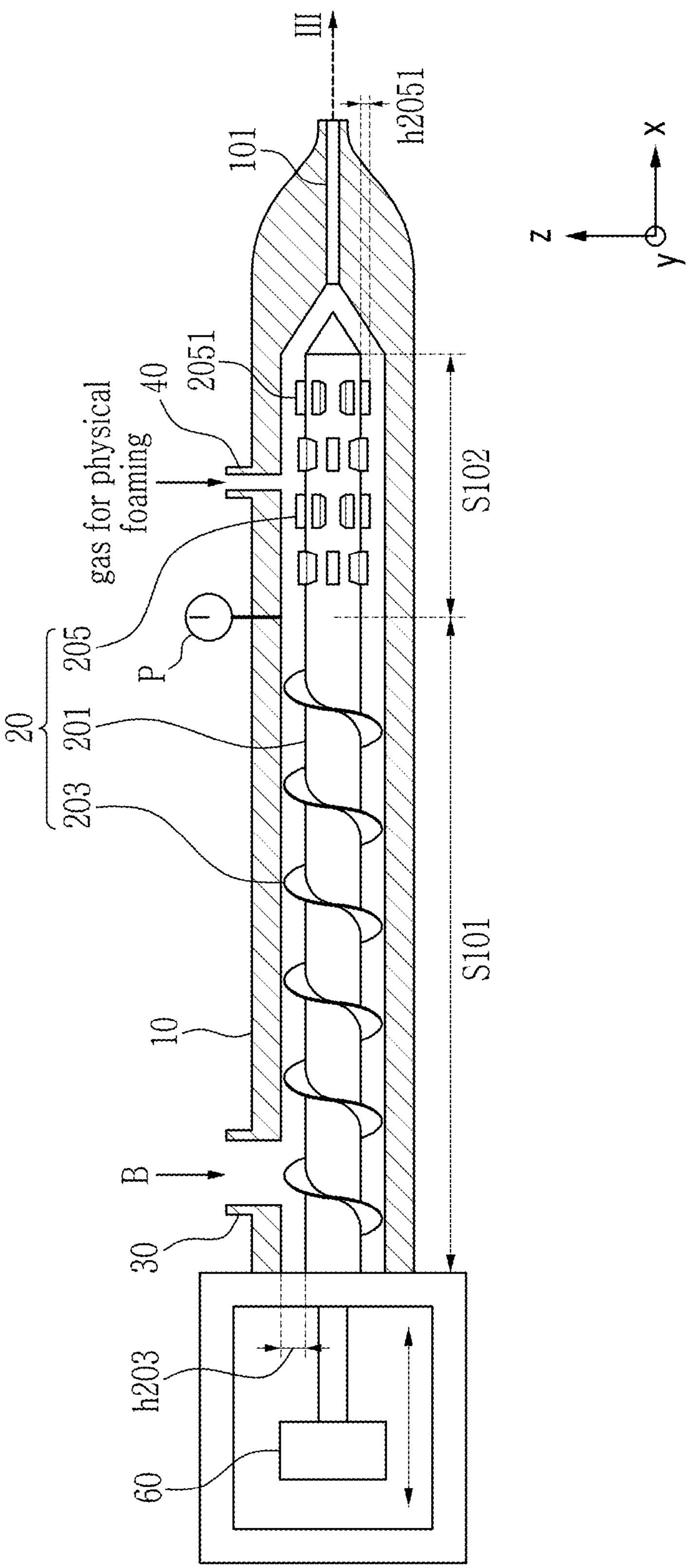
FIG. 2 schematically shows a barrel included in the physical foam injection system of FIG. 1.

The mold 50 includes an upper mold part 501 and a lower mold part 503. The mold 50 may be made of non-porous steel or the like. The upper mold part 501 is coupled on the lower mold part 503. The upper mold part 501 and the lower mold part 503 form a cavity S50. In the upper mold part 501, an intake and exhaust pipe 5011 is formed in communication with the cavity S50. Therefore, after supplying a certain amount of mixture to the cavity S50, the cavity S50 is pressurized by inhaling air through the intake and exhaust pipe 5011, and then back pressure is applied by exhausting the air. As a result, the mixture is foamed and fills the cavity S50 to produce an injected material. A filter 5013 is installed in the intake and exhaust pipe 5011, and the filter 5013 forms the boundary of the cavity S50. Therefore, air as a gas can pass through the filter 5013 while injected material as a solid cannot pass through the filter 5013, thereby preventing contamination of the intake and exhaust pipe 5011. Referring to FIG. 2, the internal structure of the barrel 10 of FIG. 1 will be described in more detail.

FIG. 2 schematically shows a structure of the barrel 10 included in the physical foam injection device 100 of FIG. 1. The internal structure of the barrel 10 in FIG. 2 is only to illustrate the present invention only, and the present invention is not limited thereto. Therefore, the internal structure of the barrel 10 can be modified in other forms.

As shown in FIG. 2, the rotating body 20 includes a rotor 201, a first screw 203, and a second screw 205. In addition, the rotating body 20 may further include other components. The first screw 203 is located in the first space S101 while the second screw 205 is located in the second space S103.

The first screw 203 is formed as a helix on the surface of the rotor 201. The first screw 203 heats and mixes the resin beads B to manufacture a fluid. The fluid is mixed with a gas for physical foaming supplied to the second space S103. For this purpose, the second screw 205 includes blades 2051 spaced apart from each other on the surface of the rotor 201 and projected in the z-axis direction. The blades 2051 are also spaced apart from each other in the x-axis direction.

The gas for physical foaming is supplied directly to the second screw 205. For this purpose, the fluid pressure in the barrel 10 is measured by using a pressure gauge P installed in the barrel 10. If the fluid pressure is between 30 bar and 300 bar, the gas for physical foaming is dosed into the second screw 205 to produce a supercritical fluid (SCF) in the barrel 10. If the fluid pressure is too large, dosing of the gas for physical foaming may be difficult. Also, if the fluid pressure is too small, fluid formation for dosing of the gas for physical foaming is not achieved. Therefore, it is desirable to dose the gas for physical foaming to the second screw 205 within the aforementioned fluid pressure range. Meanwhile, the mixture is continuously injected into the mold 50 by the second screw 205 at a speed of about 3 mm/s to 200 mm/s. If the injection rate of the mixture is too low, the productivity of the injected material is low. In addition, if the injection rate of the mixture is too large, it is difficult to perform the process. Therefore, the injection rate of the mixture is adjusted to the aforementioned range. Meanwhile, the rotating body 20 can move along the +x-axis direction.

An actuator 60 is connected to the rotating body coaxially, i.e., in the x-axis direction, to move it back and forth along the x-axis direction, as indicated by the arrow. In other words, the actuator 60 is used to inject the gas for physical foaming while the rotating body 20 is subtracted in the −x-axis direction. Then, the actuator 60 is used to move the rotating body 20 in the +x-axis direction to rotate the gas for physical foaming to make it a supercritical fluid. In this case, the rotating speed of the rotating body 20 may be from 5 rpm to 450 rpm. If the rotating speed of the rotating body 20 is too low, the supercritical fluid may not be formed well. Conversely, if the rotational speed of the rotating body 20 is too high, the supercritical fluid may not be formed well. Therefore, the rotating speed of the rotating body 20 is adjusted to the range described above.

Figure 3:
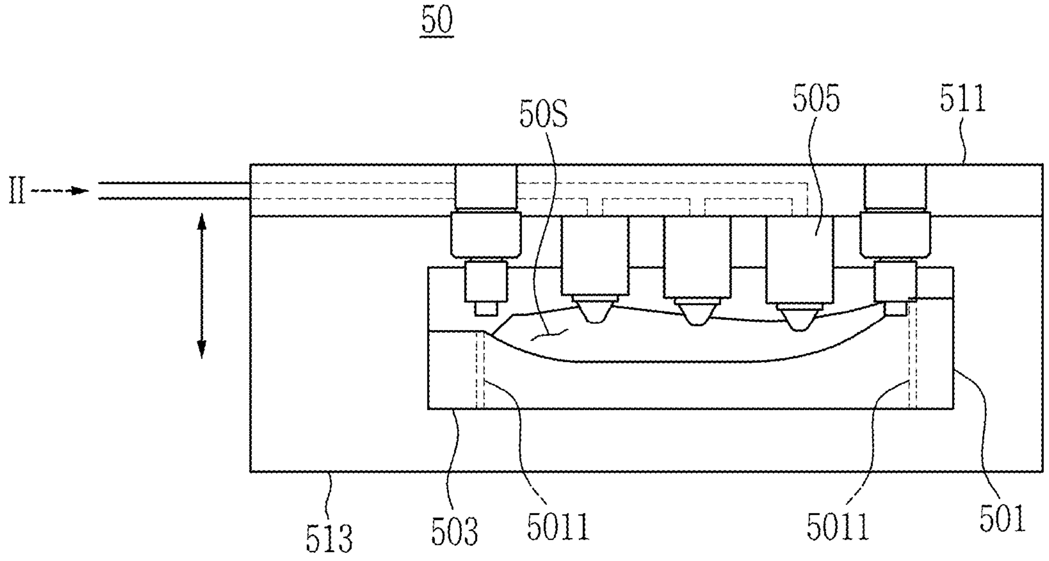
FIG. 3 is schematic partial side view of a mold included in the physical foam injection system of FIG. 1.

As shown by the dashed arrow in FIG. 2, the mixture is discharged from the barrel 10 in the direction denoted by III in FIG. 3. This connects with the portion of FIG. 3 denoted by II in FIG. 2 and is supplied into the mold 50.

FIG. 3 shows a schematic side view of the mold 50 of FIG. 1 in more detail. The structure of the mold 50 in FIG. 3 is merely to illustrate the present invention, and the invention is not limited thereto. Accordingly, the structure of the mold 50 can be modified into other forms.

As shown in FIG. 3, the mold 50 includes an upper mold part 501 and a lower mold part 503. The lower mold part 503 is fixed to the support 513, and the upper mold part 501 is moved up and down along the z-axis direction by a runner portion 511.

The mold 50 is preheated to 10° C. to 80° C. for efficient foaming of the mixture. If the heating temperature of the mold 50 is too low, it is undesirable for the foaming of the mixture. In addition, if the heating temperature of the mold 50 is too high, the mixture may be overheated and the lead time may be long. Therefore, the heating temperature of the mold 50 is kept in the range described above. On the other hand, the temperature of the mold 50 can be set below room temperature to improve the surface of the foam or to control the thickness of the skin layer thereof.

A plurality of injection gates 505 are coupled to the upper mold part 501. The mixture is injected into the cavity S50 for foaming through the injection gates 505. The injection gates 505 are arranged along the y-axis direction, i.e., the longitudinal length direction of the cavity S50. Since the low-density member is formed with an extended shape in the y-axis direction, three injection gates 505 should be arranged in the y-axis direction so that the low-density member can be manufactured quickly. For each of the injection gates 505, there may be one or more time zones during which steps for injecting the mixture and steps for delaying injection of the mixture are performed differently. For example, by adjusting the delay time and the operating time of each injection gate 505, injection with multiple stages is possible. As a result, injection with multiple stages using the injection gates 505 may be possible to produce a low-density member that is well and uniformly foamed.

The lower mold part 503 forms a cavity S50 in which a pair of shoe soles can be injected to be foamed. The mixture is injected through an injection gate 505 arranged along the y-axis direction while gas is inhaled or exhausted through an intake and exhaust pipe 5011. The mold 50 may be operated by a hydraulic system, an electrical system, or a hybrid hydraulic/electrical system.

Figure 4:
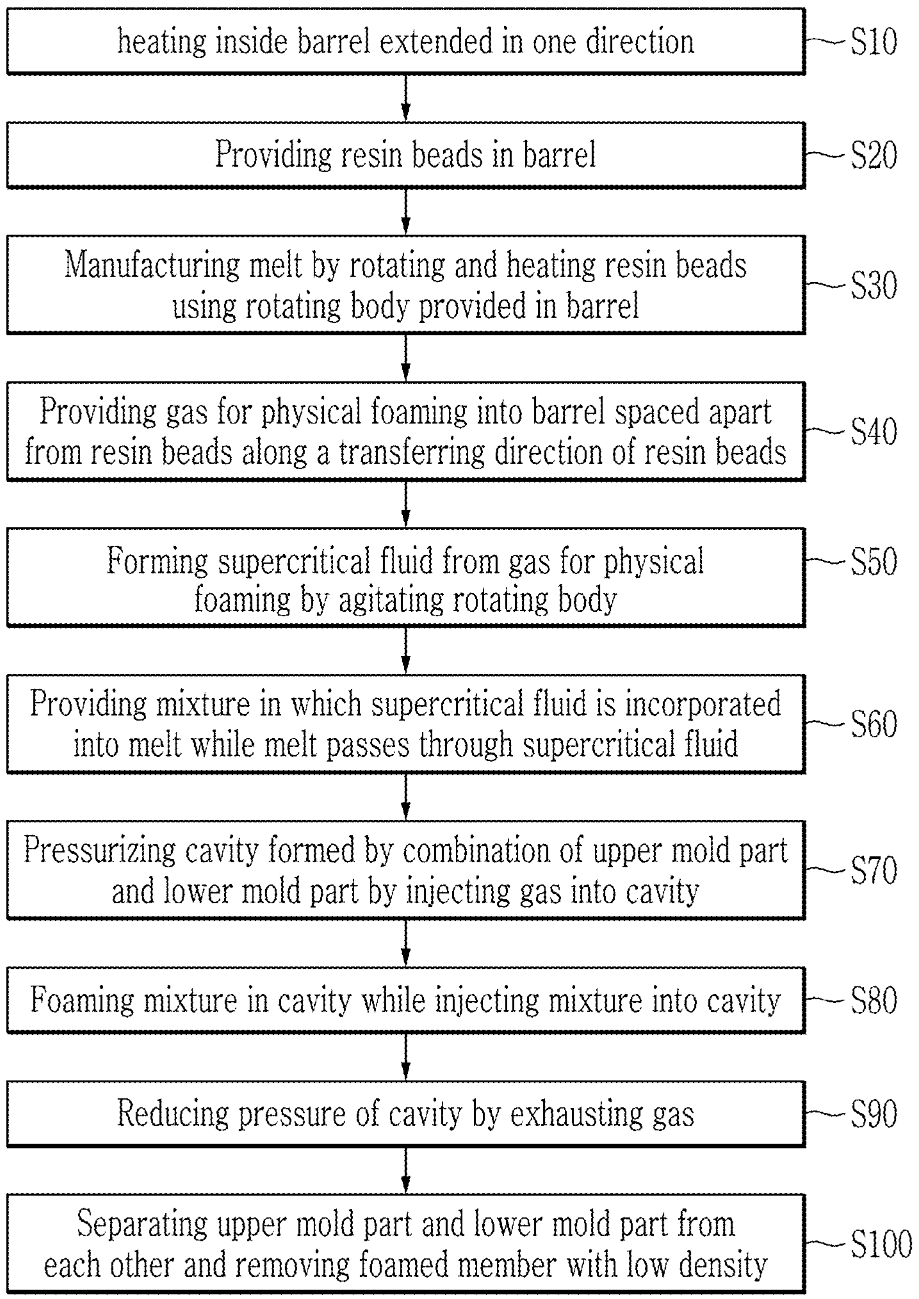
FIG. 4 is a schematic flowchart of a physical foaming injection method according to one embodiment of the present invention.

FIG. 4 schematically shows a flowchart of a physical foaming injection method according to one embodiment of the present invention. The physical foaming injection method of FIG. 4 is merely to illustrate the present invention and the present invention is not limited thereto. Therefore, the physical foaming injection method of FIG. 4 may be modified into other forms.

As shown in FIG. 4, a physical foaming injection method according to one embodiment of the present invention includes steps of heating inside the barrel extended in one direction S10, providing resin beads in the barrel S20, manufacturing the melt by rotating and heating the resin beads using the rotating body provided in the barrel S30, providing gas for physical foaming into the barrel spaced apart from the resin beads along a transferring direction of the resin beads S40, forming a supercritical fluid from the gas for physical foaming by agitating the rotating body S50, providing the mixture in which the supercritical fluid is incorporated into the melt while the melt passes through the supercritical fluid S60, pressurizing the cavity formed by combination of the upper mold part and the lower mold part by injecting gas into the cavity S70, foaming the mixture in the cavity while injecting the mixture into the cavity S80, reducing pressure of the cavity by exhausting the gas S90, and separating the upper mold part and the lower mold part from each other and removing foamed member with low density S100. In addition, the physical foaming injection method according to one embodiment of the present invention may further include other steps.

Meanwhile, FIGS. 5 to 20 illustrate each step of the physical foam injection method of FIG. 4. Therefore, each step of FIG. 4 will be described below with reference to FIGS. 5 to 20.

First, in the step of S10, the inside of the barrel extended in one direction is heated. That is, the inside of the barrel is heated in order to heat the resin beads supplied into the barrel to be manufactured into a melt. For example, a ceramic heater can be embedded in the barrel to heat the inside of the barrel. Since the structure of such a barrel can be easily understood by a person having ordinary knowledge in the technical field to which the present invention belongs, a detailed description is omitted.

In the step of S20, resin beads B are provided in the barrel 10, That is, resin beads are supplied as raw materials. TPE, EVA, polycarbonate, or TPEE can be used as resin beads.

Figure 5:
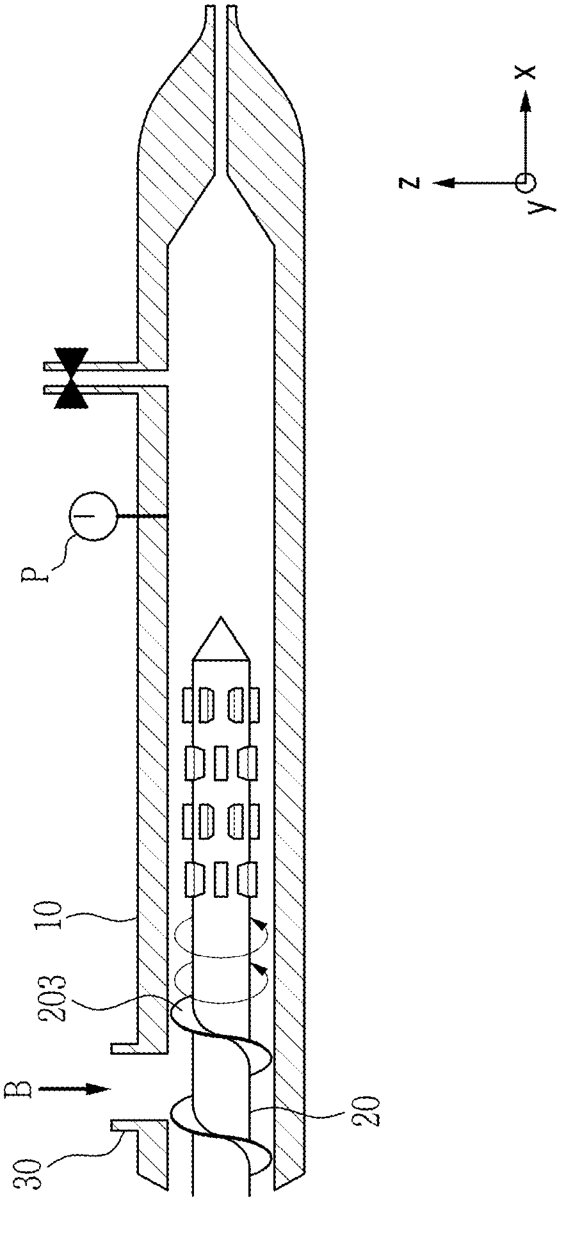
FIGS. 5 to 10 schematically show the steps of providing the mixture of FIG. 4, each in turn.

Next, in the step of S30, a melt is prepared by rotating and heating the resin beads B with the rotating body 20 installed in the barrel as shown in FIG. 5 That is, the spiral-shaped screw 203 formed around the rotating body 20 is rotated in the direction of the arrow to transfer the resin beads B along the x-axis direction while mixing and heating them.

Figure 6:
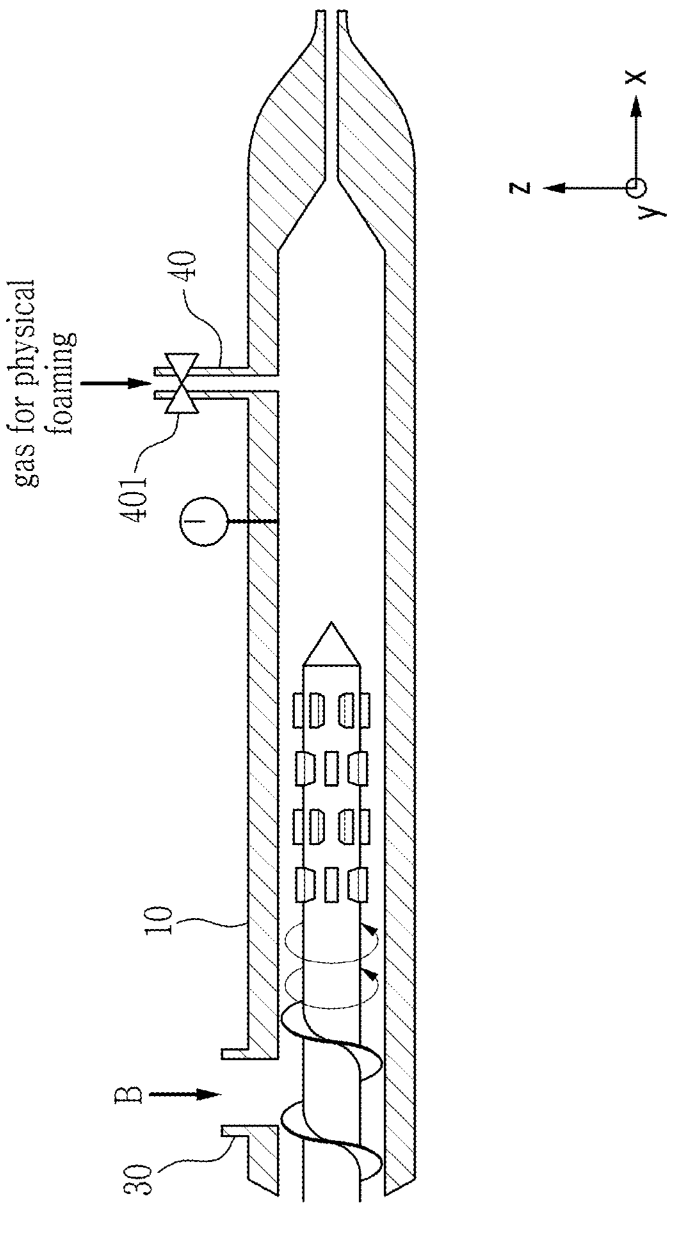

In the step S40 of FIG. 4, a gas for physical foaming is provided in the barrel 10 by spacing it apart from the resin beads B along the transferring direction of the resin beads B as shown in FIG. 6. Nitrogen or carbon dioxide can be used as the gas for physical foaming. Since not a chemical crosslinking agent but the gas for physical foaming is used, the injected low-density member can be recycled to be reused later. As a result, the physical injection foaming method is eco-friendly.

The pressure in the barrel 10 is measured and the gas for physical foaming is injected thereto if the pressure is between 30 bar and 300 bar. The gas for physical foaming is supplied into the barrel 10 through the supply port 40. The supply port 40 is equipped with a valve 401, which can be opened to supply the gas for physical foaming into the barrel 10. By supplying not a supercritical fluid but the gas for gas for physical foaming, a sufficient amount of the gas for physical foaming can be supplied to ensure sufficient foaming during injection in the subsequent process. In contrast, if a supercritical fluid is injected, it is difficult to obtain a sufficient amount of gas. As a result, it may be difficult to obtain a low-density product since the supercritical fluid is unsuitable for high foaming in subsequent processes.

In contrast, if the supercritical fluid is injected directly into the melt and mixed, the pressure in the barrel may be uneven, thereby causing the melt to flow out the injection side of the supercritical fluid. This makes it difficult to uniformly mix the supercritical fluid into the melt and reduces the stability of the process. Furthermore, since gas is generated as the raw material is transferred forward, it may be difficult to inject gas directly into the raw material due to the pressure of the gas. In contrast, in one embodiment of the present invention, the melt is naturally mixed with the supercritical fluid as it passes through it, thereby the aforementioned phenomena are unlikely to occur.

Figure 7:
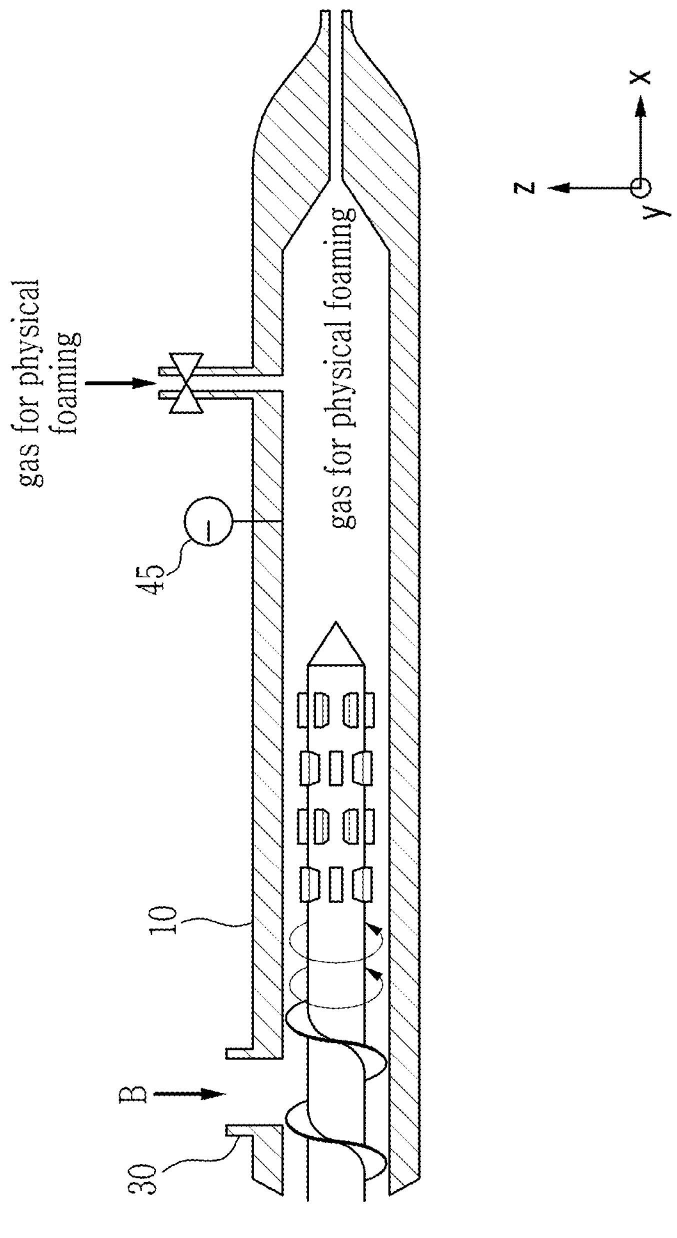

As shown in FIG. 7, the pressure in the barrel 10, as measured by the manometer 45, may be from 0 bar to 100 bar based on the injection pressure of the supplied gas for physical foaming. For example, if the supply pressure of the gas for physical foaming is 145 bar, the pressure in the barrel 10 may be not less than 45 bar or below 145 bar. If the pressure in the barrel 10 is too small, the gas for gas for physical foaming may be injected at a high pressure, resulting in uneven mixing of the gas for physical foaming with the melt. On the other hand, if the pressure inside the barrel 10 is too large, it may be difficult to inject the gas for physical foaming. Therefore, the pressure in the barrel 10 is adjusted to the range described above.

As a result, the barrel 10 is filled with the gas for physical foaming. If the injection pressure of the gas for physical foaming is too low, a sufficient amount of gas for physical foaming cannot be obtained, thereby not being capable of producing a member with the desired density in the subsequent process. Furthermore, if the injection pressure of the gas for physical foaming is too high, the barrel 10 cannot be designed beyond the limit thereof. Therefore, the pressure is adjusted to the range described above.

Figure 8:
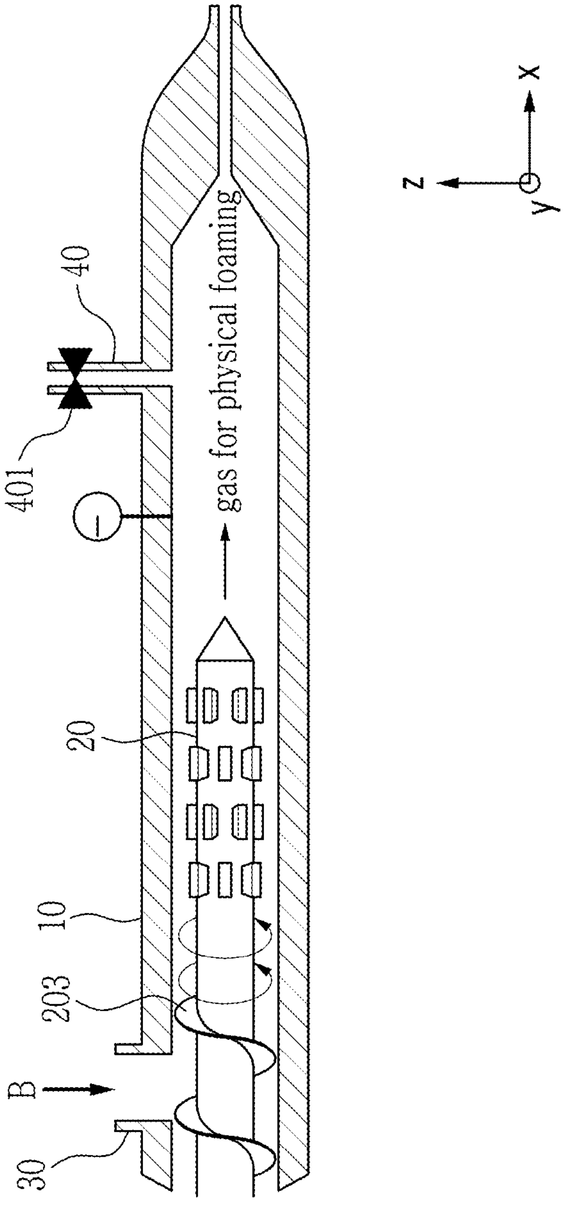

Next, as shown in FIG. 8, the rotating body 20 is moved in the x-axis direction while rotating in the direction of the arrow. The rotating body 20 moves toward a portion of the space in the barrel 10 filled with the gas for physical foaming. In this case, the valve 401 installed in the supply port 40 is closed, thereby the supply of the gas for physical foaming is stopped.

Figure 9:
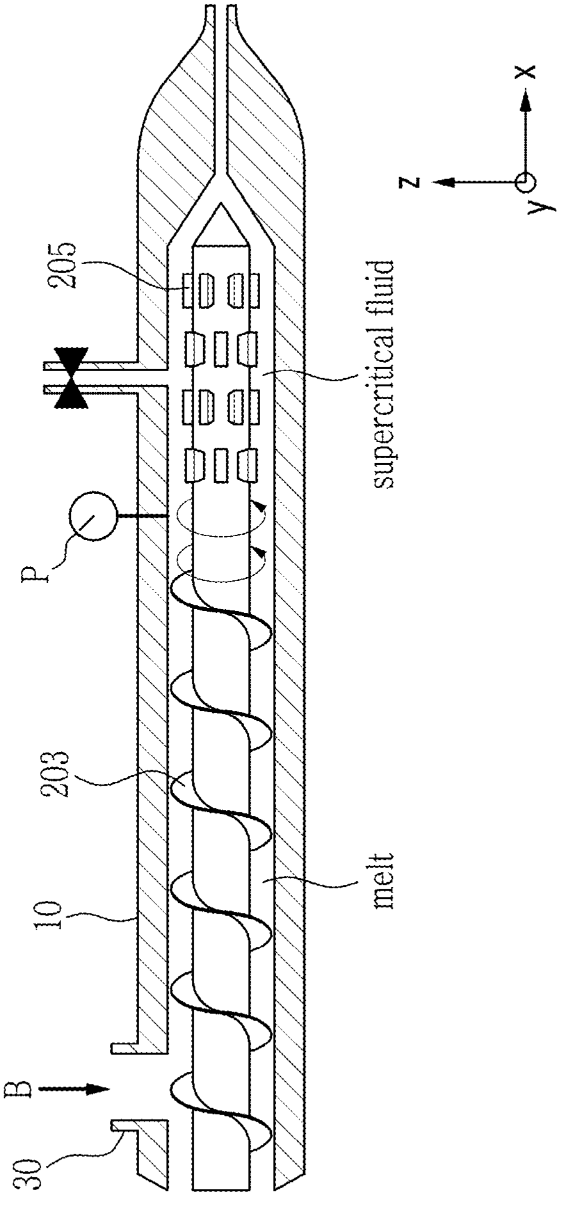

Referring back to FIG. 4, in the step of S50, the gas for physical foaming forms a supercritical fluid due to agitation of the rotating body 20 as shown in FIG. 9. To this end, the second screw 205 is rotated at a speed of 60 rpm to 80 rpm to allow the gas for physical foaming to be a supercritical fluid. If the rotating speed of the second screw 205 is too low, it is difficult to produce the supercritical fluid. Also, if the rotating speed of the second screw 205 is too high, the second screw 205 may be overloaded. Therefore, a rotation speed of the second screw 205 is adjusted to the range described above. By such an excessive rotation speed of the second screw 205, the gas for physical foaming can be converted into a supercritical fluid in the barrel 10.

On the other hand, due to the second screw 205 having a height lower than the height of the first screw 203, sufficient space between the inner wall of the barrel 10 and the second screw 205 is secured. The second screw 205 has a rectangular shape. As a result, supercritical fluid can be prepared by agitation of the second screw 205 in place. The resin beads B are continuously introduced to a portion corresponding to the first screw 203, thereby a melt is produced.

Figure 10:
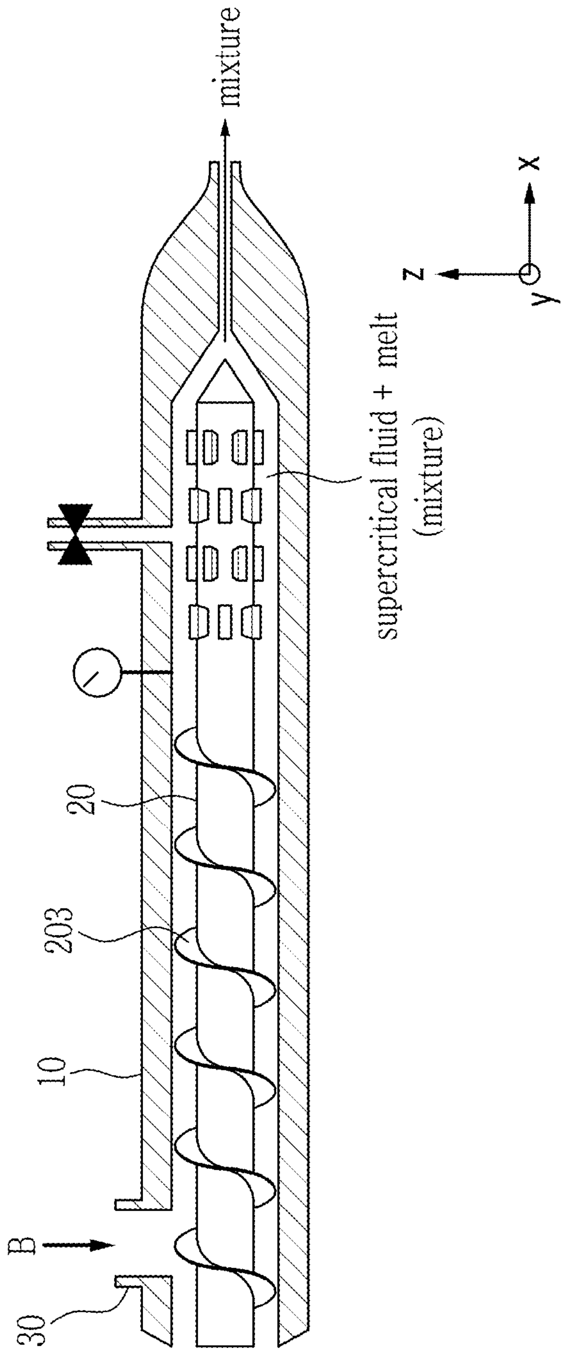

Next, in the step of S60 of FIG. 4, the melt passes through the supercritical fluid to provide a mixture in which the supercritical fluid is incorporated into the melt as shown in FIG. 10. That is, the rotating body 20 moves in the +x-axis direction while rotating. As a result, the melt is also transferred in the x-axis direction by the first screw 203 to provide a mixture mixed with the supercritical fluid. The supercritical fluid is a single phase, intermediate between a liquid and a gas, which has a good wettability, so it mixes well with the melt. By adjusting the amount of supercritical fluid appropriately, the supercritical fluid can be mixed well with the melt.

If the supercritical fluid is injected directly into the melt and mixed, the pressure in the barrel 10 may be uneven, causing the melt to flow out to the injection side of the supercritical fluid. Therefore, it is not only difficult to mix the supercritical fluid with the melt uniformly but also the stability of the process is harmed. Furthermore, since gas is generated as the melt is transferred forward, thereby the pressure of the gas may make it difficult to inject the gas directly into the melt. In contrast, in one embodiment of the present invention, the melt is naturally mixed with the supercritical fluid as it passes therethrough, so the aforementioned phenomena are less likely to occur.

In a conventional method, a supercritical fluid is prepared in a raw material reservoir to be injected, but the amount of supercritical fluid injected is limited, thereby production of high-foam resins is unsuitable. On the contrary, in one embodiment of the present invention, a supercritical fluid is prepared by injecting the gas for physical foaming into the barrel 10 and agitating it at a high speed. A mixture including the melt and the supercritical fluid is provided. Thus, a sufficient amount of gas for physical foaming can be injected into the mixture, which is suitable for manufacturing low-density members.

Figure 11:
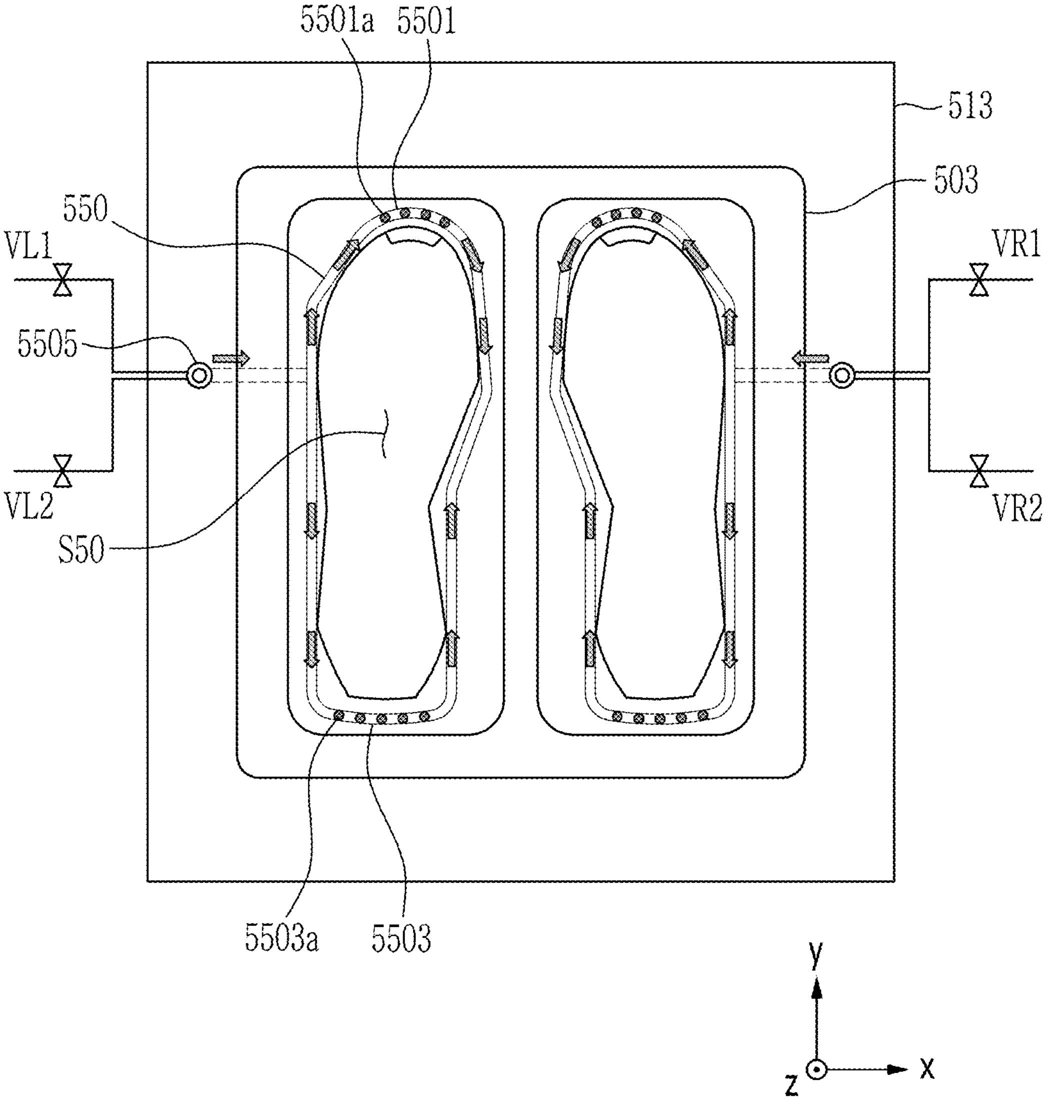
FIGS. 11 to 20 schematically show process for the physical foam injection sequentially in the mold of FIG. 3.

Referring back to FIG. 4, in the step of S70, gas is inhaled into the cavity formed by combining the upper mold part and the lower mold part to pressurize the cavity. This will be illustrated with reference to FIG. 11, in which the upper plane of the mold 50 of FIG. 3. That is, FIG. 11 is viewed from above in the xy plane direction, which is rotated by 90° for convenience. In FIG. 11, a length in the transverse direction means a length in the direction parallel to the x-axis, and a length in the longitudinal direction means a length in the direction parallel to the y-axis.

As shown in FIG. 11, the lower mold part 503 is formed with an intake and exhaust passage 550 surrounding the cavity S50. As shown by the arrows, gas is inhaled into the cavity S50 as it rotates therearound, and pressurizes the cavity S50. In this case, the cavity S50 is pressurized to be between 5 bar and 60 bar. The pressure in the cavity S50 is maintained in the aforementioned range to ensure suitable foaming of the mixture.

An external outlet 5505 is formed in the lower mold part 503 to draw gas into the intake and exhaust passage 550 or exhaust gas from the intake and exhaust passage 550. Along the longitudinal direction of the cavity S50, that is, the y-axis direction, both ends of the intake and exhaust passage 550 include a top end 5501 and a bottom end 5503, respectively. At the top end 5501, an intake and exhaust hole 5501*a* is formed to be in communication with the cavity S50. In addition, the bottom end 5503 has intake and exhaust holes 5503*a* to be in communication with the cavity S50. In a low-density member formed in the cavity S50, for example in the case of manufacturing a shoe sole, upper part thereof is formed thinner than that of a lower part. The exhaust of gas induces foaming of the mixture injected into the cavity S50, thereby an intake pressure is increased to form the lower part thereof thicker. Therefore, the number of intake and exhaust holes 5503*a* in the lower mold part 5503 is set to be five, while the number of intake and exhaust holes 5501*a* in the upper mold part 5501 is set to be four, so that the number of intake and exhaust holes 5503*a* is controlled to be greater than the number of intake and exhaust holes 5501*a*. As a result, the exhaust pressure through the intake and exhaust holes 5503*a* is greater than the exhaust pressure through the intake and exhaust holes 5501*a*, so that a shoe sole having a shape in which the lower part thereof is thicker than the upper part thereof can be manufactured.

Inhaling and exhausting is accomplished through valves VL1, VL2, VR1 and VR2. The valves VL1, VL2, VR1 and VR2 are connected to an intake and exhaust passage 5503 corresponding to the longitudinal length of the cavity S50. Thus, it is possible to intake and exhaust the cavity S50 while maintaining a uniform pressure distribution in the cavity S50.

As shown in FIG. 11, two valves each on the left and right are in communication with the external outlet 5505. The pressure in the cavity S50 can be controlled by opening the valves VL1 and VR1 first and then opening the valves VL2 and VR2 during exhaust. That is, the valves VL1 and VR1 are opened first and then the valves VL2 and VR2 are opened after 0.5 to 1 second. Thus, a low-density member with uniform foaming can be manufactured by a stable injection process.

The opening of the valves VL1 and VR1 may be smaller than the opening of the valves VL2 and VR2. That is, if the cavity S50 is suddenly depressurized, the injection quality may become uneven. Therefore, the opening of the valves VL1, VR1 is controlled to be relatively small while the opening of the valves VL2, VR2 is controlled to be relatively large. The opening is defined as the ratio of the 100% open area of the valves to the partially open area. The opening of the valves VL1 and VR1 may be 20% to 40%. Furthermore, the opening of the valves VL2 and VR2 may be 50% to 70%. By adjusting the opening of the valves VL1, VR1, VL2 and VR2 in this way, a low-density member with uniformly good foaming can be manufactured.

Figure 12:
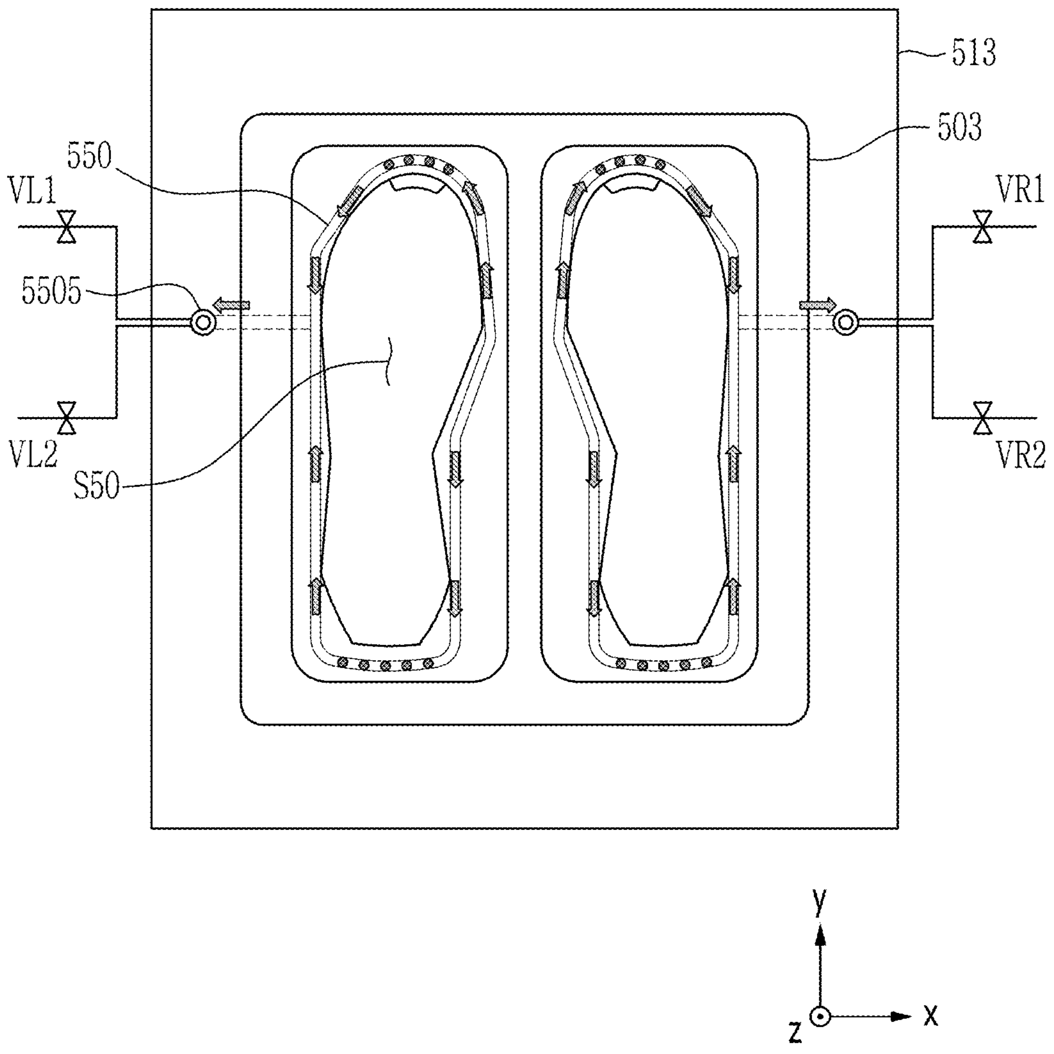

In the step of S80 of FIG. 4, the mixture M is injected into the cavity S50 while foaming the mixture M within the cavity S50 as shown in FIG. 12. The mixture M begins to be injected through the injection gate 505 shown in FIG. 3. The mixture M is injected at three positions disposed along the longitudinal length of each cavity S50.

In the step of S80, the steps of injecting the mixture and delaying the injection of the mixture can be repeated. That is, the mixture can be injected in multiple stages. Table 1 below shows an example of a multi-stage injection process with not only one stage, but also two to four stages. The multi-stage injection process is continuous for each stage, without interruptions.

TABLE 1

| No | Injection variables (unit) | 4th | 3rd | 2nd | 1st |
|---|---|---|---|---|---|
| 1 | speed (mm/s) | — | — | — | 50 |
| | pressure (MPa) | — | — | — | 120 |
| | distance (mm) | — | — | — | 5 |
| 2 | speed (mm/s) | — | — | — | 120 |
| | pressure (MPa) | — | — | — | 120 |
| | distance (mm) | — | — | — | 5 |
| 3 | speed (mm/s) | — | — | 150 | 100 |
| | pressure (MPa) | — | — | 120 | 120 |
| | distance (mm) | — | — | 5 | 80 |
| 4 | speed (mm/s) | — | — | 100 | 50 |
| | pressure (MPa) | — | — | 120 | 100 |
| | distance (mm) | — | — | 5 | 80 |
| 5 | speed (mm/s) | — | 150 | 100 | 50 |
| | pressure (MPa) | — | 120 | 120 | 100 |
| | distance (mm) | — | 5 | 45 | 80 |
| 6 | speed (mm/s) | — | 50 | 100 | 150 |
| | pressure (MPa) | — | 120 | 120 | 150 |
| | distance (mm) | — | 5 | 45 | 80 |
| 7 | speed (mm/s) | 10 | 50 | 100 | 150 |
| | pressure (MPa) | 120 | 120 | 120 | 120 |
| | distance (mm) | 5 | 10 | 25 | 80 |
| 8 | speed (mm/s) | 150 | 100 | 50 | 20 |
| | pressure (MPa) | 120 | 120 | 100 | 80 |
| | distance (mm) | 5 | 10 | 25 | 80 |

As described in Table 1, the mixture can be injected by controlling the injection speed, injection pressure, and injecting distance as variables. Here, the injecting distance refers to the advancing distance from the end of the screw in FIG. 23 to a feeding start position of the mold on the right. The metering is set to start at 90 mm from the mold feed start position, so the injecting distance in Table 1 represents the distance advanced to the right from the 90 mm point. The total moved distance is 85 mm in all cases, which is done divided by first to fourth step. As shown in Table 1, a single injection of the mixture is possible such as Nos. 1 and 2, while a multi-stage injection of the mixture in two batches, such as Nos. 3 and 4. In this case, the injection speed is increased in the second stage compared to the first stage, but the injection pressure is maintained at or above the first stage. Since the screw has been advanced to some extent in the first stage, so it is advanced only to a point of 5 mm whose injecting distance is less in the second stage than in the first stage.

On the other hand, in Nos. 5 and 6, the mixture can be injected in three stages. In this case, the injection speed can be gradually increased or gradually decreased. The injection pressure can be kept the same or gradually increased. Since the screw is advanced to some extent in the first stage, it moves less in the second and third stages, and the third stage injecting distance is less than the second stage injecting distance.

In Nos. 7 and 8, the mixture can be injected in multiple stages of divided four parts. In this case, the injection speed and injection pressure can be gradually increased or gradually decreased. As described above, the injecting distance moves less as the screw is advanced to some extent in the first stage, and then to the second, third, and fourth stages, with the third stage injecting distance being less than the second stage injecting distance, and the fourth stage injecting distance being less than the third stage injecting distance.

As mentioned above, the mixture can also be injected in multiple stages by controlling injection speed, injection pressure, and injecting distance. On the other hand, the mixture can also be injected in multiple stages by controlling the opening, delay operating time for the opening of the injection gate 505 as shown in FIG. 3.

The mixture may be injected into the cavity S50 at a pressure of 3 MPa to 300 MPa. If the injection pressure is too low, the mixture may not be injected well. Furthermore, the injection pressure cannot be too high due to the process design.

On the other hand, the depressurization of the cavity S50 in the step of S80 and the injection of the mixture in the step of S90 may occur simultaneously. Alternatively, the injection of the mixture in the step S90 may be performed first, followed by the depressurization of the cavity S50 in the step S80. For example, the cavity S50 may be pressurized to 10 bar to 50 bar and then depressurized. More preferably, the cavity S50 may be pressurized to 10 bar to 20 bar. If the pressing force is too high or too low, it may be difficult to obtain a suitable counter pressure optimized for foaming of the mixture. Therefore, the pressurization of the cavity S50 is kept in the range described above.

The amount of decrease in the injection pressure of the mixture over time at the time of injection of the mixture may be substantially equal to and that of evacuation of the gas over time at the time of evacuation of the gas. As a result, a low-density member of uniform quality can be manufactured.

After the mixture is injected, the rotating body 20 as shown in FIG. 2 is retracted again and the process starting from the step S30 is repeated in turn. Simultaneously with the start of the retraction of the rotating body 20, step S40 proceeds so that the gas for physical foaming can be provided directly. In addition, the gas for physical foaming may be stopped upon finishing of the retraction of the rotating body 20.

Figure 20:
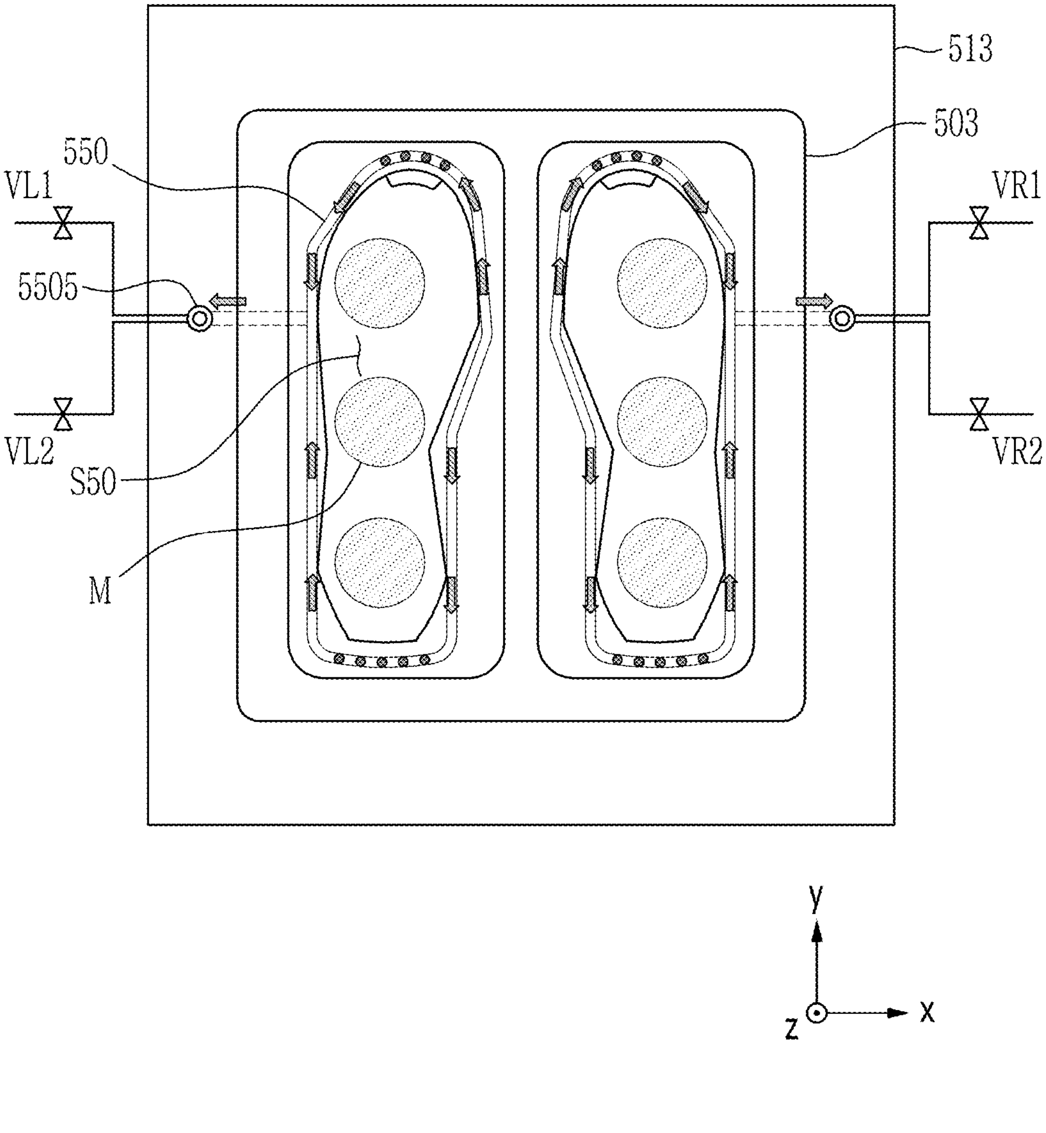

In the step of S90, the cavity is depressurized by evacuating the gas as shown in FIG. 20. That is, the gas is drawn in through the external outlet 5505. As a result, the gas moves in the direction denoted by the arrow and exits through the external outlet 5505, thereby the cavity S50 is depressurized. The gas is exhausted in multiple stages. As a result, a negative pressure is formed in the cavity S50 to be a vacuum-like condition due to a rapid pressure drop.

In the step of S90, the decompression is performed in multiple stages. That is, decompression delay and decompression can be mixed with each other using valves. Foaming with multi-stage decompression can improve a surface of the low-density member, increase its uniformity, and precisely control the cell structure thereof. On the other hand, decompression without a delay has a limit for foaming a low-density member. Therefore, it is preferable to perform a multi-stage decompression of the cavity by delaying the evacuation of the cavity and the evacuation thereof. For example, the step of delaying the evacuation of the gas may be performed for 0.05 second to 2 second. More preferably, the delayed evacuation of the gas may be performed for 0.1 second to 1 second. If the evacuation delay of the gas is too short, it is difficult to achieve efficient multi-stage decompression. Also, if the evacuation delay of the gas is too long, it is difficult to achieve efficient foaming of the low-density member. Therefore, the evacuation delay time of the gas is adjusted to the range described above.

For example, decompression can be accomplished in the manner shown in Table 2 below. Here, the valves VL1, VL2, VR1 and VR2 of FIG. 12 can be adjusted to control the delay time and operating time of the decompression after injection.

TABLE 2

| No. | valves used | delay time from injection signal (sec) | operating time from injection signal (sec) |
|---|---|---|---|
| 1 | LV1, RV1 | 0.1 | 10 |
| | LV2, RV2 | 0.3 | 10 |
| 2 | LV1, RV1 | 0.1 | 0.3 |
| | LV2, RV2 | 0.6 | 10 |
| 3 | LV1, RV1 | 0.1 | 0.3 |
| | LV2, RV2 | 0.3 | 10 |

No. 1 in Table 2 is the case where valves LV1, RV1 and LV2, RV2 have different opening times but the same closing times. More specifically, the valves LV1 and RV1 open 0.1 second after the injection signal is generated (0.1 second delay) The valves LV2 and RV2 open 0.3 second after the injection signal is generated. (0.3 second delay) All valves LV1, LV2, RV1 and RV2 are then opened until 10 second after the injection signal is generated. No. 2 in Table 2 is the case where valves LV1, RV1 and valves LV2, RV2 open at different times, and no decompression occurs from 0.3 to 0.6 second after the start of decompression. More specifically, the valves LV1, RV1 are opened 0.1 second after the injection signal (0.1 second delay) and operate until 0.3 second from the injection signal is generated. Meanwhile, the valves LV2, RV2 open 0.6 second after the injection signal is generated. After that, they open until 10 second from the injection signal is generated. Therefore, there is a period from 0.3 to 0.6 second after the injection signal where no decompression occurs.

In Table 2, No. 3, unlike No. 2, there is no period for stop after the decompression starts. The valves LV1 and RV1 open from the injection signal to 0.3 second, and immediately afterward, the delayed valves LV2 and RV2 open from the injection signal to 10 second. However, the end times of the operation of the valves LV1, RV1 and the valves LV2, RV2 are 0.3 second and 10 second from the injection signal, respectively, which are different from each other. In other words, the output can be the same as using either pair of valves LV1, RV1 and LV2, RV2, but it is desirable that the output can be different depending on the time.

FIGS. 13 to 19 are graphs of injection speed and decompression speed showing various decompression speeds. In FIGS. 13 to 19, the injection rate is shown as a thin solid line while the decompression rate is shown as a bold solid line. Injection velocity refers to the injecting distance per second that the end moves along the right-hand side for injection after metering in FIG. 23, the units of which are omitted for convenience.

Figure 13:
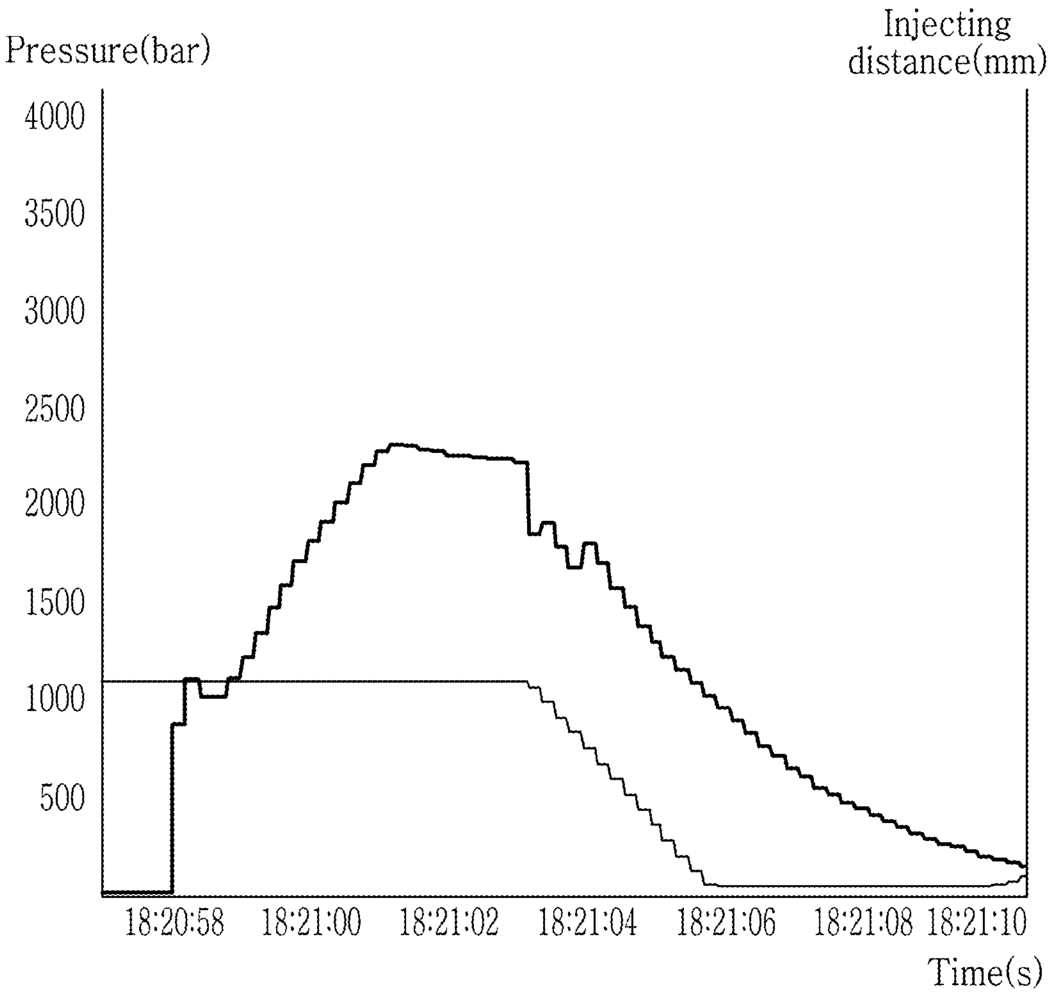

The graph in FIG. 13 shows a case where decompression is initiated during injection. Valves LV1 and RV1 have an output of 20%, respectively while valves LV2 and RV2 have an output of 30%. Valves LV1 and RV1 open 0.1 second after the injection signal is generated. In addition, the valves LV2 and RV2 open 0.3 second after the injection signal is generated. Valves LV1, LV2, RV1 and RV2 will all open until 10 second after the next injection signal is generated.

Figure 14:
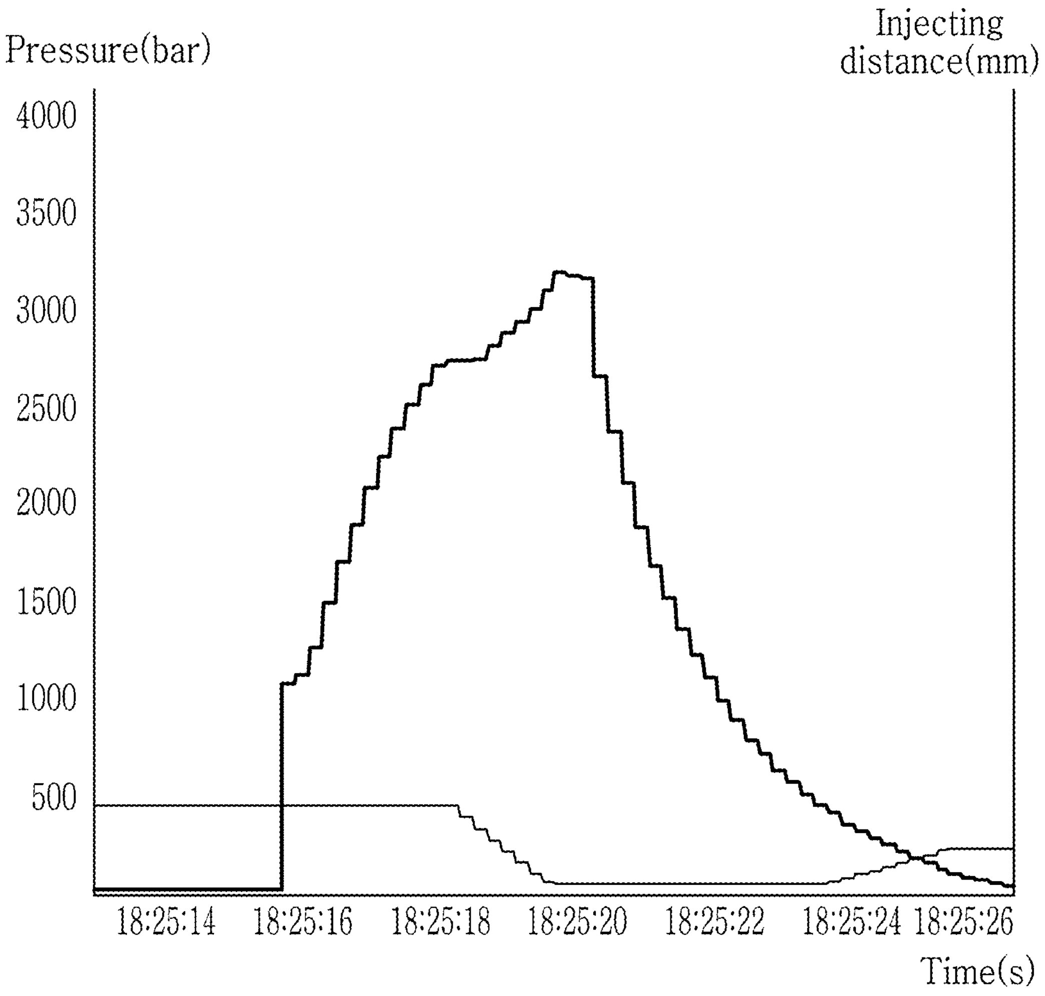

The graph in FIG. 14 shows the case where decompression is started after injection is complete. The valves LV1, LV2, RV1 and RV2 all have an output of 35%. Valves LV1, LV2, RV1 and RV2 all open 2 second after the injection signal is generated. Then, valves LV1, LV2, RV1, and RV2 are all open until 10 second after the injection signal is generated. Since the opening times of the valves LV1, LV2, RV1, and RV2 are all the same, FIG. 14 shows a sharp increase in the decompression rate compared to FIG. 13. However, since the decompression occurs after the injection is complete, this method is efficient for fast foaming.

Figure 15:
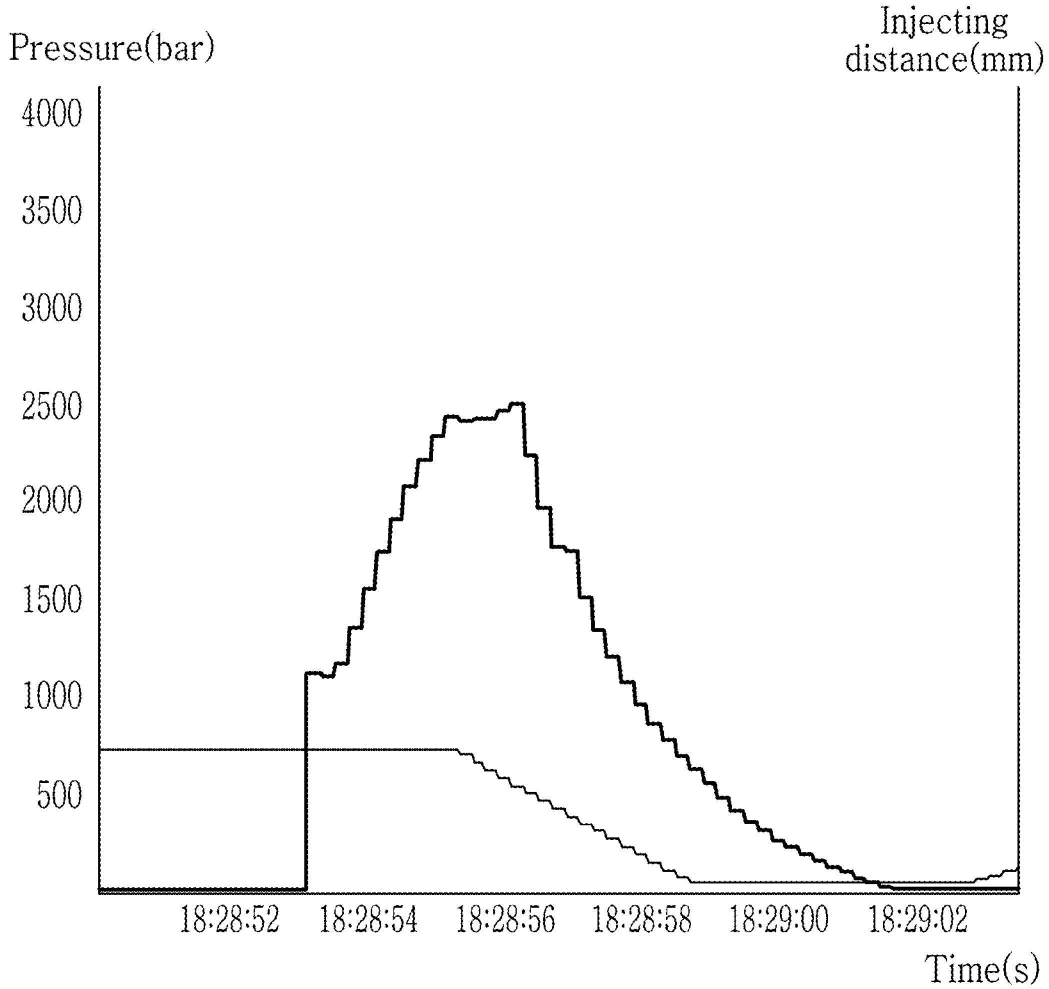

The graph in FIG. 15 shows a case where decompression is initiated during injection. Valves LV1 and RV1 have an output of 35%, respectively while valves LV2 and RV2 have an output of 40%. Valves LV1 and RV1 open 1 second after the injection signal is generated. In addition, the valves LV2 and RV2 open 1.2 second after the injection signal is generated. Valves LV1, LV2, RV1 and RV2 all open at subsequent injection signals until 10 second after the injection signal is generated. As shown in FIG. 15, since the valves LV1, RV1 and RV1 are opened sequentially, the decompression rate is not significantly increased compared to FIG. 14.

Figure 16:
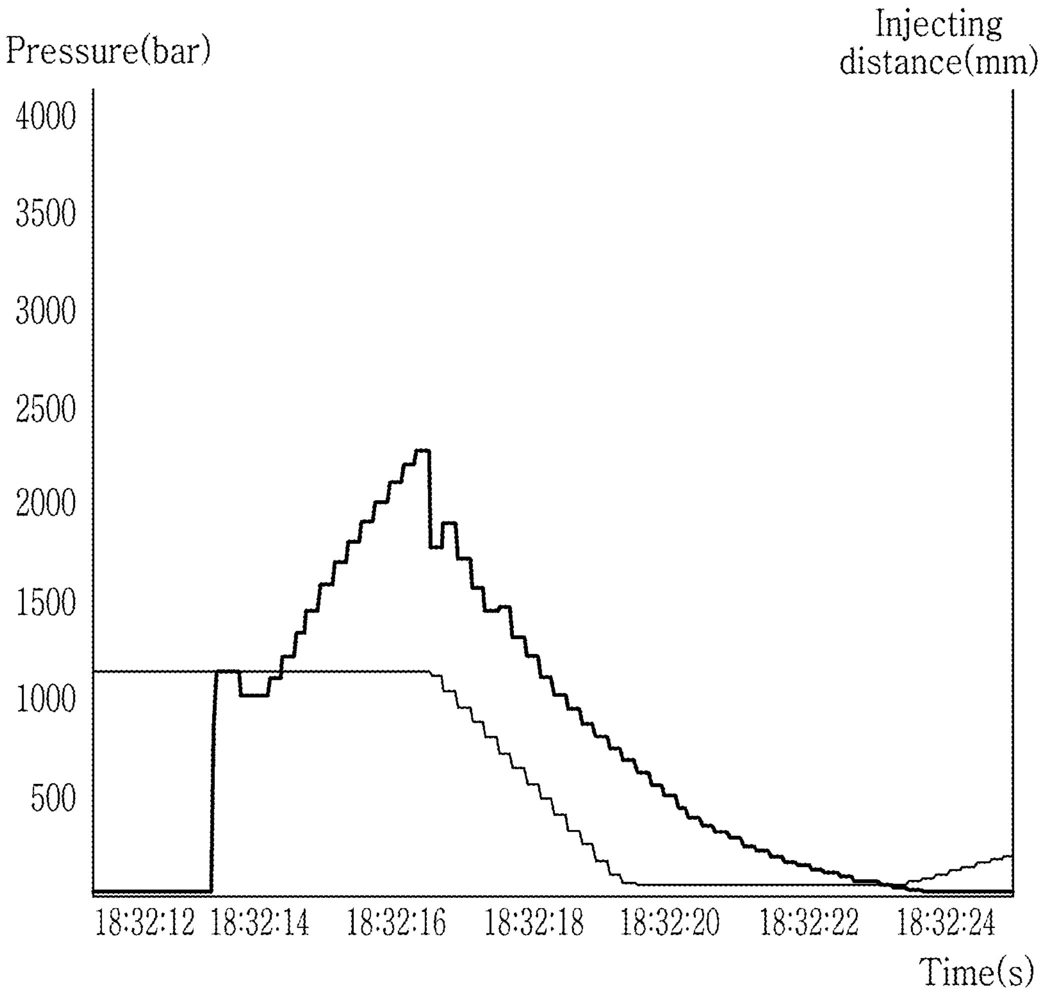

The graph in FIG. 16 shows a case where decompression was initiated during injection. The valves LV1, LV2, RV1 and RV2 all had an output of 30%. The valves LV1, LV2, RV1 and RV2 all open 0.1 second after the injection signal is generated. Then, valves LV1, LV2, RV1, RV2 all open until 10 second after the injection signal is generated. Since the valves LV1, LV2, RV1 and RV2 all open at the same time, the decompression rate increases rapidly.

Figure 17:
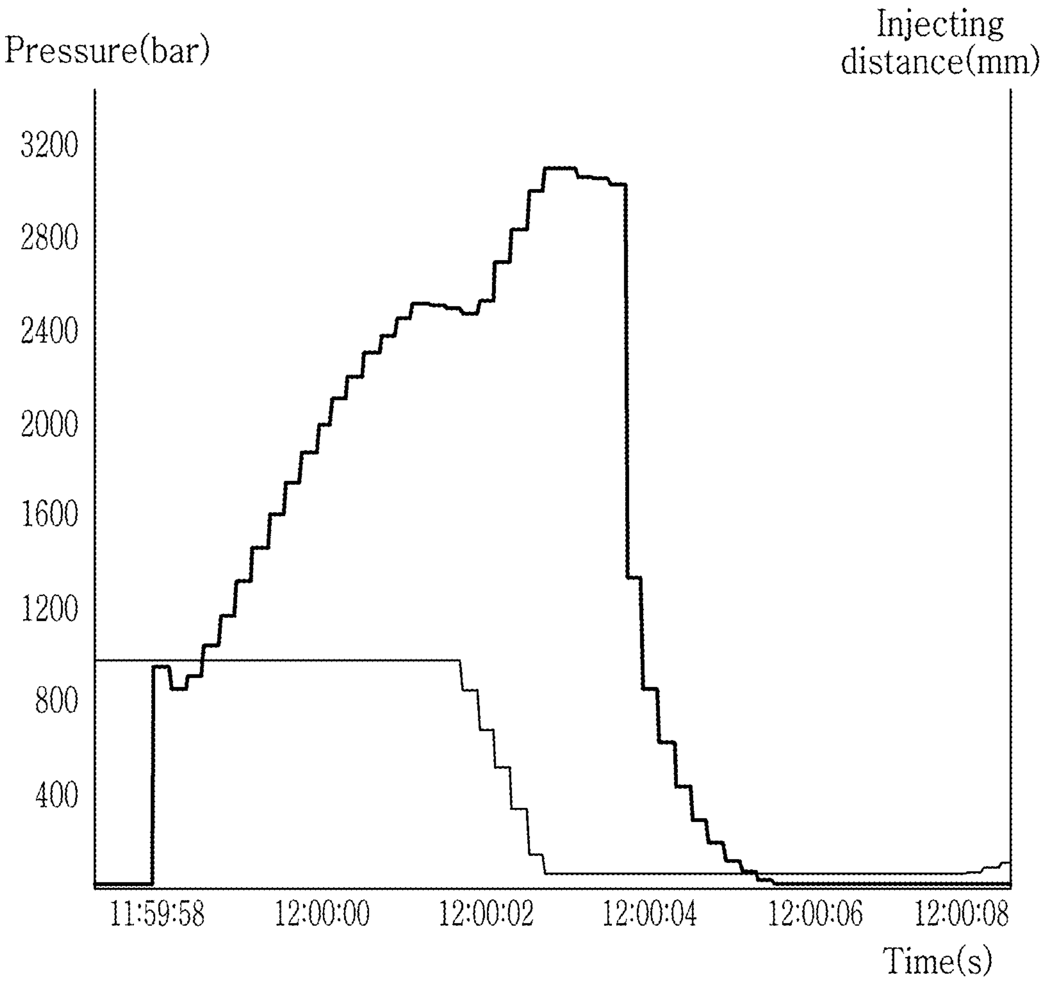

The graph in FIG. 17 shows the case where decompression is started after injection. Valves LV1 and RV1 have outputs of 26%, respectively while valves LV2 and RV2 have outputs of 33% and 50% respectively. Valves LV1 and RV1 open 0.1 second after the injection signal is generated. In addition, valves LV2 and RV2 open 0.3 and 2.0 second, respectively after the injection signal is generated. Valves LV1 and RV1 are open until 0.3 second after the injection signal is generated, and valves LV2 and RV2 are open until 10 second after the injection signal is generated. The horizontal line at the top of FIG. 17 is created because the valves LV1, LV2, RV1 and RV2 are all closed from 0.3 second to 2.0 second to stop the decompression.

Figure 18:
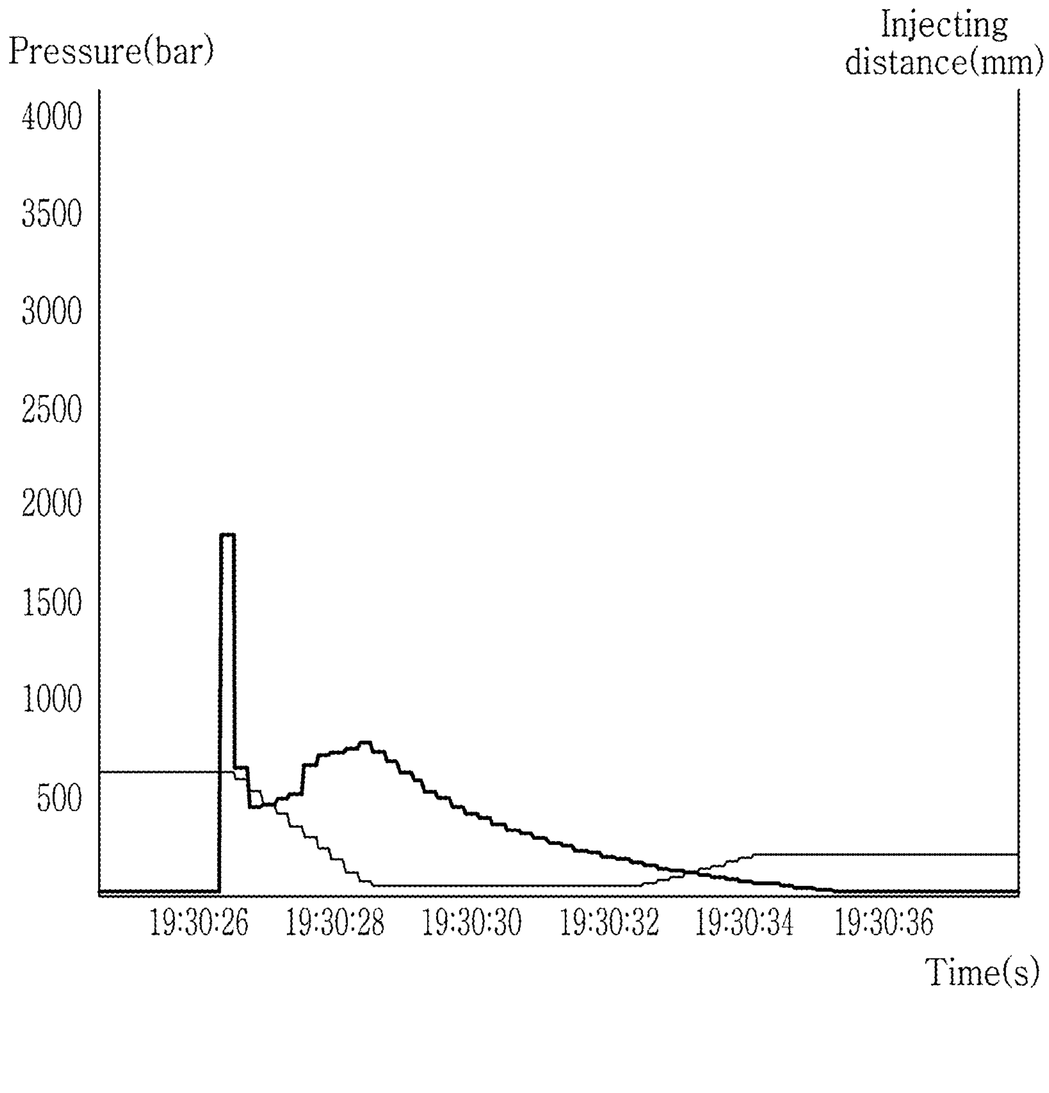

The graph in FIG. 18 shows the case where decompression starts after injection. Valves LV1 and RV1 have an output of 50%, respectively while valves LV2 and RV2 have an output of 35%, respectively Valves LV1 and RV1 open 0.1 second after the injection signal is generated. In addition, valves LV2 and RV2 open 1.0 second after the injection signal is generated, respectively. Valves LV1 and RV1 are open until 0.2 second after the injection signal is generated, and valves LV2 and RV2 are open until 10 second after the injection signal is generated. The horizontal line at the bottom of FIG. 18 is created because the valves LV1, LV2, RV1 and RV2 are all closed for a short period from 0.2 second to 1.0 second to stop the decompression.

Figure 19:
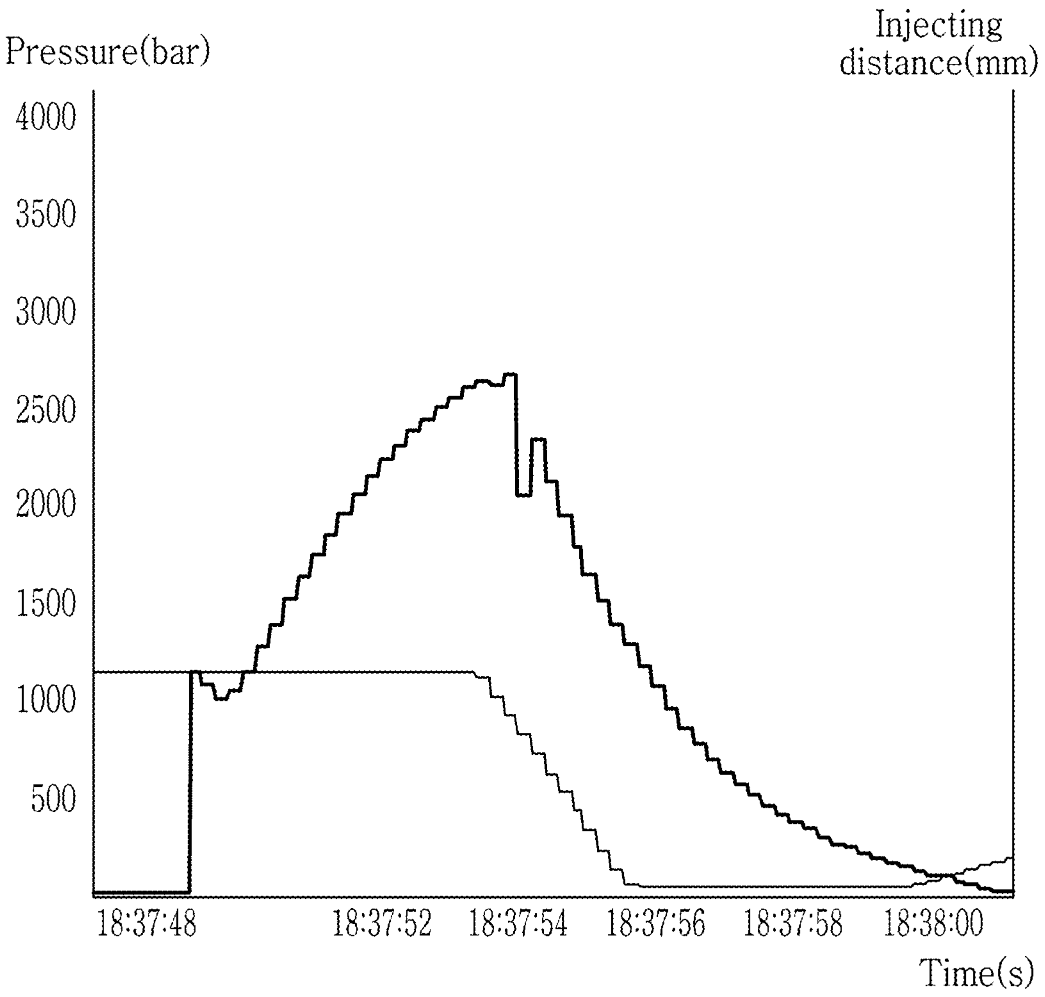

The graph in FIG. 19 shows a case where decompression is initiated during injection. Valves LV1 and RV1 have an output of 40%, respectively while valves LV2 and RV2 have an output of 30%, respectively. Valves LV1 and RV1 open 0.1 second after the injection signal is generated. In addition, valves LV2 and RV2 open 0.3 second after the injection signal is generated, respectively. All valves LV1, LV2, RV1 and RV2 will open until 10 second after the next injection signal.

Referring back to FIG. 4, finally, in the step of S100, the upper mold part and the lower mold part are separated from each other to take out the foamed low-density member LD as shown in FIG. 20. The low-density member LD with a well-foamed surface can be manufactured. The low-density member LD with density of a 0.1 g/cc to 0.5 g/cc can be a relatively large volume, lightweight shoe, shoe sole, automobile interior. The density of the low-density member cannot be smaller due to design limitations. In addition, the density of the low-density member cannot be too large due to the nature of the product, which must be elastic. Therefore, the density of the low-density member is kept in the range described above.

Figure 21:
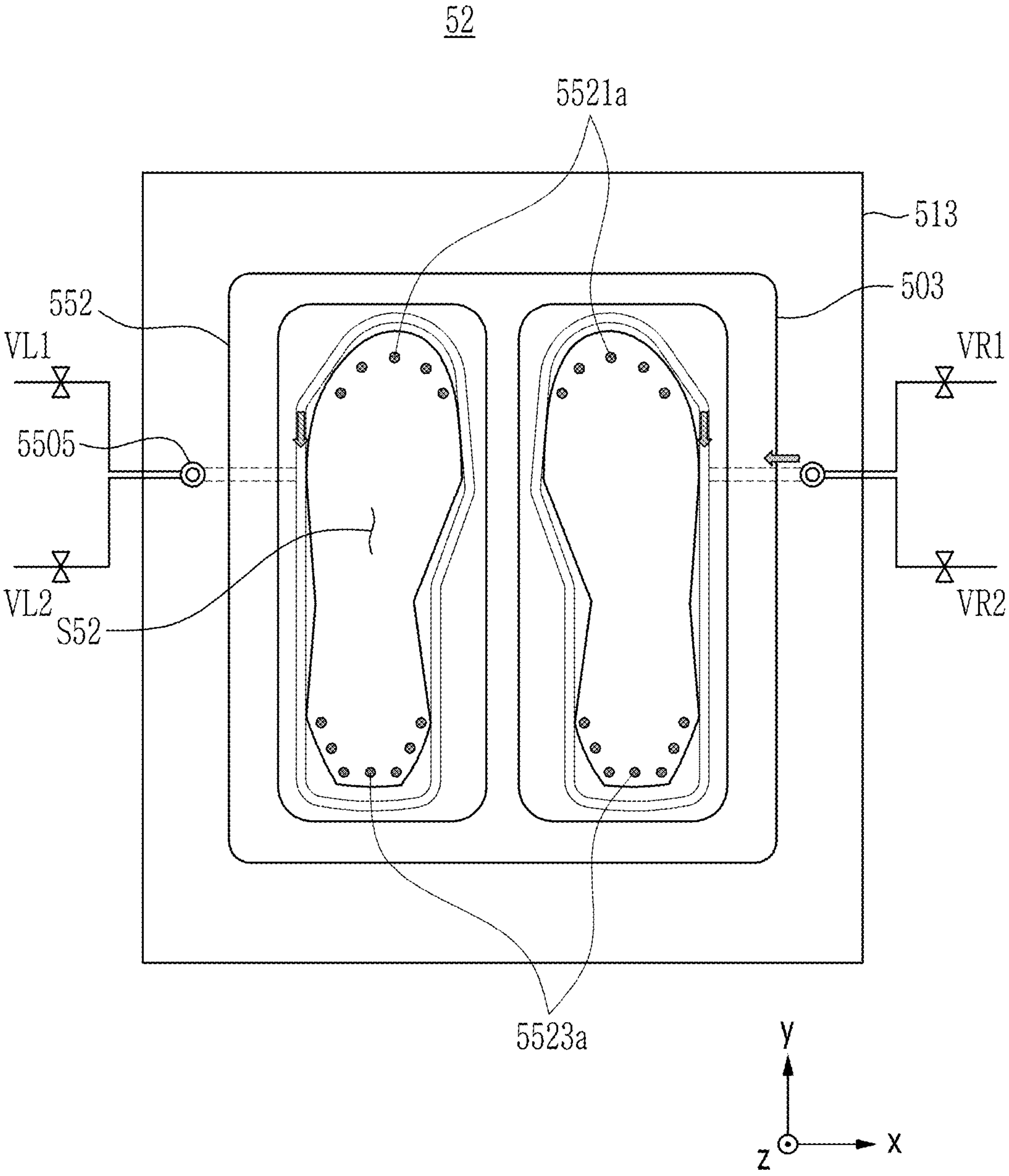
FIG. 21 is a schematic partial plan view of another mold included in the physical foam injection device of FIG. 1.

FIG. 21 schematically shows a partial plan view of another mold 52 included in the physical foam injection system of FIG. 1. Since the mold 52 of FIG. 21 is similar to the mold 50 of FIG. 11, detailed description thereof will be omitted. The intake and exhaust holes 5521*a* and 5523*a* are formed along the longitudinal direction of the mold 52 in the upper and lower portions of the cavity S52, respectively. Since the lower part of the shoe sole formed in the cavity S52 is thicker than the upper part of the shoe sole, the diameter of the intake and exhaust hole 5523*a* is greater than the diameter of the intake and exhaust hole 5521*a*, thereby the amount of inhaled gas is increased. As a result, the mixture located in the lower part of the cavity S52 foams well, thereby a low-density member with a thick lower part can be manufactured.

Figure 22:
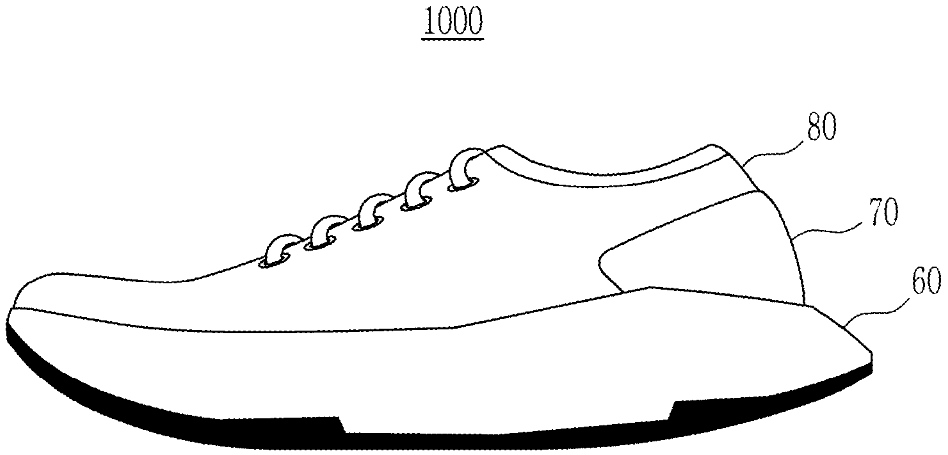
FIG. 22 schematically shows a shoe including a shoe sole manufactured by the physical foam injection method of FIG. 4.

FIG. 22 schematically shows a shoe 1000 including a low-density member manufactured by the physical foam injection method of FIG. 4. The low-density member in FIG. 22 is merely to illustrate the present invention and the present invention is not limited thereto. Therefore, the low-density member may be formed in other forms.

In the physical foaming injection method according to one embodiment of the present invention, no crosslinking agent is used. Therefore, the by-products obtained from the resin beads can be recovered to be reused. Furthermore, the by-products obtained in the aforementioned step can be recovered and crushed to provide a crumb. The shredded material can also be manufactured into a rigid plastic member by hot extrusion.

The shoe 1000 of FIG. 22 is manufactured by recycling by-products recovered from the physical foam injection method described above. For example, the low-density member may be a shoe sole. The by-products from the manufacturing of the shoe sole is shredded and hot-extruded to make the shoe heel support 70. The foam has thermoplastic properties, meaning that it can be reused. For example, the foam can be shredded and melted to be reused. The shoe heel support 70 is attached to the upper 80 and provided over the shoe sole. In other words, the shoe heel support 70 can be manufactured to have a higher strength than that of the shoe sole, which is a low-density member 60.

The invention will be explained in more detail by way of Exemplary Examples. These Exemplary Examples are intended only to illustrate the invention and are not limited thereto.

EXEMPLARY EXAMPLES

The shoe sole was prepared by the physical injection method of FIG. 4 described above. Table 3 shows the details of the resin beads used in the Exemplary Examples of the present invention.

TABLE 3

| Resin beads | Grade | Hardness | Manufacturer |
|---|---|---|---|
| PEBA | Pebax 40R53 | Shore 39D | Arkema |
| TPEE | Hytrel 40F3 | Shore 35 ± 2D | Dupont |
| TPU | R185A-30 VT1 | Shore 85A | Lubrizol |

As shown in Table 3, resin beads of three different materials were used: polyether block amide (PEBA), thermoplastic polyester elastomer (TPEE), and thermoplastic polyurethane (TPU). Table 3 shows the grades and hardness of the resin beads.

Experiment of Gas Supply for In-Barrel Physical Foaming

The PEBA in Table 3 was used as resin beads to produce low-density members. The resin beads were provided in the barrel, and experiments were conducted by varying the timing of the introduction of the resin beads and the gas for physical foaming.

Exemplary Example 1

The screw was only advanced to a position 5 mm from the starting position of the mixture for being transferred to the mold. Further advancement would have resulted in the screw touching the inner wall of the barrel and breaking it, so the advance of the screw was limited. The process is described below in terms of the separation distance of the mixture from the starting position of the mixture for being transferred to the mold denoted by mm. When the end of the screw is located at 15 mm, a 10 mm long space is formed, so gas for physical foaming was supplied to this space to form a gas pocket. Then, the resin beads were continuously advanced by the screw to produce a mixture that was uniformly mixed with the gas for physical foaming. The mixture was injected into the mold and counter-pressure injected to produce the shoe sole. The temperature of the injection gate was 190° C., the temperature of mold was 20° C., the injection speed was 120 mm/s, the injection pressure was 140 MPa, and the gas pressure supplied to the injection gate was 110 bar. Since the injection process requires a precise amount of mixture to be provided, metering of the mixture was necessary. The metering is done as the screw retracts. That is, the distance the screw retracts is measured relative to the starting position of the mixture for being transferred to the mold. This is shown in FIG. 23.

Figure 23:
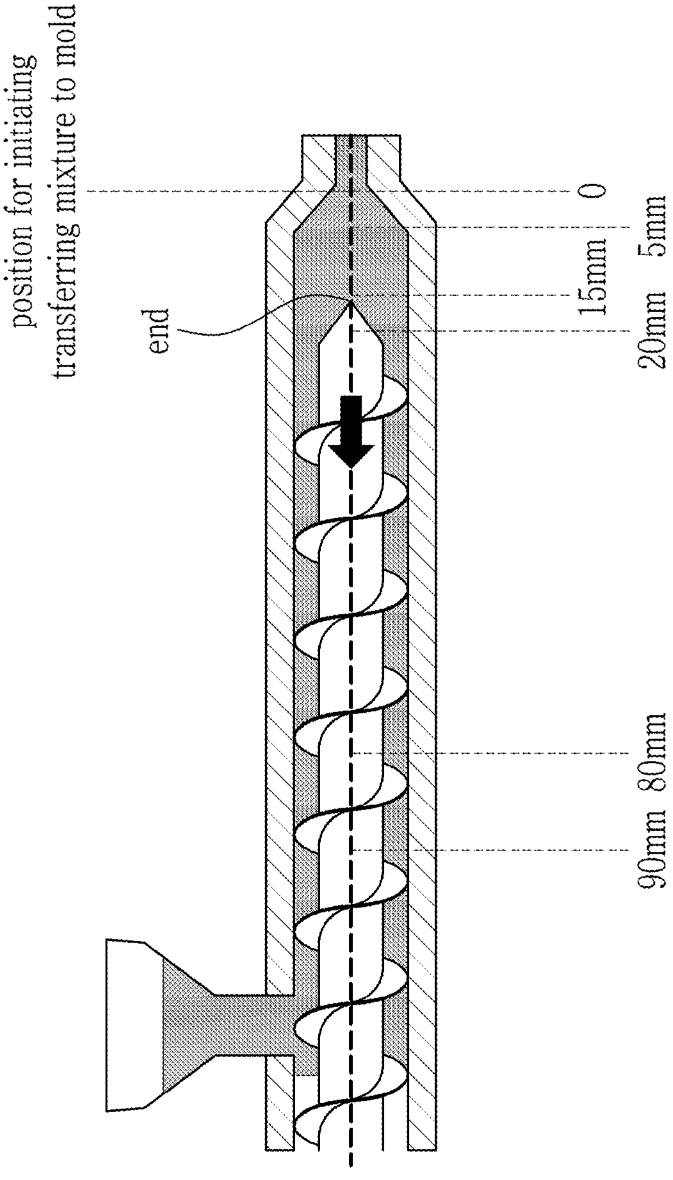
FIG. 23 schematically shows a measurement reference point on a barrel in experimental examples of the present invention.

FIG. 23 schematically illustrates a metering position on a barrel relative to a starting position of the mixture for being transferred to the mold according to the Exemplary Examples of the present invention and Comparative Examples. Since the injection position of the physically foamed gas varies according to the experimental and comparative examples, drawing thereof is omitted. Also, in order to fully illustrate the Exemplary Examples of the present invention and comparative examples, a barrel of a general structure is shown, and the illustration of the supply position of the foaming gas is omitted for convenience, but it is located before the resin beads.

As shown in FIG. 23, the metering start position was 15 mm, the gas supply opening position was 5 mm, the gas supply closing position was 15 mm, and the metering finishing position was 90 mm. Between the metering start position and the gas supply opening position, only resin beads are supplied, and between the gas supply opening position and the gas supply closing position, a mixture of resin beads and gas for physical foaming exist. However, in the Exemplary Example, the gas supply opening position was 5 mm, so the supply of gas for physical foaming started immediately after the screw was retracted. This is possible because supply port for the gas for physical foaming located close to the starting position of the mixture for being transferred to the mold. When the screw was retracted to 15 mm, the supply of the gas for physical foaming was stopped and metering was started. Thus, there was a 10 mm gas loading space in front of the screw, into which the screw was advanced for injection of the mixture Under the counter pressure condition acting on the mold, the input pressure before injection was 20 bar, and the output at the evacuation caused by injection was 30%. The output means an opening of the exhaust valve. Since the rest of experimental conditions can be easily understood by a skilled in the art to which the present invention belongs, a detailed description thereof is omitted.

Comparative Example 1

The resin beads and the gas for physical foaming were mixed immediately after starting the metering in the barrel. The rest of the experimental conditions were the same as in Example 1 except that no gas was loaded, the metering start position was 5 mm, the gas supply closing position was 80 mm, and the metering finishing position was 80 mm.

Comparative Example 2

The resin beads and gas for physical foaming were mixed at the beginning of the measurement in the barrel. At 80 mm, the supply of gas for physical foaming was stopped, and only resin beads were supplied during metering from 80 mm to 90 mm. The rest of the experimental conditions were the same as those in Comparative Example 1 above.

Comparative Example 3

After the resin beads were metered and supplied, the resin beads and gas for physical foaming were mixed. The gas supply was then cut off and only the resin beads were metered up to 90 mm. The rest of the experimental conditions were the same as those in Comparative Example 1 above, except that the gas supply opening position was 10 mm.

Comparative Example 4

The gas supply opening was 20 mm. The rest of the experimental conditions were the same as those in Comparative Example 3 above.

Comparative Example 5

The gas supply opening was 30 mm. The rest of the experimental conditions were the same as those in Comparative Example 3 above.

Experimental Results of Gas Supply Environment for In-Barrel Physical Foaming

The experimental results according to Exemplary Example 1 and Comparative Examples 1 to 5 above are shown in Table 4 below. The metering sections described above are also shown in Table 4 below.

TABLE 4

| | Metering section | | | |
|---|---|---|---|---|
| Exemplary Example/ Comparative Example | Separately supplying gas for physical foaming | Metering only resin beads | Metering resin beads + gas for physical foaming | Quality of shoe sole |
| Exemplary Example 1 | 10 mm | — | — | Good |
| Comparative Example 1 | — | 0 | 5-80 mm | Not good |
| Comparative Example 2 | — | 80-90 mm | 5-80 mm | Not good |
| Comparative Example 3 | — | 5-10 mm, 80-90 mm | 10-80 mm | Not good |
| Comparative Example 4 | — | 5-20 mm, 80-90 mm | 20-80 mm | Not good |

TABLE 4-continued

| | Metering section | | | |
|---|---|---|---|---|
| Exemplary Example/ Comparative Example | Separately supplying gas for physical foaming | Metering only resin beads | Metering resin beads + gas for physical foaming | Quality of shoe sole |
| Comparative Example 5 | — | 5-30 mm, 80-90 mm | 30-80 mm | Not good |

More specifically, the results of checking quality of the shoe soles according to Exemplary Example 1 and Comparative Examples 1 to 5 in Table 4 are as follows.

Experimental Results of Exemplary Example 1

Figure 24:
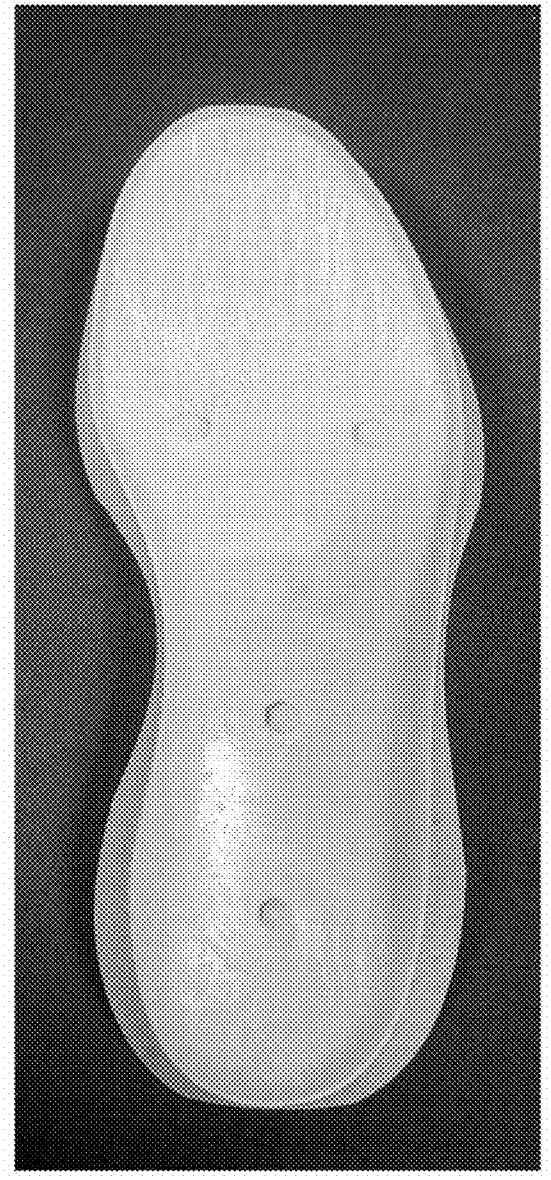
FIGS. 24 to 44 and FIGS. 49 to 52 shows photographs of a shoe sole made according to Experimental Examples 1 to 20 and Comparative Examples 1 to 5.

FIG. 24 shows a photograph of a shoe sole manufactured according to Exemplary Example 1. As shown in FIG. 24, it was confirmed that the foam is uniformly formed in the shoe sole. It was also confirmed that the foam is uniformly formed in the surface layer of the shoe sole. In addition, the injection process during the physical foaming process was found to be highly stable.

Experimental Results of Comparative Example 1

Figure 25:
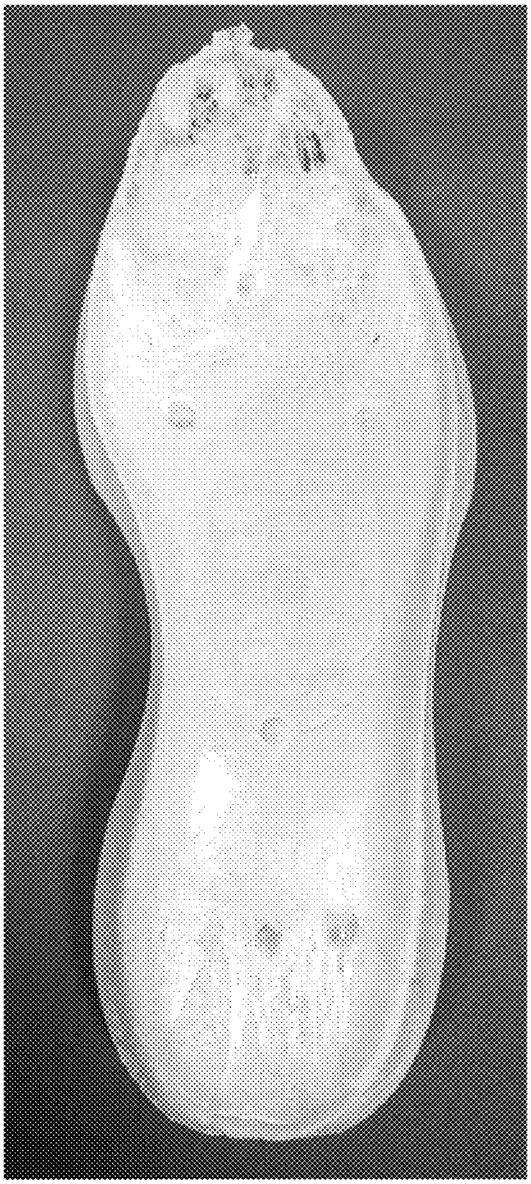

FIG. 25 shows a photograph of a shoe sole manufactured according to Comparative Example 1. As shown in FIG. 25, it was confirmed that the foam of the shoe sole, especially its upper part, is incompletely formed. In addition, the injection process during the physical foaming process also showed low stability. This was due to the fact that when the gas for physical foaming is supplied by metering during physical foaming injection, it is difficult to supply uniform gas due to the varied environment at each metering. In this case, the uniformity of shoe sole foaming was reduced and performance for foaming was limited.

Experimental Results of Comparative Example 2

Figure 26:
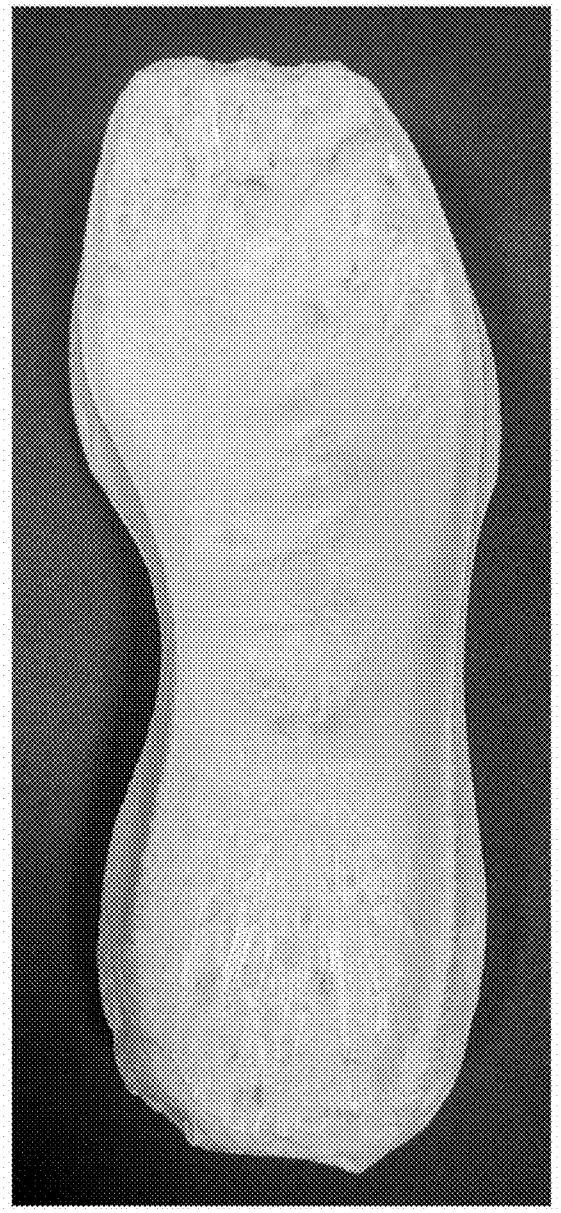

FIG. 26 shows a photograph of a shoe sole manufactured according to Comparative Example 2. As shown in FIG. 26, it was confirmed that the foam is not well formed in the surface layers at the top and bottom of the shoe sole. Furthermore, it was difficult to obtain a low-density shoe sole due to the difficulty of the high-foaming process. This was due to the fact that when the gas for physical foaming is supplied by metering during physical foaming injection, it is difficult to supply uniform gas due to the varied environment at each metering. In this case, the uniformity of shoe sole foaming was reduced and performance for foaming was limited.

Experimental Results of Comparative Example 3

Figure 27:
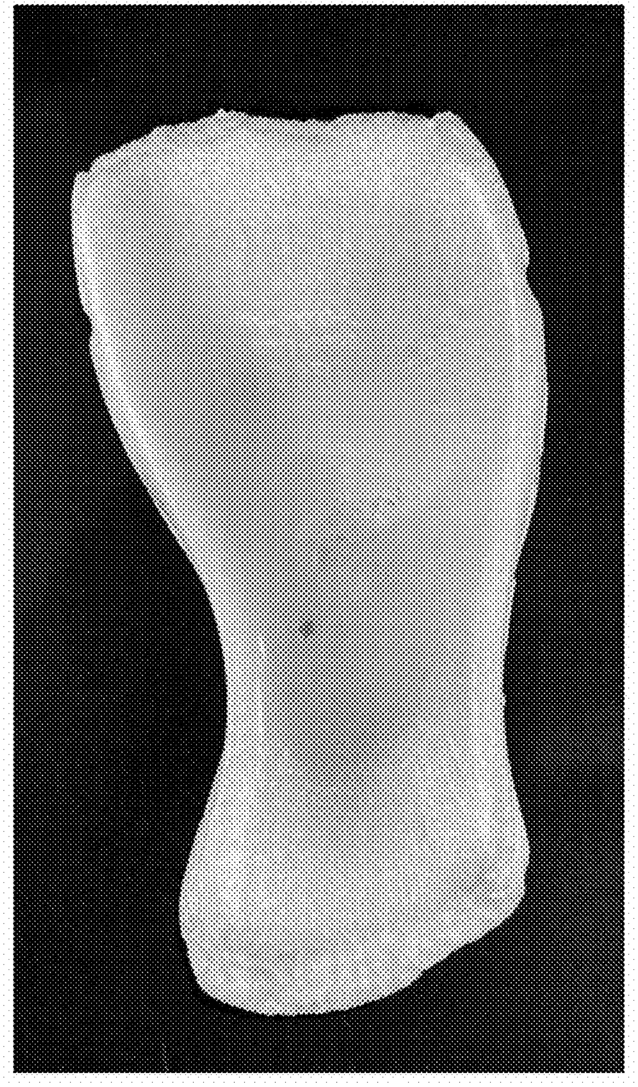

FIG. 27 is a photograph of a shoe sole manufactured according to Comparative Example 3. As shown in FIG. 27, it was confirmed that the foam is not well formed in the surface layer of the shoe sole, and a hard layer is formed. Furthermore, it was difficult to obtain a low-density shoe sole due to the difficulty of the high-foaming process. This was due to the fact that when the gas for physical foaming is supplied by metering during physical foaming injection, it is difficult to supply uniform gas due to the varied environment at each metering. In this case, the uniformity of shoe sole foaming was reduced and performance for foaming was limited.

Experimental Results of Comparative Example 4

Figure 28:
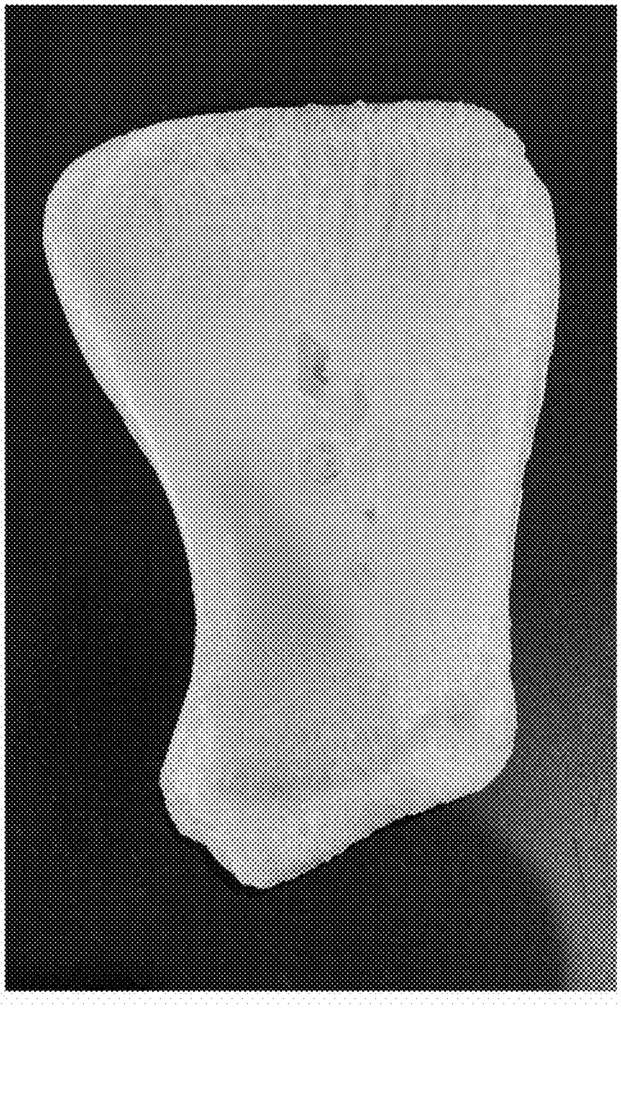

FIG. 28 shows a photograph of a shoe sole manufactured according to Comparative Example 4. As shown in FIG. 28, it was confirmed that the foam is unevenly formed in the surface layer of the shoe sole. Furthermore, it was difficult to obtain a low-density shoe sole due to the difficulty of the high-foaming process. This was due to the fact that when the gas for physical foaming is supplied by the metering during physical foaming injection, the environment varies at each metering, making it difficult to supply uniform gas. In this case, the uniformity of shoe sole foaming was reduced and performance for foaming was limited.

Experimental Results of Comparative Example 5

Figure 29:
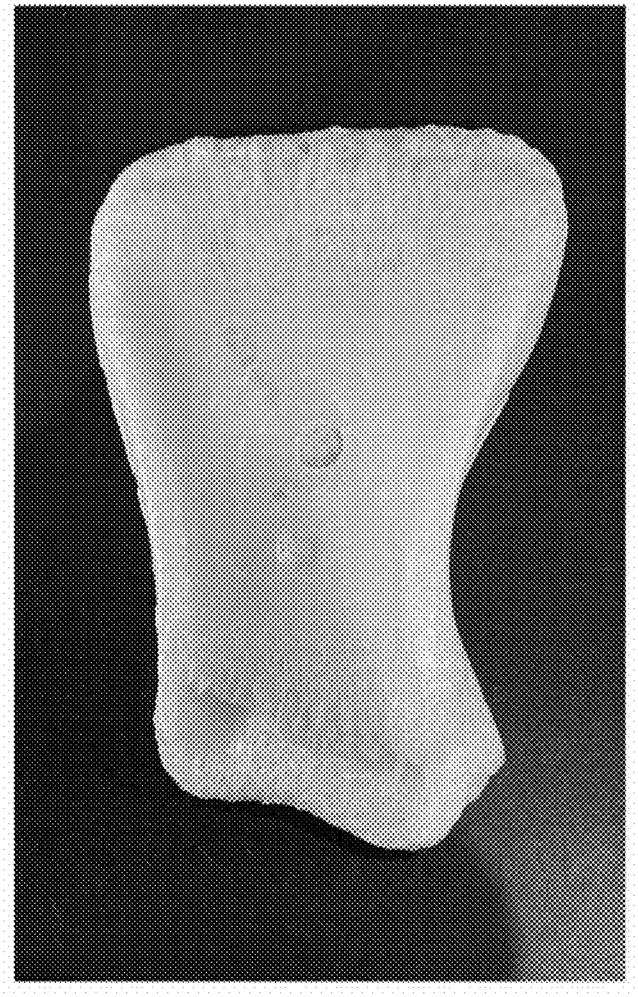

FIG. 29 shows a photograph of a shoe sole manufactured according to Comparative Example 5. As shown in FIG. 29, it was confirmed that the foam is not well formed in the surface layer of the shoe sole and a hard layer is formed. Furthermore, it was difficult to obtain a low-density shoe sole due to the difficulty of the high-foaming process. This is due to the fact that when the gas for physical foaming is supplied by metering during physical foaming injection, it is difficult to supply uniform gas due to the varied environment at each metering. Furthermore, the uniformity of shoe sole foaming was reduced and performance for foaming was limited.

In Exemplary Example 1, the process was carried out in a batch way with the gas pockets being formed first and then the resin beads mixed with the gas for physical foaming. As a result, the desired amount of gas for physical foaming could be supplied at all times, and the same environment was formed at each metering, enabling continuous high-quality shoe soles to be manufactured. Therefore, not only injection stability but also uniformity was secured. On the other hand, the same results were obtained when the TPEE and TPU listed in Table 3 were used as raw materials and tested under the same conditions as the above-mentioned Exemplary Example 1 and Comparative Examples 2 to 5, except for the injection gate temperature of 220° C.

Experiment of Gas Loading Distance for In-Barrel Physical Foaming

The PEBA in Table 3 was used as the resin beads and the mixture was prepared by adjusting the gas loading length according to the supply closing position of the gas for physical foaming in the barrel. The metering position was adjusted in a similar manner to the metering position in FIG. 23.

Exemplary Example 2

The metering starting position was 7 mm, the gas supply opening position was 5 mm, and the gas supply closing position was 7 mm, meaning that the gas supply was applied first, and metering is started after the screw was retracted to 7 mm. The metering finishing position was 90 mm. In this case, the gas loading length was 2 mm. The rest of the experimental conditions were the same as in Exemplary Example 1 above.

Exemplary Example 3

The metering starting position was 9 mm and the gas supply closing position was 9 mm. The gas loading length was 4 mm. The rest of the experimental conditions were the same as in Exemplary Example 2 above.

Exemplary Example 4

The metering starting position was 10 mm and the gas supply closing position was 10 mm. The gas loading length was 5 mm. The rest of the experimental conditions were the same as in Exemplary Example 2 above.

Exemplary Example 5

The metering starting position was 15 mm and the gas supply closing position was 2015 mm. The gas loading length was 10 mm. The rest of the experimental conditions were the same as in Exemplary Example 2 above.

Exemplary Example 6

The metering starting position was 30 mm and the gas supply closing position was 30 mm. The gas loading length was 25 mm. The rest of the experimental conditions were the same as in Exemplary Example 2 above.

Exemplary Example 7

The metering starting position was 35 mm and the gas supply closing position was 35 mm. The gas loading length was 30 mm. The rest of the experimental conditions were the same as in Exemplary Example 2 above.

Gas Loading Distance Experiment Results for In-Barrel Physical
Foaming

The results for checking the quality of a shoe sole are made according to Exemplary Examples 2 to 7 above, together with the experimental conditions, are shown in Table 5 below.

TABLE 5

| | Condition for mixing | | | | | |
|---|---|---|---|---|---|---|
| Exemplary Example | Gas loading distance (mm) | Metering starting position (mm) | Gas supply opening position (mm) | Gas supply closing position (mm) | Metering finishing startin position (mm) | quality of shoe sole |
| Exemplary Example 2 | 2 | 7 | 5 | 7 | 90 | Not good |
| Exemplary Example 3 | 4 | 9 | 5 | 9 | 90 | Not good |
| Exemplary Example 4 | 5 | 10 | 5 | 10 | 90 | Some-what good |
| Exemplary Example 5 | 10 | 15 | 5 | 15 | 90 | Good |
| Exemplary Example 6 | 25 | 30 | 5 | 30 | 90 | Some-what good |
| Exemplary Example 7 | 30 | 35 | 5 | 35 | 90 | Not good |

The experimental results in above Table 5 are explained as below.

Experimental Results of Exemplary Example 2

Figure 30:
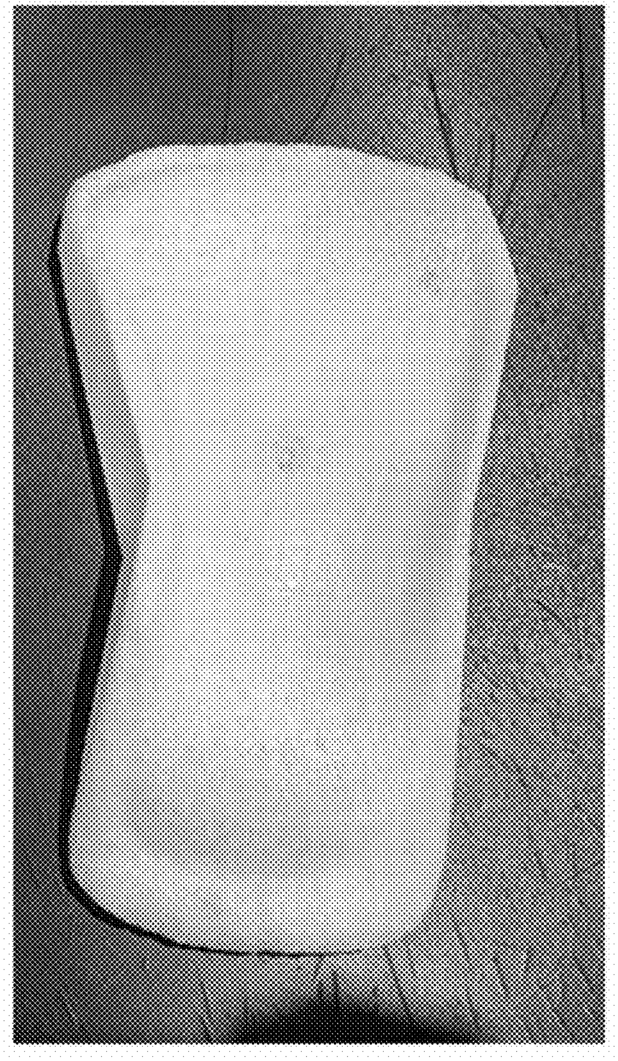

FIG. 30 is a photograph of a shoe sole manufactured according to Exemplary Example 2. As shown in FIG. 30, moldability of the top and bottom of the shoe sole was not good due to the lack of gas for physical foaming.

Experimental Results of Exemplary Example 3

Figure 31:
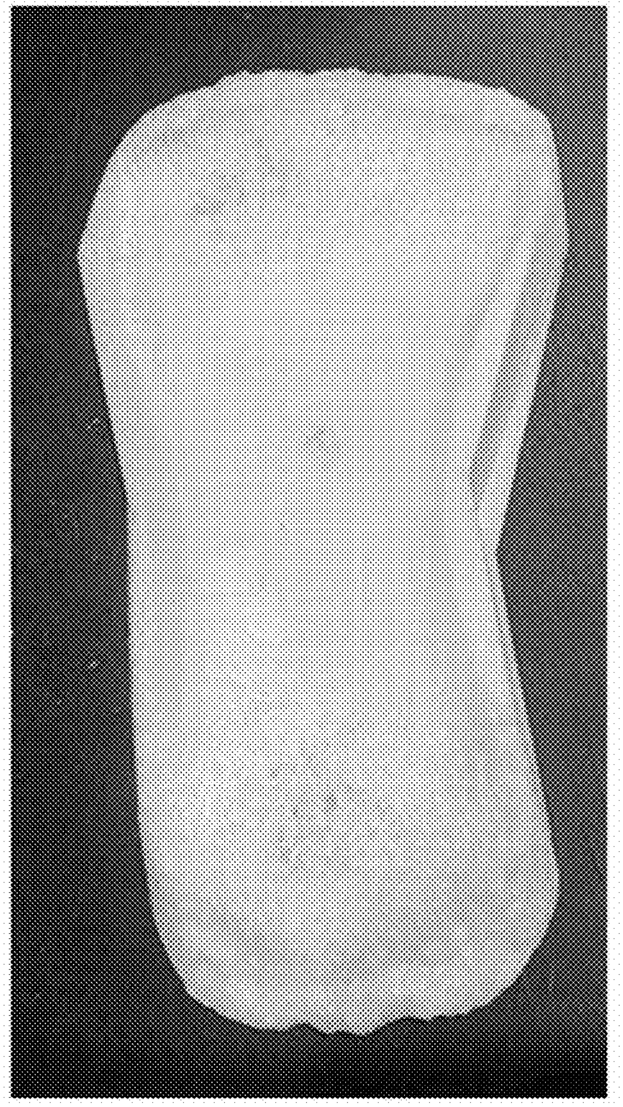

FIG. 31 is a photograph of a shoe sole manufactured according to Exemplary Example 3. As shown in FIG. 31, moldability of the top and bottom of the shoe sole was not good due to the lack of gas for physical foaming.

Experimental Results of Exemplary Example 4

Figure 32:
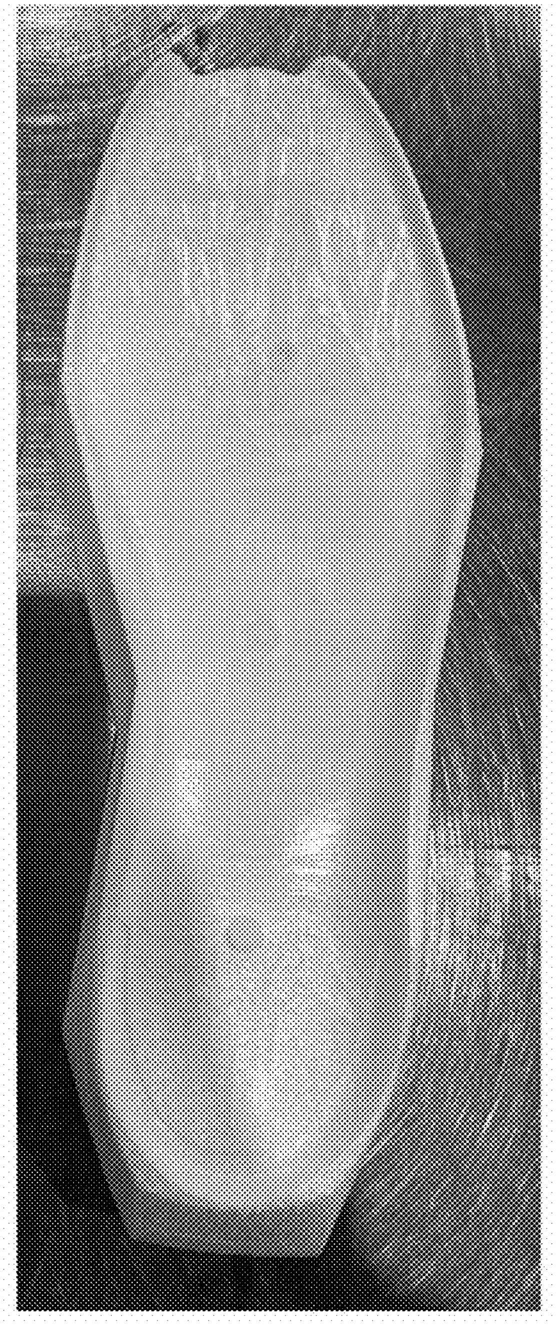

FIG. 32 shows a photograph of a shoe sole manufactured according to Exemplary Example 4. As shown in FIG. 32, the foam moldability of the shoe sole was good. However, it was observed that the uniformity of the shoe sole cell size was somewhat low.

Experimental Results of Exemplary Example 5

Figure 33:
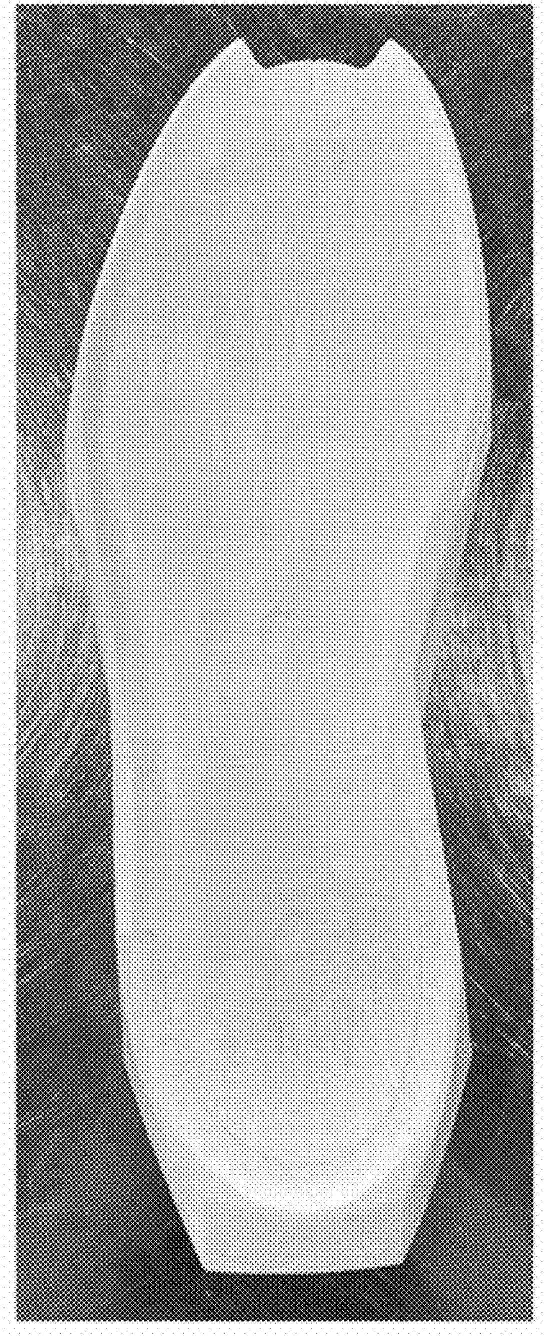

FIG. 33 is a photograph of a shoe sole manufactured according to Exemplary Example 5. As shown in FIG. 33, the foam moldability of the shoe sole was good. The cell size of the shoe sole was also uniformly formed.

Experimental Results of Exemplary Example 6

Figure 34:
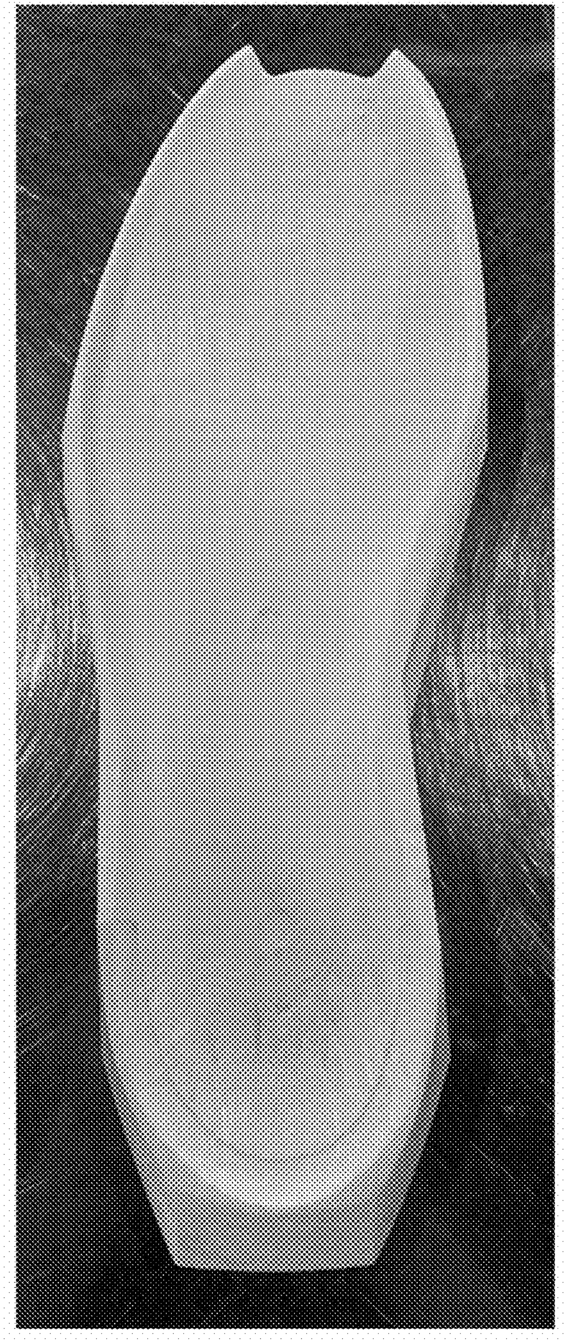

FIG. 34 shows a photograph of a shoe sole manufactured according to Exemplary Example 6. As shown in FIG. 34, the foam moldability of the shoe sole was good. However, the uniformity of the shoe sole cell size was somewhat low.

Experimental Results of Exemplary Example 7

Figure 35:
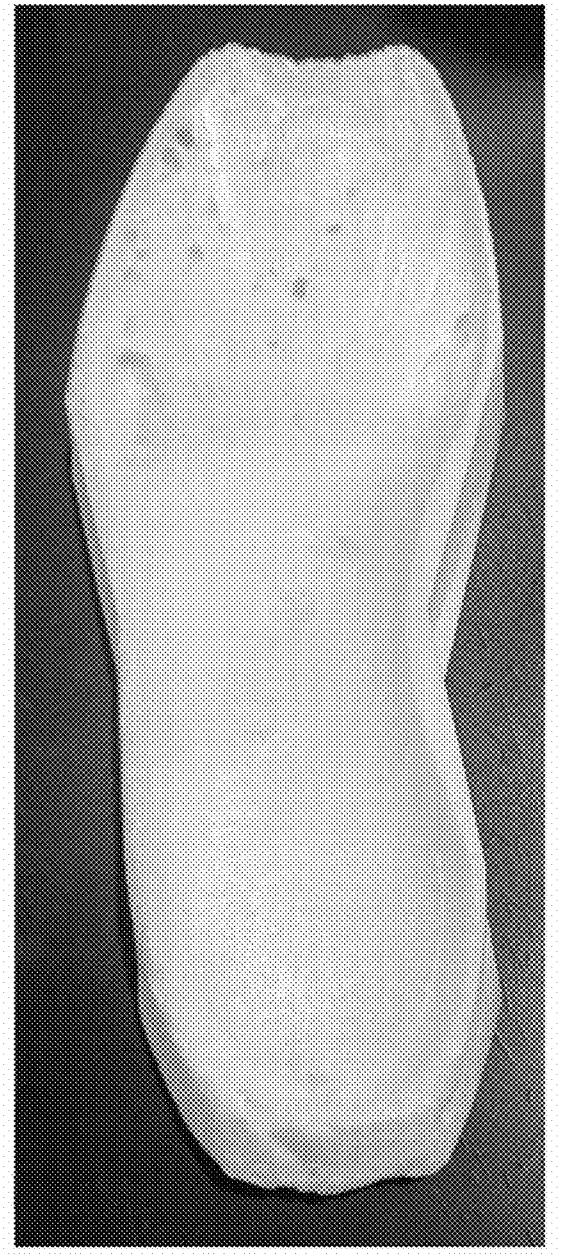

FIG. 35 is a photograph of a shoe sole manufactured according to Exemplary Example 7. As shown in FIG. 35, a problem was identified with the formation of large pores in the shoe sole. This was presumed to be due to an overfeeding of the gas for physical foaming in Exemplary Example 7.

As described above, when the gas loading length was between 10 mm and 20 mm in Exemplary Experiments 4 and 6, a shoe sole having good quality was produced. Therefore, it was confirmed that it is desirable to adjust the gas loading length as described above.

On the other hand, the same results were obtained when the TPEE and TPU in Table 3 were used as raw materials and tested under the same conditions as Exemplary Experiments 2 to 7 above.

Experiments with Formability Under CPM Decompression Conditions

Experiments were conducted using the PEBA in Table 3. A mixture of PEBA with nitrogen as a gas for physical foaming was prepared. In this case, input pressure of the gas for physical foaming was 145 bar, the metering starting position was 15 mm, the gas supply opening position was 5 mm, the gas supply closing position was 15 mm, and the metering finishing position was 90 mm. The gas loading distance was 10 mm.

Then, after nitrogen is introduced into the cavity of the mold, the mold was depressurized and the mixture was injected into the cavity, thereby the shoe sole was foamed. As shown in FIG. 11, VL1, VL2, VR1 and VR2 valves were used to depressurize the cavity on the left, right, top and bottom, respectively. The rest of the experiments are described below.

Exemplary Example 8

The nitrogen inlet pressure to the cavity was 20 bar. The cavity was depressurized by opening each of the valves VL1, VL2, VR1 and VR2 to 45% at the same time as the mixture was injected into the cavity without delay. The remaining experimental conditions will be readily understood by a person of ordinary skill in the art to which the present invention belongs, and detailed description thereof is omitted.

Exemplary Example 9

After the mixture was injected into the cavity, the cavity was depressurized by opening each of the valves VL1, VL2, VR1 and VR2 0.05 second later. The rest of the experimental conditions were the same as those in Exemplary Example 8 above.

Exemplary Example 10

After the mixture was injected into the cavity, the cavity was depressurized by opening each of the valves VL1, VL2, VR1, and VR2 0.10 second later. The rest of the experimental conditions were the same as those in Exemplary Example 8 above.

Exemplary Example 11

After the mixture was injected into the cavity, the cavity was depressurized by opening each of the valves VL1, VL2, VR1 and VR2 0.50 second later. The rest of the experimental conditions were the same as those in Exemplary Example 8 above.

Exemplary Example 12

After the mixture was injected into the cavity, the cavity was depressurized by opening each of the valves VL1, VL2, VR1, and VR2 1.00 second later. The rest of the experimental conditions were the same as those in Exemplary Example 8 above.

Formability Test Results Under CPM Decompression Conditions

The results of checking quality of the shoe sole manufactured according to the method for molding using counter pressure according to Exemplary Examples 8 to 12 above, together with the experimental conditions, are shown in Table 6 below.

TABLE 6

| Exemplary Example | Condition for counter pressure | | | | | | | | | Quality of shoe sole |
|---|---|---|---|---|---|---|---|---|---|---|
| | Input pressure (bar) | Opening rate (%) | | | | Delaying time (sec) | | | | |
| | | VL1 | VL2 | VR1 | VR2 | VL1 | VL2 | VR1 | VR2 | |
| Exemplary Example 8 | 20 | 45 | 45 | 45 | 45 | 0.00 | 0.00 | 0.00 | 0.00 | Not good |
| Exemplary Example 9 | 20 | 45 | 45 | 45 | 45 | 0.05 | 0.05 | 0.05 | 0.05 | Not good |
| Exemplary Example 10 | 20 | 45 | 45 | 45 | 45 | 0.10 | 0.10 | 0.10 | 0.10 | Good |
| Exemplary Example 11 | 20 | 45 | 45 | 45 | 45 | 0.50 | 0.50 | 0.50 | 0.50 | Good |
| Exemplary Example 12 | 20 | 45 | 45 | 45 | 45 | 1.00 | 1.00 | 1.00 | 1.00 | Not good |

Referring to Table 6, results of checking quality of the shoe sole are explained in detail below.

Experimental Results of Exemplary Example 8

Figure 36:

FIG. 36 is a photograph of a shoe sole manufactured according to Exemplary Example 8. As shown in FIG. 36, the top and bottom of the shoe sole were not molded well. Although decompression and injection were started simultaneously, the decompression occurred earlier than the finishing of injection. Therefore, the rate of decompression was high and the cavity was completely decompressed before injection was completed. The shoe sole in FIG. 36 was presumed to be shaped due to the above process.

Experimental Results of Exemplary Example 9

Figure 37:
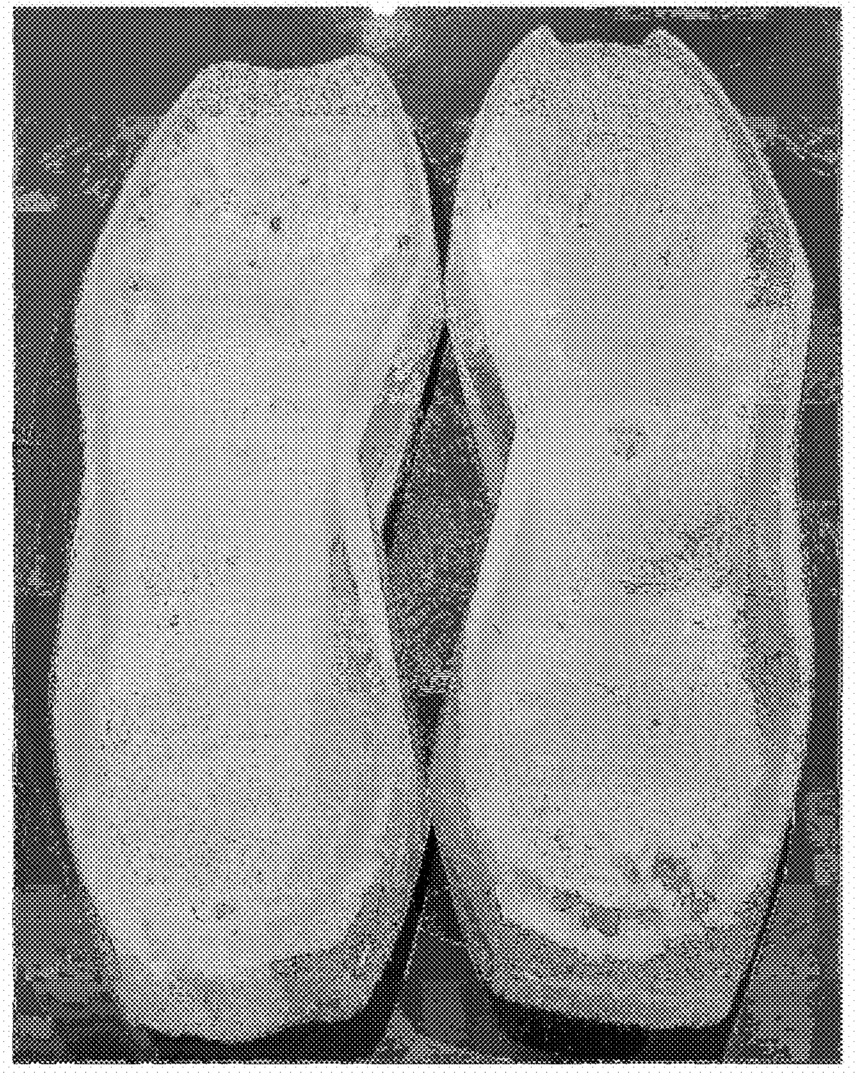

FIG. 37 is a photograph of a shoe sole manufactured according to Exemplary Example 9. As shown in FIG. 37, the top and bottom of the shoe sole were not molded well. Although decompression began after injection, the decompression occurred earlier than the finishing of injection. Therefore, the rate of decompression was high and the cavity was completely decompressed before injection was completed. The shoe sole shape in FIG. 37 is likely due to the above process.

Experimental Results of Exemplary Example 10

Figure 38:
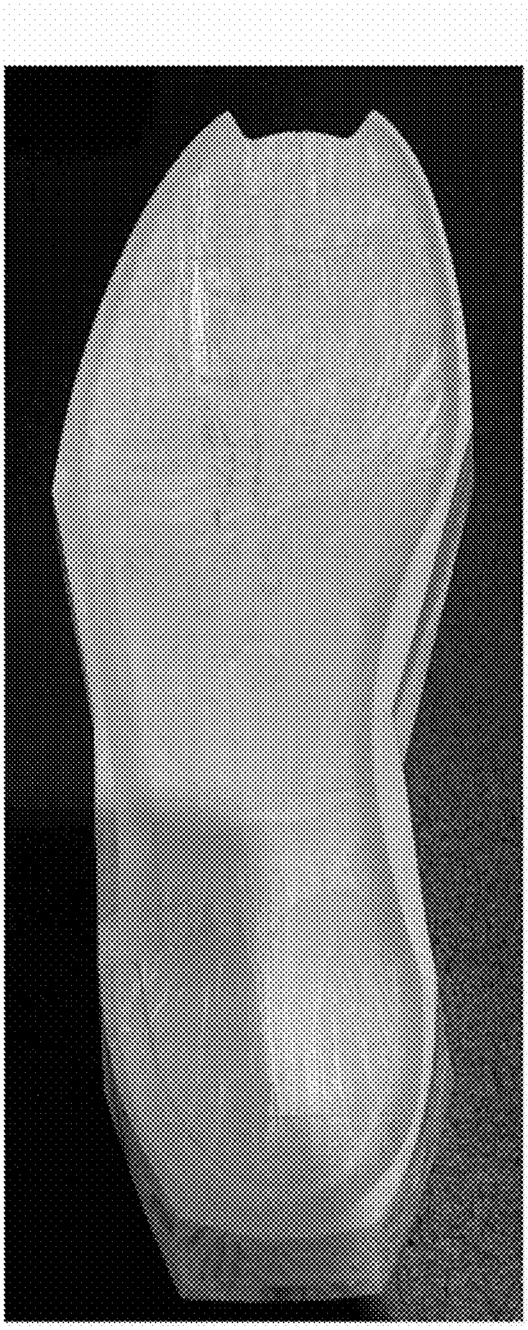

FIG. 38 is a photograph of a shoe sole manufactured according to Exemplary Example 10. As shown in FIG. 38, the shoe sole is molded well to the end thereof. It seems to be due to the fact that the injection speed is the same as or similar to decompression speed in manufacturing a shoe sole.

Experimental Results of Exemplary Example 11

Figure 39:
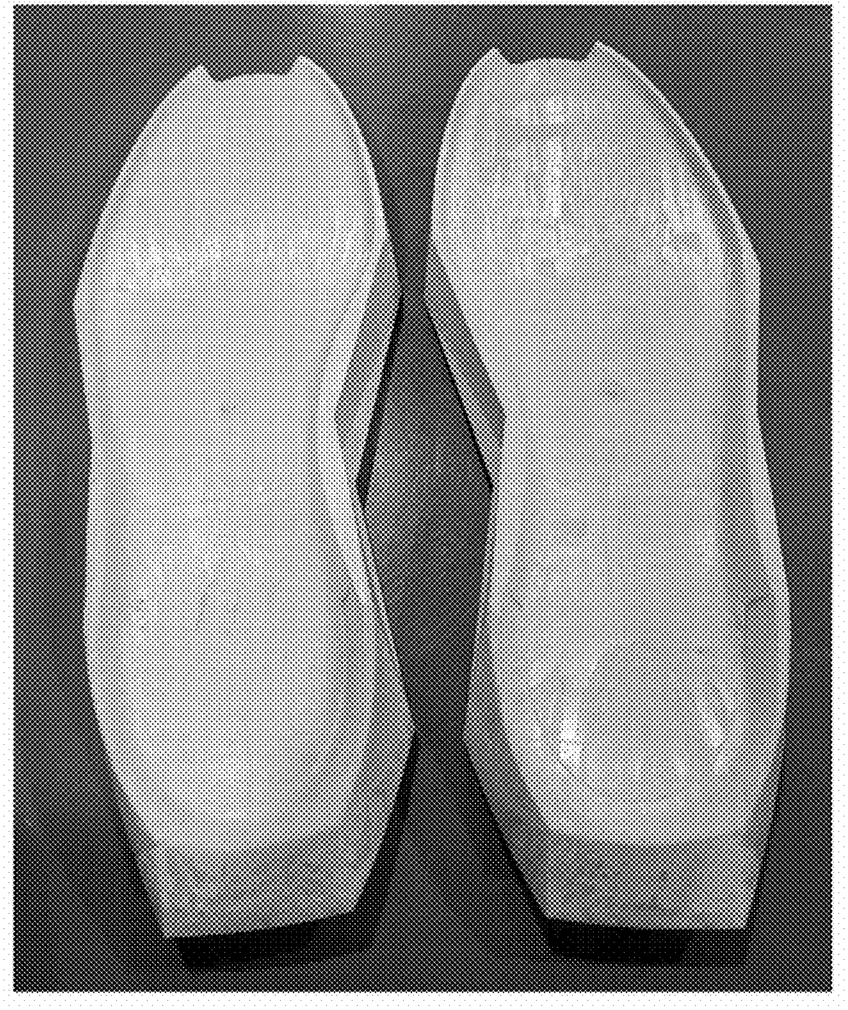

FIG. 39 is a photograph of a shoe sole manufactured according to Exemplary Example 11. As shown in FIG. 39, the shoe sole is molded well to the tip thereof. It seems to be due to the fact that the injection speed is the same as or similar to decompression speed in manufacturing a shoe sole.

Experimental Results of Exemplary Example 12

Figure 40:

FIG. 40 is a photograph of a shoe sole manufactured according to Example 12. As shown in FIG. 40, formation of the skin layer of the shoe sole is completed and has not been molded to the end thereof as a result of beginning decompression at the end of injection.

As described above, in Exemplary Examples 10 and 11, when decompression was performed 0.1 to 0.5 second after injection, it was observed that the shoe sole was molded well to the tip thereof. On the other hand, the same results were obtained when the TPEE and TPU in Table 3 were used as raw materials and tested under the same conditions as in Exemplary Examples 8 and 12 above.

The results of testing the hardness, density, and elasticity of the shoe sole prepared according to Exemplary Examples 10 and 11 above for each of the PEBA, TPEE, and TPU materials in Table 3 are shown in Table 7 below.

TABLE 7

| NO | Testing items | Testing standard | Unit | PEBA | TPEE | TPU |
|---|---|---|---|---|---|---|
| 1 | Hardness | ASTM D2240 | ASKER C | 58 ± 3 | 45 ± 3 | 43 ± 3 |
| 2 | Density | SATRA TM134 | g/cm$^3$ | 0.150 | 0.120 | 0.230 |
| 3 | elasticity | ASTM D2632 | % | 63 | 70 | 50 |

As shown in Table 7, shoe soles with a wide range of hardness, density, and elasticity for each material were produced. The shoe soles produced from these materials all had a good range of hardness, density, and elasticity, resulting in shoes of excellent quality.

Experiments of Formability with Valve Opening and Delay Time for CPM

The formability of the shoe sole was tested by varying the opening rate and the opening time of the valves for the CPM shown in FIG. 23.

Exemplary Example 13

Injection was started when the cavity in the mold was pressurized with nitrogen at 20 bar pressure for 15 second. Ten second after injection of the mixture into the cavity, the cavity in the mold was depressurized for 10 second by adjusting the opening of the valves VL1 and VL2 in FIG. 23 to 38% each and adjusting the opening of the valves VR1 and VR2 to 39%, respectively. The rest of the experimental process was the same as in Exemplary Example 1 above.

Exemplary Example 14

Injection was started when the cavity in the mold was pressurized with nitrogen at 15 bar pressure for 15 second. At the same time as the mixture was injected into the cavity, the opening of the valves VL1 and RV1 in FIG. 23 was adjusted to 30%, respectively. Then, 0.5 second after injection of the mixture, the opening of the valves VL2 and RV2 in FIG. 23 was adjusted to 54% and 59%, respectively. The valves VL1, VL2, RV1 and RV2 were opened for 10 second to decompress the cavity. The rest of the experimental conditions were the same as those in Exemplary Example 13 above.

Exemplary Example 15

Injection was initiated when the cavity in the mold was pressurized with nitrogen at 15 bar for 15 second. Simultaneously with the injection of the mixture into the cavity, the opening of the valves VL1, VL2, RV1 and RV2 of FIG. 23 was adjusted to 67%. The valves VL1, VL2, RV1 and RV2 were opened for 10 second to depressurize the cavity. The rest of the experimental conditions were the same as those in Exemplary Example 13 above.

Exemplary Example 16

Injection was started when the cavity in the mold was pressurized with nitrogen of 17 bar for 15 second. The valves VL1 and RV1 in FIG. 23 were opened to 30% at the same time as the mixture was injected into the cavity. After the mixture was injected into the cavity, the valves VL2 and RV2 in FIG. 23 were opened to 30% 0.3 second later. The valves VL1, VL2, RV1 and RV2 were opened for 10 second to depressurize the cavity. The rest of the experimental conditions were the same as those in Exemplary Example 13 above.

Experimental Results of Formability as a Function of Valve Opening and Delay for CPM The quality of the foam molded shoe soles according to Exemplary Examples 13 to 16 above was checked. The results are described below.

Experimental Results of Exemplary Example 13

Figure 41:

FIG. 41 is a photograph of a shoe sole manufactured according to Exemplary Example 13. As shown in FIG. 41, it was possible to produce a uniformly foamed shoe sole. The mixture injected into the cavity of the mold foamed well, thereby a shoe sole of excellent quality was manufactured.

Experimental Results of Exemplary Example 14

Figure 42:
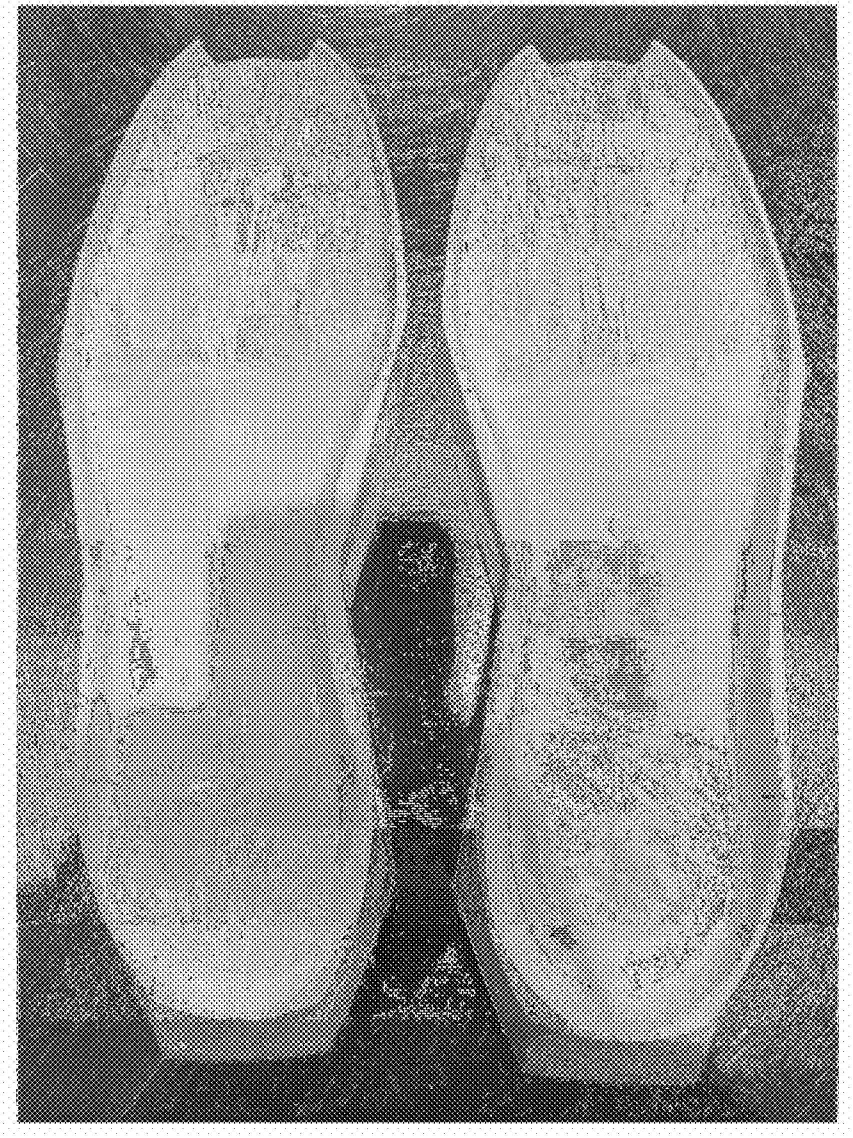

FIG. 42 shows a photograph of a shoe sole manufactured according to Exemplary Example 14. As shown in FIG. 42, a uniformly foamed surface of the shoe sole was obtained. Therefore, it was confirmed that a shoe sole of excellent quality could be manufactured.

Experimental Results of Exemplary Example 15

Figure 43:
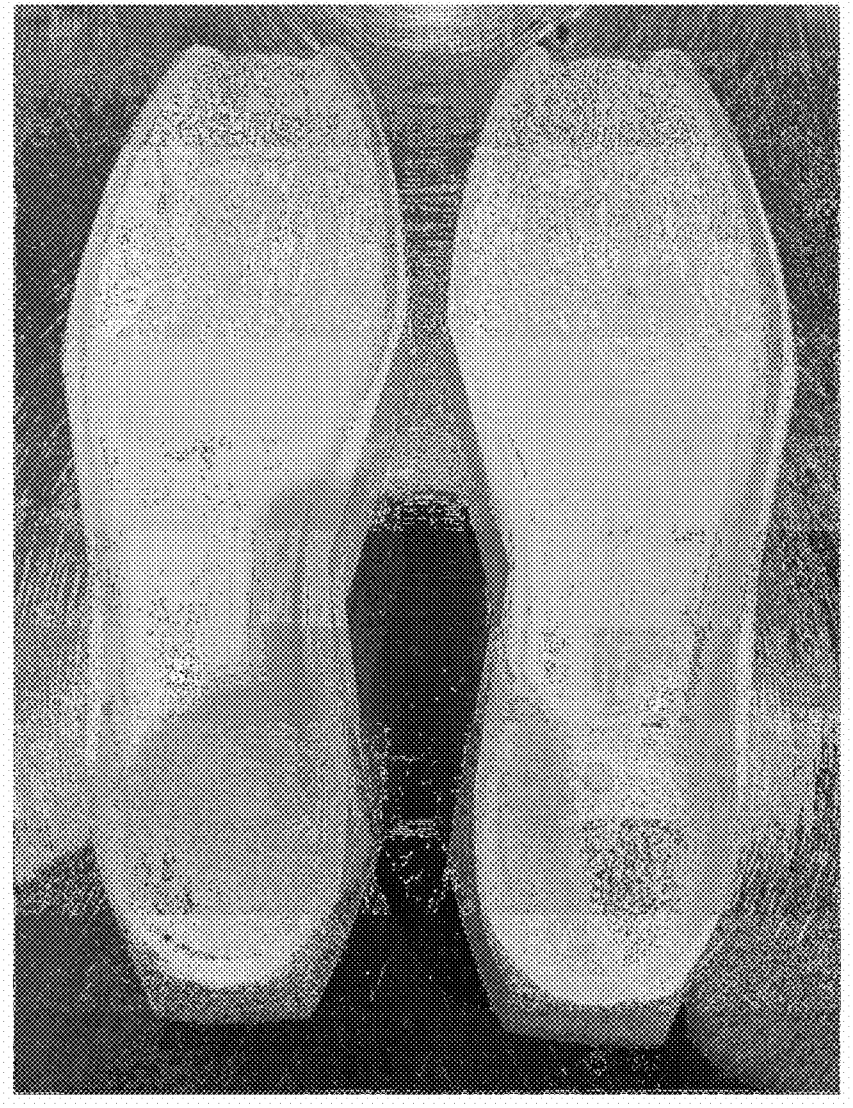

FIG. 43 is a photograph of a shoe sole manufactured according to Exemplary Example 15. As shown in FIG. 43, it was possible to produce a shoe sole with improved moldability and foaming power using a high output rate. However, it was confirmed that if the output rate was too high compared to the injection speed, the foaming power was reduced.

Experimental Results of Exemplary Example 16

Figure 44:
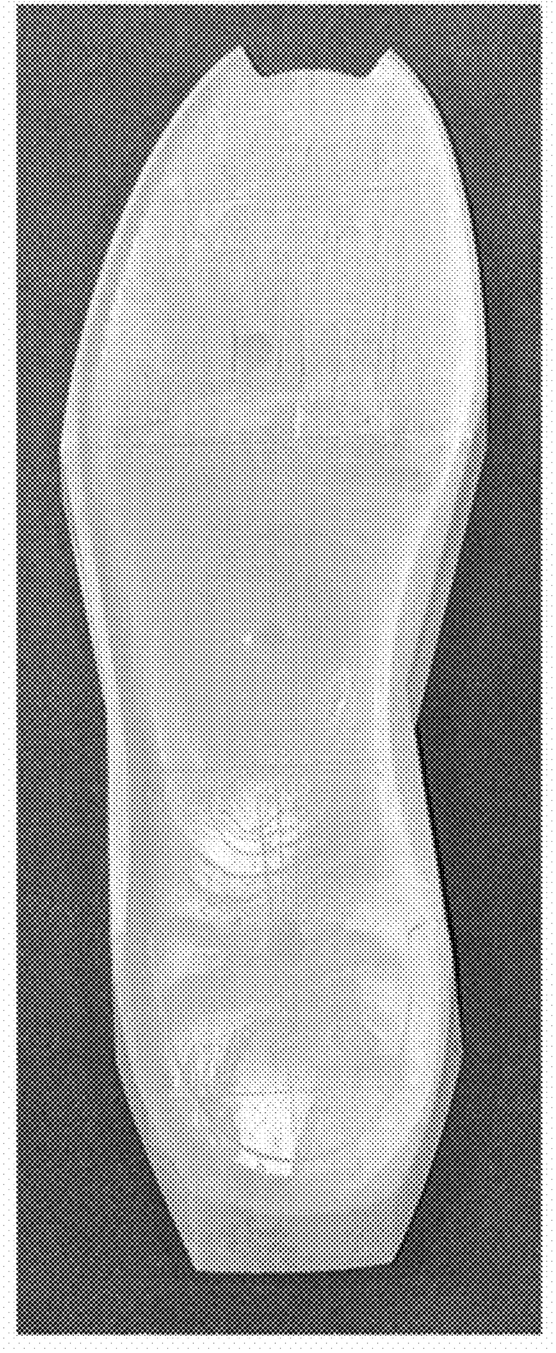

FIG. 44 is a photograph of a shoe sole manufactured according to Exemplary Example 16. As shown in FIG. 44, it was confirmed that cell growth in the shoe sole was controlled through low output rates, thereby it was confirmed that the cell was grown uniformly. In addition, the mixture was distributed evenly without being biased toward the exhaust side. However, it was observed that if the output rate is too low relative to the injection rate, problems for molding the end of the sole could occur.

Experimental Results of Formability According to CPM Process

Injection molding experiments were conducted by applying counter pressure to the cavity of the mold. Nitrogen was injected into the cavity, pressurized, and then decompressed over time, and the injection pressure was observed to change over time as the mixture was injected. The details of the experimental conditions were as follows Experimental Example 17

Nitrogen was injected into the cavity of the mold to gradually pressurize the cavity. The cavity was pressurized to about 22 bar. The injection gate containing the mixture was then kept closed. After the pressure in the cavity reached 22 bar, a valve was opened to depressurize the cavity. The valves were opened so that the decompression pressure dropped sharply to 9 bar, and then the opening was adjusted so that the pressure in the cavity slowly decreased in proportion to the elapsed time. That is, valves VL1 and VR1 were initially opened to 45%, and after 0.5 second, valves VL2 and VR2 were opened to 30% and 32%, respectively for further decompression. Meanwhile, simultaneously with the depressurization, the mixture was injected through the injection gate into the cavity. As the mixture was injected, the injection pressure was adjusted to slowly decrease over time.

Figure 45:
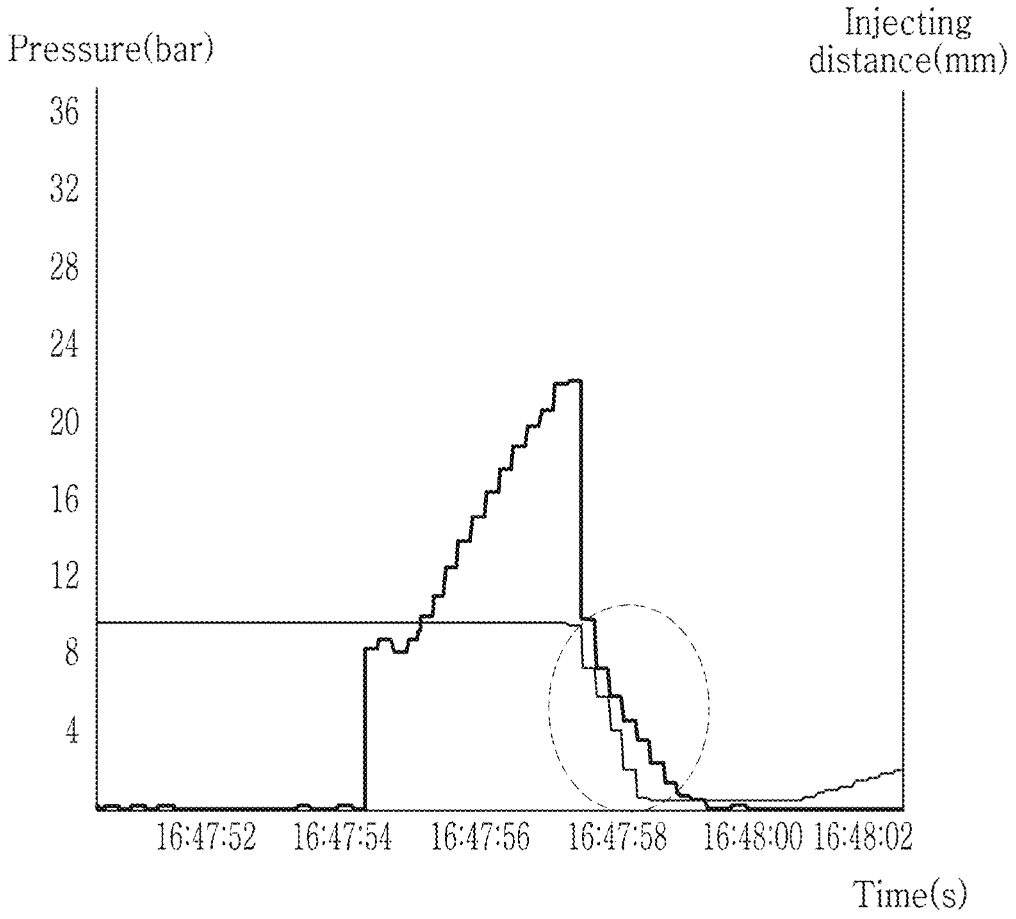
FIGS. 45 to 48 are graphs of injection rate and reducing pressure rate according to Experimental Example 17 and Experimental Example 20 of the present invention, respectively.

FIG. 45 is a graph showing the injection rate and decompression rate in Exemplary Example 17 of the present invention. In FIG. 45, the injection speed is indicated by a thin solid line while the decompression speed is indicated by a thick solid line. The injection speed means an injecting distance per second that the end of the rotating body moved along the right direction for injection after metering in FIG. 23, the units of which are omitted for convenience. The dashed circle in FIG. 45 indicates where the injection rate and decompression rate decrease together. As shown in the dashed circle in FIG. 45, the injection rate and the decompression rate were reduced by approximately the same amount.

Exemplary Example 18

Nitrogen was injected into the cavity of the mold to gradually pressurize the cavity. The cavity was pressurized to about 15 bar. The injection gate containing the mixture was then kept closed. After the pressure in the cavity reached 15 bar, a valve was opened to depressurize the cavity. The valves were opened so that the decompression pressure dropped sharply to 3 bar, and then the opening was adjusted so that the pressure in the cavity slowly decreased in proportion to the elapsed time. That is, valves VL1 and VR1 were initially opened to 30%, and after 0.5 second, valves VL2 and VR2 were opened to 54% and 59%, respectively for further decompression. Meanwhile, simultaneously with the depressurization, the mixture was injected through the injection gate into the cavity. As the mixture was injected, the injection pressure was adjusted to slowly decrease over time.

Figure 46:
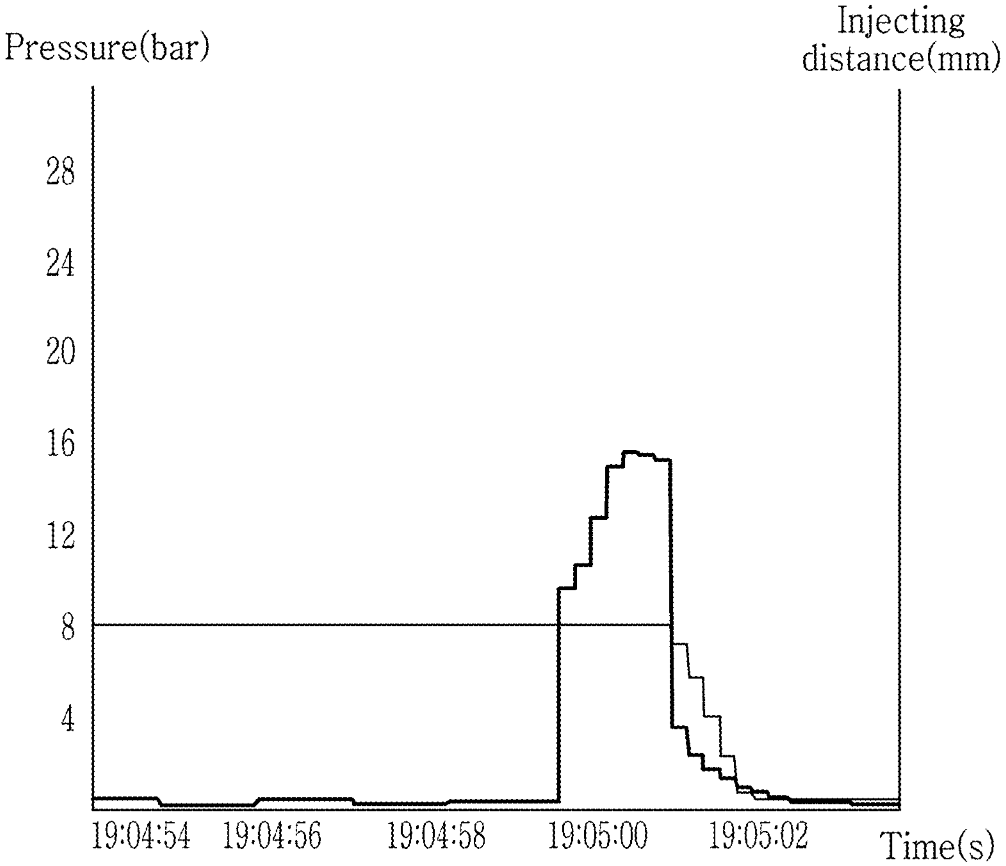

FIG. 46 is a graph showing the injection rate and decompression rate in Exemplary Example 18 of the present invention. In FIG. 46, the injection speed is represented by a thin solid line while the decompression speed is represented by a thick solid line. Injection speed refers to the injecting distance per second that the end of the rotating body moved along the right direction for injection after metering in FIG. 23, the units of which are omitted for convenience. As shown in FIG. 46, the decompression rate in the injection gate was controlled to be greater than the injection rate thereof, resulting in a greater decrease in the injection pressure than the pressure in the cavity during the same time period. Both the decompression rate of the cavity and the injection decompression rate formed a staircase shape.

Experimental Example 19

Nitrogen was injected into the cavity of the mold to gradually pressurize the cavity. The cavity was pressurized to about 17 bar. The injection gate containing the mixture was then kept closed. After the pressure in the cavity reached 17 bar, a valve was opened to depressurize the cavity. The valves were opened so that the decompression pressure dropped rapidly to 1 bar, and then the opening was adjusted so that the pressure in the cavity slowly decreased in proportion to the elapsed time. That is, valves VL1 and VR1 were initially opened to 65%, and after 0.2 second, valves VL2 and VR2 were opened to 70% and 70%, respectively for further decompression. Meanwhile, simultaneously with the depressurization, the mixture was injected through the injection gate into the cavity. As the mixture was injected, the injection pressure was adjusted to slowly decrease over time.

Figure 47:
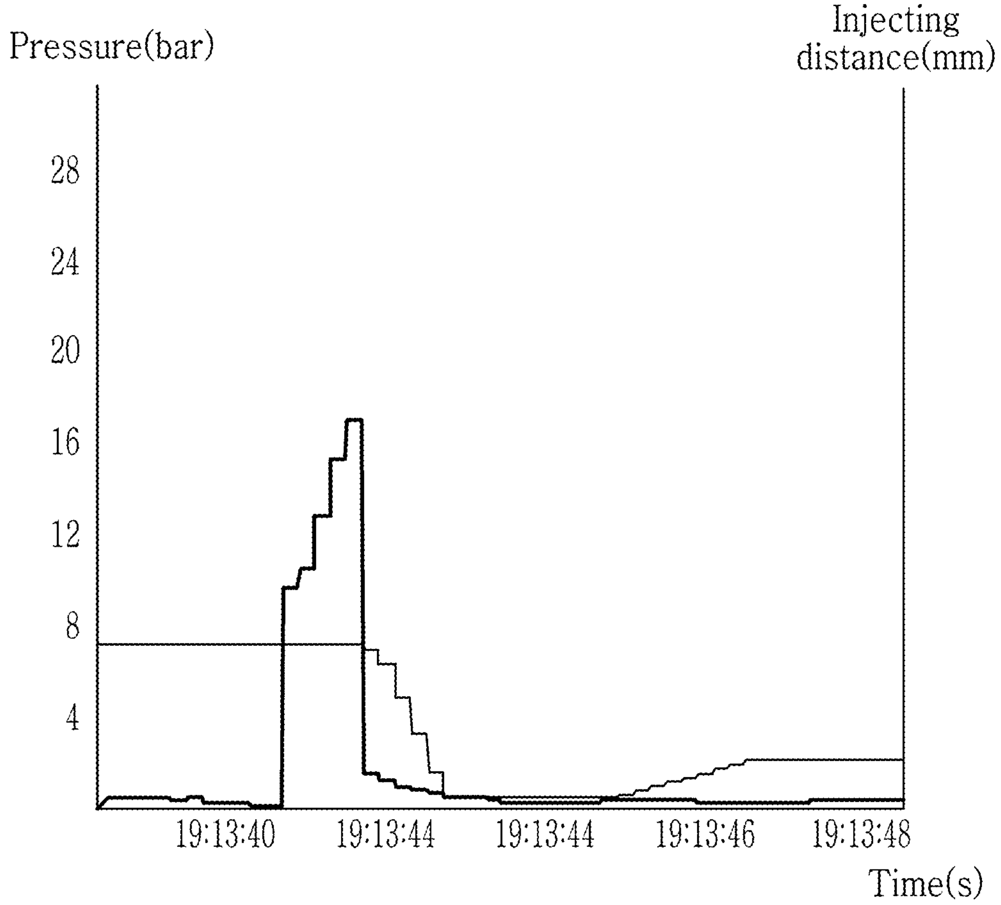

FIG. 47 is a graph showing the injection rate and decompression rate in Exemplary Example 19 of the present invention. In FIG. 47, the injection speed is indicated by a thin solid line while the decompression speed is indicated by a thick solid line. The injection speed means the injecting distance per second that the end of the rotating body moved along the right direction for injection after metering in FIG. 23, the units of which are omitted for convenience. As shown in FIG. 47, the decompression rate in the injection gate was controlled to be greater than the decompression rate in the cavity compared to Exemplary Example 17. As a result, the injection pressure decreased much more significantly than the pressure in the cavity during the same time period. Both the decompression rate of the cavity and the injection decompression rate formed a staircase shape.

Exemplary Example 20

Nitrogen was injected into the cavity of the mold to gradually pressurize the cavity. The cavity was pressurized to about 20 bar. The injection gate containing the mixture was then kept closed. After the pressure in the cavity reached 20 bar, the valves were opened less than in Exemplary Examples 16 to 18 so that the pressure in the cavity was controlled to be slowly reduced. That is, valves VL1 and VR1 were initially opened to 20%, and after 1.0 second, valves VL2 and VR2 were opened to 17% and 19%, respectively, for further decompression. Meanwhile, simultaneously with the depressurization, the mixture was injected through the injection gate into the cavity. As the mixture was injected, the injection pressure was adjusted to slowly decrease over time.

Figure 48:
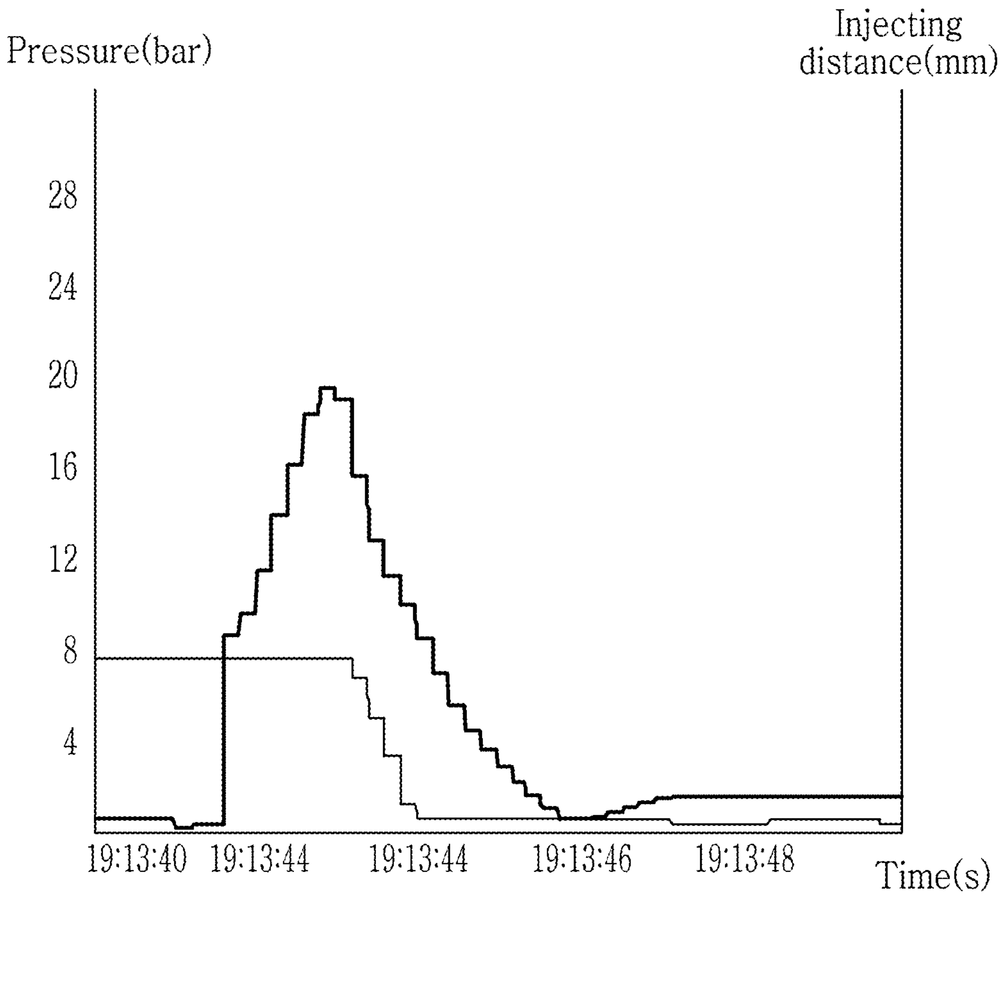

FIG. 48 is a graph showing the injection rate and decompression rate in Exemplary Example 20 of the present invention. In FIG. 48, the injecting distance is indicated by a thin solid line while the decompression speed is indicated by a thick solid line. The injection speed refers to the injecting distance per second that the end of the rotating body moved along the right direction for injection after metering in FIG. 23, and its unit is omitted for convenience. As shown in FIG. 48, the decompression rate of the cavity was controlled to be greater than the injection rate. As a result, the pressure in the cavity decreased more significantly than the injection pressure during the same time. Both the decompression and injection of the cavity were performed in multiple stages.

Experimental Results of Controlling the Cavity of the Mold and Injection Pressure Experimental Results of Exemplary Example 17

Figure 49:
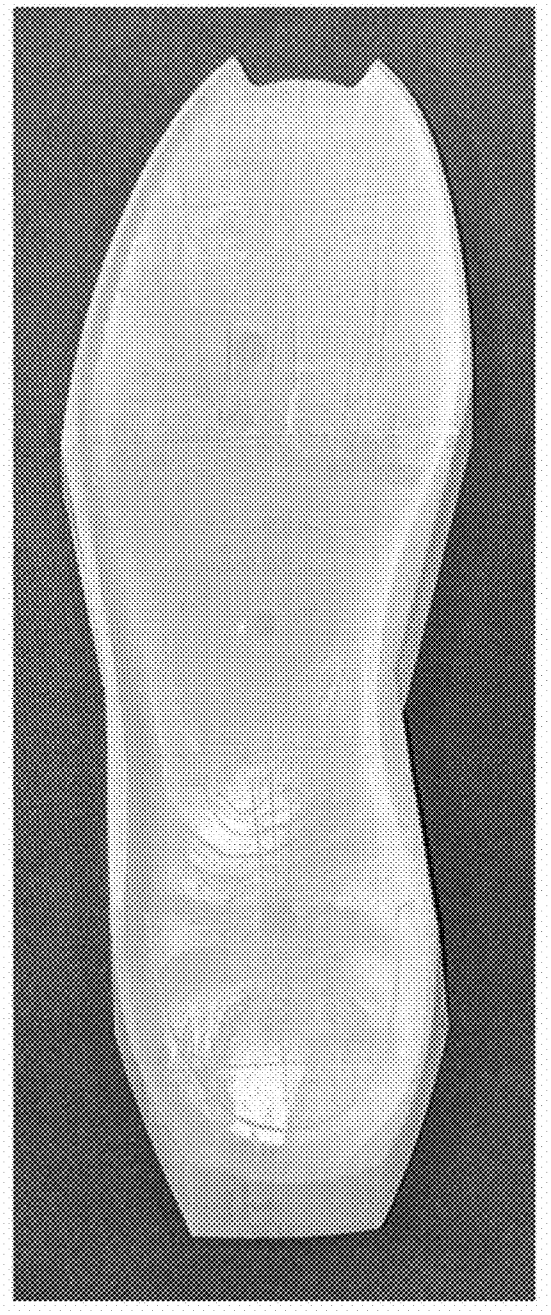

FIG. 49 is a photograph of a shoe sole manufactured according to Exemplary Example 17. As shown in FIG. 49, a well-foamed shoe sole was produced. Thus, it was confirmed that when the decompression rate and injection rate are substantially the same, shoe sole with a good quality can be manufactured.

Experimental Results of Exemplary Example 18

Figure 50:
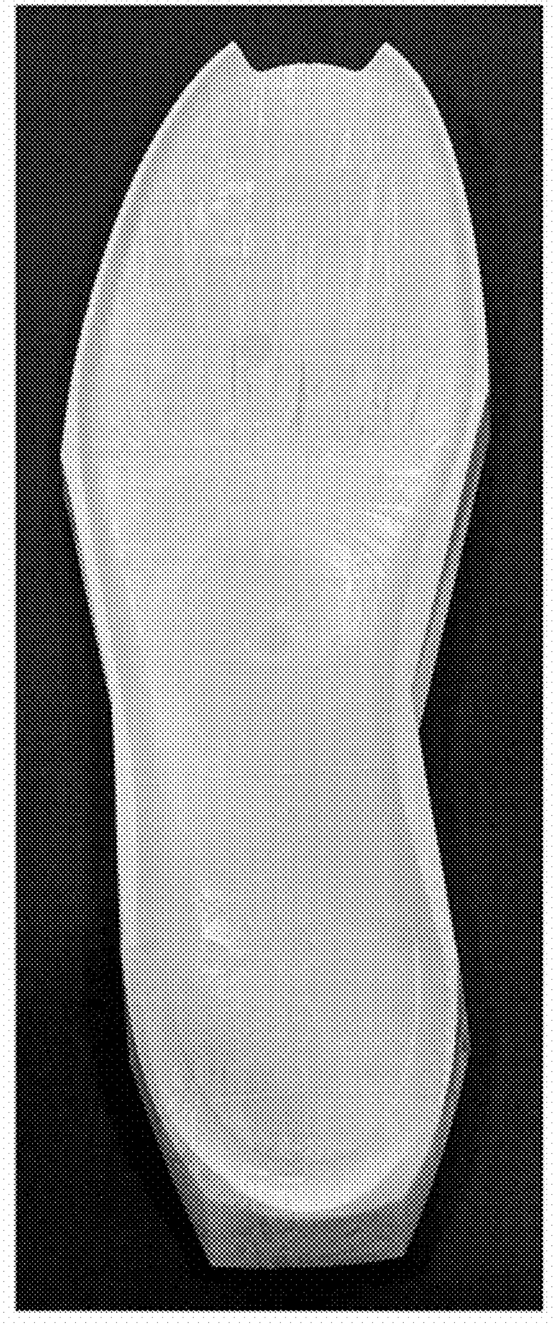

FIG. 50 is a photograph of a shoe sole manufactured according to Example 18. As shown in FIG. 50, a well-foamed shoe sole was manufactured. In particular, the surface layer of the shoe sole is foamed well. The quality of the surface layer of the shoe sole could be improved by setting the decompression output rate and the decompression time by the four valves VL1, VL2, VR1 and VR2 differently.

Experimental Results of Exemplary Example 19

Figure 51:

FIG. 51 is a photograph of a shoe sole manufactured according to Exemplary Example 19. As shown in FIG. 51, the manufactured shoe sole had excellent moldability and foaming power. However, it was confirmed that if the decompression power rate is too larger than the injection speed, the foaming power may be reduced.

Experimental Results of Exemplary Example 20

Figure 52:

FIG. 52 is a photograph of a shoe sole manufactured according to Exemplary Example 20. As shown in FIG. 52, a shoe sole with good uniform cell growth was manufactured. The reason for the uniform cell growth is related to the decompression rate. That is, if the decompression rate is low, there is still pressure in the cavity upon finishing of injection. Therefore, the cell growth in the shoe sole is controlled uniformly using a low decompression rate. Also, since the decompression rate is low, there is no sudden airflow, so the mixture is evenly distributed without being biased toward the exhaust side. However, if the decompression speed was lower than the injection speed, both ends of the shoe sole could not be molded well.

Although the invention has been described in accordance with the foregoing, it will be readily understood by those skilled in the art that various modifications and variations are possible without departing from the concept and scope of the following patent claims.

What is claimed is:

1. A method for physically foaming with injection, the method comprising:

heating an inside of a barrel that is elongated in one direction;

providing resin beads in the barrel;

manufacturing a melt by rotating and heating the resin beads with a first screw provided in the barrel;

directly providing a gas for physical foaming to an empty space in the barrel formed in front of a second screw connected in front of the first screw along a transferring direction of the resin beads in the barrel;

letting the second screw meeting the for physical foaming while the second screw advancing along the transferring direction;

converting the gas for physical foaming into a supercritical fluid by agitating the second screw;

providing a mixture in which the melt is incorporated into the supercritical fluid while the melt passes through the supercritical fluid;

pressurizing a cavity formed by a combination of a upper mold part and a lower mold part by injecting gas into the cavity;

foaming the mixture in the cavity while injecting the mixture into the cavity;

reducing pressure of the cavity in a delayed manner stages after the injection of the mixture, separating the upper mold part and the lower mold part from each other to remove a foamed elastic midsole with a low-density of 0.1 g/cc to 0.5 g/cc; and wherein the reducing pressure of the cavity in a delayed manner comprises:

first step of delaying evacuation of the gas, and second step of evacuating the gas; and wherein a time for the first step is less than a time for the second step.

2. The method of claim 1, wherein the directly providing the gas for physical foaming comprises:

opening a valve installed in a supply port of gas for physical foaming, forming a filling space of gas for physical foaming in the barrel corresponding to the supply port; and moving the second screw into the filling space along one direction.

3. The method of claim 1, wherein a pressure in the barrel is from 30 bar to 300 bar in the directly providing the gas for physical foaming.

4. The method of claim 1, further comprising providing a rotor in the barrel, and wherein in the forming a supercritical fluid, a first screw is formed as a continuous helix on a surface of the rotor in the forming a supercritical fluid, and a second screw comprises a plurality of blades spaced apart from each other on the surface of the rotor, the plurality of blades projecting in a direction intersecting with the one direction at a right angle, the second screw spaced apart from the first screw along the one direction.

5. The method of claim 4, wherein a height of the plurality of blades is less than a height of the first screw.

6. The method of claim 1, wherein injection speed of the mixture in the foaming the mixture and a depressurization rate of the cavity in the reducing pressure of the cavity in a delayed manner are substantially equal to each other.

7. The method of claim 6, wherein an intake and exhaust passage is formed to enclose the cavity in the lower mold part in the foaming the mixture, and wherein a length of the cavity in a longitudinal direction is greater than a length of the cavity in a transverse direction that intersects the longitudinal direction at a right angle, and wherein a plurality of intake and exhaust holes are formed in an intake and exhaust passage located at both ends of the longitudinal direction, and wherein the plurality of intake and exhaust holes are in communication with the cavity.

8. The method of claim 7, wherein a plurality of intake and exhaust holes comprises:

a plurality of first intake and exhaust holes located at a first of the two ends and spaced apart from each other; and a plurality of second intake and exhaust holes located at a second end opposing to the first end of both ends and spaced apart from each other, and wherein an average thickness of the low-density midsole formed in a portion of the cavity closer to the second end than to the first end is greater than an average thickness of the low-density midsole formed in another portion of the cavity closer to the first end than to the second end, and wherein an exhaust pressure acting on the second intake and exhaust holes is greater than an exhaust pressure acting on the first intake and exhaust holes.

9. The method of claim 7, wherein a plurality of intake and exhaust holes comprises:

a plurality of first intake pores located at a first of the two ends and spaced apart from each other; and a plurality of second intake and exhaust holes located at a second end opposing to a first end of both ends and spaced apart from each other, and wherein an average thickness of the low-density midsole formed in a portion of the cavity closer to the second end than to the first end is greater than an average thickness of the low-density midsole formed in another portion of the cavity closer to the first end than to the second end, and wherein an amount of gas exhausted through the second intake and exhaust holes is greater than an amount of gas exhausted through the first intake and exhaust holes.

10. The method of claim 7, wherein a gas is exhausted through a first valve and a second valve connected to an intake and exhaust passage corresponding to a length of a longitudinal direction of the cavity, and the second valve is opened after the first valve is opened in the reducing pressure of the cavity.

11. The method of claim 10, wherein the second valve is opened 0.5 second to 1 second after the opening of the first valve.

12. The method of claim 11, wherein the first valve has an opening of not greater than an opening of the second valve, and the first valve has an opening of a range from 20% to 40%.

13. The method of claim 12, wherein the second valve has an opening of a range from 30% to 40%.

14. The method of claim 1, wherein the cavity is pressurized to a range of 5 bar to 60 bar in the pressurizing the cavity.

15. The method of claim 1, wherein the first step is performed in a range from 0.05 to 2 second.

16. The method of claim 15, wherein the first step of is performed in a range from 0.1 to 1 second.

17. The method of claim 1, wherein the foaming the mixture is that the second screw advances in multiple stages to inject the mixture, and an injecting distance of the second screw decreases as the number of the stages increases.

18. The method of claim 17, wherein an injection rate gradually increases or decreases as the number of the stages increases.

19. The method of claim 17, wherein an injection pressure increases or remains the same as the number of the stages increases.

20. The method of claim 1, wherein after the injecting the mixture, the first screw retracts along the one direction to repeat the manufacturing a melt.

21. The method of claim 20, wherein the directly providing the gas for physical foaming is performed simultaneously with a start of retraction of the first screw.

22. The method of claim 21, wherein the providing the gas for physical foaming is stopped simultaneously with completion of retraction of the first screw.

23. The method of claim 1, further comprising:

recovering by-products obtained from the resin beads in at least one of step performed after the providing the resin beads, shredding by-products to provide shredded material, and heat extruding the shredded material to provide a heel support for shoes and wherein heel support is adapted to be provided over a shoe sole in the manufacturing of a shoe.

24. A physical foaming injection system comprising:

a barrel that is extended in one direction and adapted to heat an inside thereof, a raw material inlet that is connected to the barrel and provides resin beads into the barrel; and a rotating body that is installed in the barrel, and that is adapted to transfer a melt by rotating and heating the resin beads and reciprocate along one direction; and wherein the rotating body comprise;

a rotor;

a first screw formed as a continuous helix on a surface of the rotor and a second screw that comprises a plurality of blades spaced apart from each other on the surface of the rotor, the plurality of blades projecting in a direction intersecting with the one direction at a right angle, the second screw that is connected in front of the first screw and directly contacting with and agitating a gas for physical foaming and then converting the gas for physical foaming into a supercritical fluid while the second screw advancing along the one direction; and wherein the first screw provides a mixture in which the melt is incorporated into the supercritical fluid while the first screw letting the melt passes through the supercritical fluid wherein the physical foaming injection system further comprises;

a supply port that is spaced apart from the raw material inlet and is connected to the barrel to directly provide gas for physical foaming into an empty space in the barrel formed before the second screw advances;

a mold that has at least one of cavity connected to the barrel and is adapted to allow the mixture to be injected and foamed in a vertical dropping direction; a plurality of valves that is communicated with the cavity and is adapted to reduce pressure of the cavity in a delayed manner; and an elastic midsole with a low density of 0.1 g/cc to 0.5 g/cc that is provided and removed from the mold by injection foaming; and wherein the supply port is located near an outlet of the barrel and is located closer to the outlet than the raw material inlet.

25. The system of claim 24, wherein the mold comprises:

a lower mold part, and an upper mold part that is adapted to be combined with the lower mold part; and wherein the upper mold part and the lower mold part forms the cavity; and an intake and exhaust passage are formed to surround the cavity in the lower mold part.

26. The system of claim 25, wherein a length of the cavity in a longitudinal direction is greater than a length of the cavity in a transverse direction that intersects the longitudinal direction at a right angle, and wherein a plurality of intake and exhaust holes are formed in an intake and exhaust passage located at both ends of the longitudinal direction, and wherein the plurality of intake and exhaust holes are connected to the cavity.

27. The system of claim 26, wherein the plurality of intake and exhaust holes comprises:

a plurality of first intake and exhaust holes located at a first of the two ends and spaced apart from each other; and a plurality of second intake and exhaust holes located at a second end opposing to the first end of both ends and spaced apart from each other, and wherein an average thickness of the low-density member formed in a portion of the cavity closer to the second end than to the first end is greater than an average thickness of the low-density member formed in another portion of the cavity closer to the first end than to the second end.

28. The system of claim 27, wherein a number of the plurality of first intake and exhaust holes is less than a number of the plurality of second intake and exhaust holes.

29. The system of claim 26, further comprising a plurality of injection gates for injecting the mixture into the cavity, the plurality of injection gates being combined with the upper mold part and arranged side by side along a longitudinal direction.

30. The system of claim 29, wherein at least one of time zones exist in which injection of the mixture and delayed injection of the mixture are differently performed by two or more injection gates among the plurality of injection gates.

31. The system of claim 26, wherein a plurality of intake and exhaust holes are formed on both sides of the longitudinal direction of the cavity, the plurality of intake and exhaust holes being in communication with intake and exhaust passage.

32. The system of claim 31, wherein a plurality of intake and exhaust holes comprise:

a plurality of first intake and exhaust holes located at a first of the both sides and spaced apart from each other; and a plurality of second intake and exhaust holes located at a second side opposing to the first side of both sides and spaced apart from each other, and wherein an average thickness of the low-density member formed in a portion of the cavity closer to the second side than to the first side is greater than an average thickness of the low-density member formed in another portion of the cavity closer to the first side than to the second side, and wherein a diameter of at least one of a plurality of intake and exhaust holes is greater than a diameter of at least one of a plurality of first intake and exhaust holes.

33. The system of claim 26, wherein at least one cavity comprises a pair of cavities which are mutually symmetrical to each other, and wherein an external outlet is formed in the lower mold part, the external outlet connected with each of the intake and exhaust holes and a plurality of valves of the pair of cavities along a transverse direction outside of the pair of cavities.

34. The system of claim 24, wherein a height of at least one of the plurality of blades is less than a height of the first screw, the at least one of the plurality of blades having a rectangular shape.

* * * * *